United States Patent [19]

Koenck et al.

[11] Patent Number: 5,804,805
[45] Date of Patent: Sep. 8, 1998

[54] HAND-HELD OPTICAL INDICIA READER HAVING A CONTROLLED OSCILLATING SYSTEM FOR OPTIMAL INDICIA READING

[75] Inventors: Steven E. Koenck; Phillip Miller, both of Cedar Rapids, Iowa; George E. Hanson, Andover, Kans.

[73] Assignee: Norand Technology Corporation, Wilmington, Del.

[21] Appl. No.: 751,381

[22] Filed: Nov. 19, 1996

Related U.S. Application Data

[63] Continuation of Ser. No. 309,334, Sep. 19, 1994, Pat. No. 5,576,529, which is a continuation-in-part of Ser. No. 215,112, Mar. 17, 1994, Pat. No. 5,640,001, which is a continuation-in-part of Ser. No. 947,036, Sep. 16, 1992, Pat. No. 5,308,966, which is a continuation of Ser. No. 875,791, Apr. 27, 1992, abandoned, which is a continuation-in-part of Ser. No. 422,052, Oct. 16, 1989, abandoned, which is a division of Ser. No. 894,689, Oct. 8, 1986, Pat. No. 4,877,949.

[51] Int. Cl.$^6$ .................................................. G06K 7/10
[52] U.S. Cl. ........................... 235/462; 235/472; 235/469
[58] Field of Search ........................... 235/462, 472, 235/470, 469, 454, 467; 250/205, 239, 366

[56] References Cited

U.S. PATENT DOCUMENTS

| | | | |
|---|---|---|---|
| 5,235,167 | 8/1993 | Dvorkis et al. | 235/462 |
| 5,308,966 | 5/1994 | Danielson et al. | 235/472 |
| 5,576,529 | 11/1996 | Koenck et al. | 235/472 |
| 5,600,119 | 2/1997 | Dvorkis et al. | 235/462 |

*Primary Examiner*—Hoanganh T. Le
*Assistant Examiner*—Thien Minh Le
*Attorney, Agent, or Firm*—Suiter & Associates, PC

[57] ABSTRACT

An optical indicia reader for reading information encoded in optical indicia is disclosed. In one embodiment of the invention, the optical indicia reader comprises a light source positioned within the indicia reader to illuminate an imaging area containing optical indicia, an oscillatory system for scanning a light beam over the optical indicia, and a controller for controlling the oscillatory system. The controller is capable of directing the oscillatory system to position the light beam in a fixed relationship to an aiming axis of the reader. The oscillatory system may be fixed in position when the optical indicia reader is in a proximity sensing mode.

3 Claims, 38 Drawing Sheets

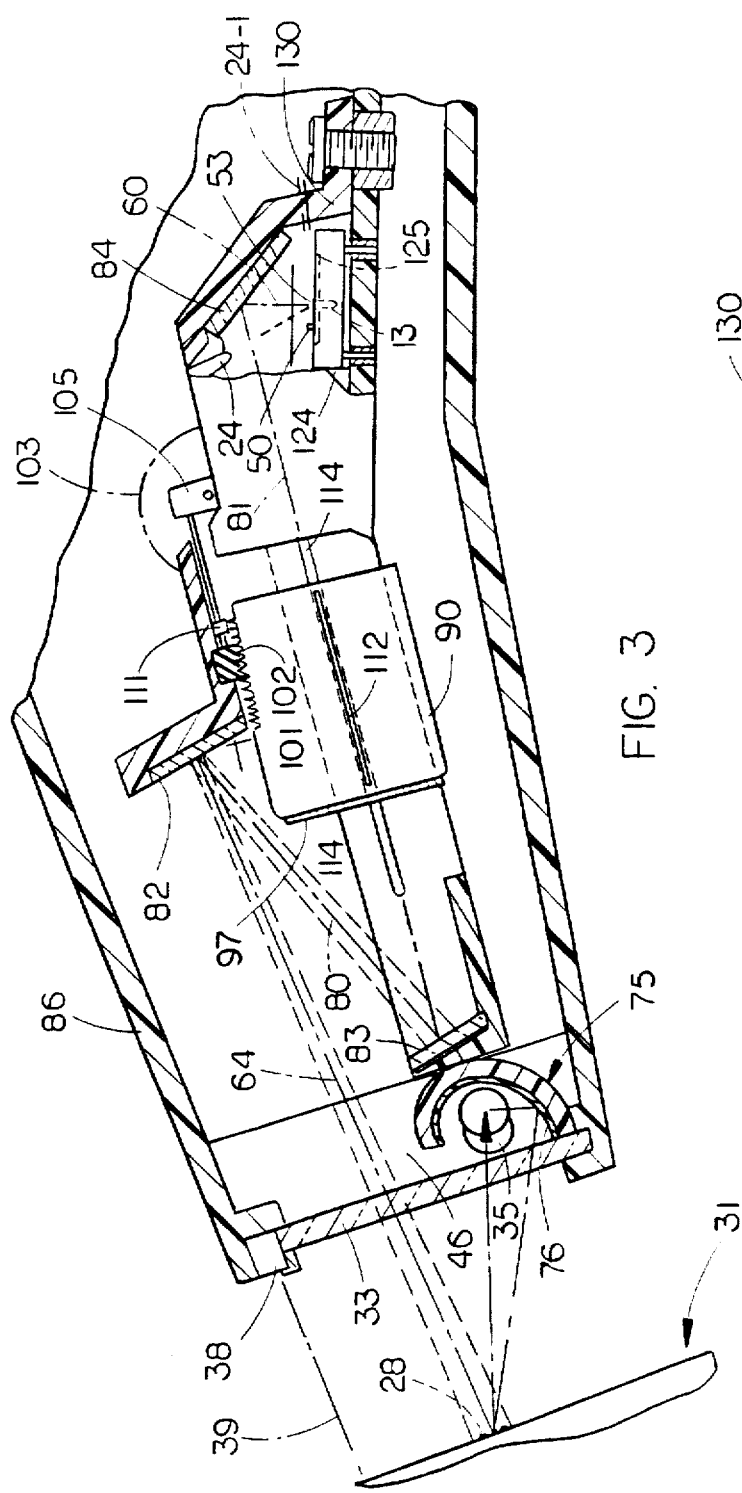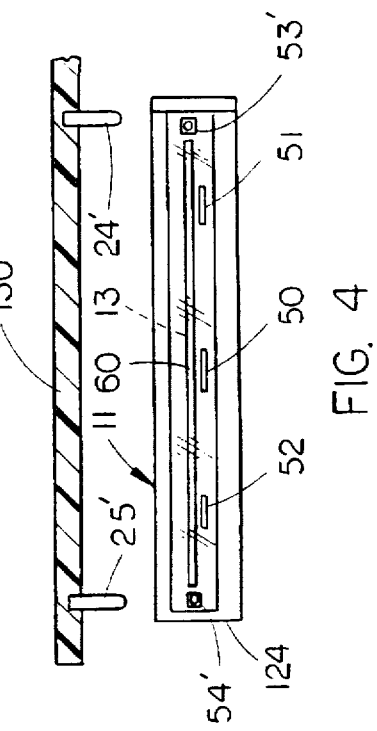

LIGHT PULSE

EXAMINE SENSOR

LABEL PRESENT    NO LABEL PRESENT

EMITTER
PULSE TR/ON

OUTPUT 
LABEL           NO LABEL
PRESENT         PRESENT

HAND-HELD OPTICAL INDICIA READER HAVING A CONTROLLED OSCILLATING SYSTEM FOR OPTIMAL INDICIA READING

CROSS REFERENCES

A. Related Applications

The present application is a continuation of Ser. No. 08/309,334 Sep. 19, 1994 (U.S. Pat. No. 5,576,529) which is a continuation-in-part of Ser. No. 08/215,112 filed Mar. 17, 1994 (U.S. Pat. No. 5,640,001) which is a continuation-in-part of Ser. No. 07/947,036 filed Sep. 16, 1992 (U.S. Pat. No. 5,308,966) which is a continuation of Ser. No. 07/875,791 filed Apr. 27, 1992 (abandoned) which is a continuation-in-part of Ser. No. 07/422,052 filed Oct. 16, 1989 (abandoned) which is a division of Ser. No. 06/894,689 filed Oct. 8, 1986 (U.S. Pat. No. 4,877,949).

B. Incorporations by Reference

The following related commonly owned patent applications are incorporated herein by reference:

| Docket No. | Inventor(s) | Serial N° | Filing Date | Patent N° | Issue Date |
| --- | --- | --- | --- | --- | --- |
| 5726 | White | 06/905,779 | 09/10/86 | 4,882,476 | 11/21/89 |
| 6231 | Miller, et al | 07/136,097 | 12/21/87 | | |
| 5769X | Danielson, et al | 07/143,921 | 01/14/88 | | |
| 6240 | Koenck | 07/238,701 | 08/31/88 | | |
| 6697 | Main, et al | 07/321,932 | 03/09/89 | | |
| 6767 | Danielson, et al | 07/364,902 | 06/08/89 | WO/90/16033 | 12/27/90 |
| 5854BB | Chadima, et al | 07/339,953 | 04/18/89 | 4,894,523 | 01/16/90 |
| 35740X | Danielson, et al | 07/422,052 | 10/16/89 | 4,877,949 | 10/31/89 |
| 6649XX | Phillip Miller et al | 07/347,602 | 05/03/89 | | |
| 36767YXX | Koenck | 07/987,574 | 12/08/92 | | |

The subject matter of certain of the above cases has been published as follows:

| Serial N° | Related Publication | Publication Date |
| --- | --- | --- |
| 06/905,779 | U.S. 4,882,476 | 11/21/89 |
| 07/364,902 | WO 90/16033 | 12/27/90 |
| 07/422,052 | U.S. 4,877,949 | 10/31/89 |
| 07/339,953 | U.S. 4,894,523 | 01/16/90 |

The entire disclosures of the foregoing publications are incorporated herein in their entirety by reference. The following additional disclosures are also incorporated herein in their entirety by reference:

| PCT International Application N° | International Filing Date | International Publication N° | International Publication Date |
| --- | --- | --- | --- |
| PCT/US93/02139 | 10 March 1993 | WO 93/18478 | 16 Sept. 1993 |
| PCT/US92/06157 | 23 July 1992 | WO 93/14470 | 22 July 1993 |
| PCT/US94/05380 | 11 May 1994 | (Priority Date 11 May 1993) | |
| PCT/US93/12459 | 21 Dec. 1993 | WO 94/15314 | 7 July 1994 |

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention is particularly concerned with improvements in instant optical character set readers of the type shown in U.S. Pat. Nos. 4,282,425 and 4,570,057. The disclosures of these United States Patents are incorporated herein by reference by way of background.

The instant type of bar code reader with flashable illuminator means has proved to be extremely desirable for portable applications because of its unique simplicity and compact design. A significant goal of the present invention is to retain the major advantages of the present commercial instant readers with flashable illuminator means while enhancing the capacity for reading optical information sets of substantially greater dimesnion. An important related aspect of the invention is to enable the reading of such information sets by illuminating the same with an instantaneous flash of light while the information sets are at a greater distance from the frontal end of the reader. A further development goal is to more effectively adapt the reading operation both to close up information sets of high reflectivity and to labels at greater distances and of curved configuration.

SUMMARY OF THE INVENTION

The present invention is therefore particularly directed to the provision of an instant bar code reader which, while retaining the advantages of simplicity, ease of hand operation and ruggedness, achieves enhanced versatility by its ability to read optical information sets of greater length and multiple dimensions and to adapt to a greater range of reading distances. Such enhanced versatility is realized by providing the reader with an automatically controlled lens system and operating such control in accordance with a measure of reading distance. Further improvements are achieved by monitoring an average of reflected light from the bar code during a reading operation, and terminating integration of the reflected light from a bar code after an optimum measurement sample of the reflected light image has been received.

Aiming of the reader may be carried out with the assistance of visible marker light beams directed into the field of view of the reflected light image sensor. In an ideal embodiment, the marker beams extend from opposite ends of the information set image sensor through the reflected light optics so that the beams delineate the desired locations for the opposite ends of an information set in the reader field of view.

For the sake of energy conservation during portable operation, automatic control of the lens system may be disabled until such time as the information set is within an effective reading range. Where a capacitor discharge energizes a flashable illuminator, the capacitor discharge current may be interrupted as soon as an adequate amount of reflected light has been received; this not only reduces battery drain but also speeds up the capacitor recharging cycle. By monitoring the charge on the capacitor, a new reading cycle can be initiated after a minimum time lapse, should an initial reading cycle be unsuccessful. Accordingly, it is an object of the invention to provide an information set reader configuration particularly suited to hand held operation while exhibiting increased versatility.

A more specific object is to provide an information set reader capable of reading a wider range of information sets of varying types without sacrifice of essential simplicity and ease in hand held operation.

Another object is to provide an information set reader capable of rapid and efficient alignment with information sets located at substantial distances from the reader.

A further object of the invention is to provide an instant information set reader which achieves the foregoing objects while minimizing energy consumption so as to retain a capacity for extended portable operation.

A feature of the invention resides in the provision of an adaptive bar code image sensor system enabling a succession of readings of a given information set with reflected light from respective different segments of such information set controlling respective integration times. This feature is applicable, for example, to information sets on curved substrates such that an information set reading with a single integration time would not effectively sample reflected light from all segments of the label.

Further features leading to enhanced adaptability of the code image sensor system comprise individually operable flash illumination means enabling more rapid flash sequences, and/or enabling improved illumination of irregular or curved code configurations and/or of code configurations of greater extent, and/or enabling respective individually controlled flash durations immediately following each other, and e.g. adapted to respective different segments of a code configuration.

Still further features of an adaptive code image sensor system relate to simultaneous reading of code segments at markedly different depths of field and/or multiple depth measurement sensors for assessing the depth of respective segments of a code configuration, and/or selectable range, distance to image sensors effectively adapted to read code configurations at respective overlapping ranges for instantaneous adaptation to a code configuration at any range, distance over a wide range without the use of moving parts. In one implementation, the effective usable range of a lens system is greatly increased by providing multiple optical image paths of respective different lengths in the reader which lead through the lens system to respective independently controllable image sensors.

Another feature resides in the provision of a marker beam indicator system for delineating the optimum location for an information set in the reader field of view so that the reader can be positioned rapidly and efficiently even while at substantial distances from an optically readable information set. Various method features will be apparent from the following disclosure. For example, in a case where a curved bar code label (or other optically readable information set) has a central segment within the focal depth of the lens system, but the marginal segments are actually outside the focal depth, one exemplary method of programmed operation may provide for a second flash automatically after the lens system has automatically focused at a selected greater depth. By assembling the two readings, e.g. pixel by pixel, a good reading may be obtained with, e.g., valid start and stop characters being obtained from the second reading. In another method of programmed operation, a display forming part of the operator input/output means can instruct the operator to take first a reading of the left hand portion of a severely curved label, then a central portion and then a right hand portion, with the processor assembling the pixels of the respective readings to obtain a complete bar code image reading.

The operator could, in another mode, advise the reader processor, e.g., by the selective actuation of function keys or the like, of a particular reading sequence to be input to the reader processor for extremely long or sharply curved labels. The function keys could be part of a keyboard associated with the reader itself and/or a keyboard associated with a host computer unit directly mechanically coupled with the reader housing, or coupled via any suitable remote linkage means such as a cable or a radio frequency channel. In certain instances, the reader processor may assemble the pixels of successive readings not only with the assistance of internal check characters and preknowledge of code formats and the like and/or of specific reading sequences, but further with the assistance of measurements from multiple distance measurement sensors defining the general bar code spacial configuration. Utilizing multiple flashable illuminators and/or multiple intensity sensors may enable valid reading of different segments while avoiding in all cases, any saturation of CCD charge wells or the like of an image sensor. Saturation of any part of a CCD shift register may adversely affect subsequent operation of an image sensor.

Other objects, features and advantages of the invention will be apparent from the following detailed description taken in conjunction with the accompanying sheets of drawings, and from the features and relationships of the appended claims.

BRIEF DESCRIPTION OF THE DRAWINGS

FIG. 3 is a somewhat diagrammatic partial longitudinal sectional view for indicating the application of certain features of the present invention to is an instant optically readable information reader generally as shown in U.S. Pat. No. 4,570,057;

FIG. 4 is a somewhat diagrammatic plan view illustrating an adaptive information set image sensor system in accordance with the present invention, and also illustrating an alternative information set guide indicator arrangement for the reader of FIG. 3;

FIGS. 6A through 6F show waveforms useful for explaining the operation of the circuit of FIG. 6;

DETAILED DESCRIPTION

I. Description of FIGS. 1–14

Figure 1:
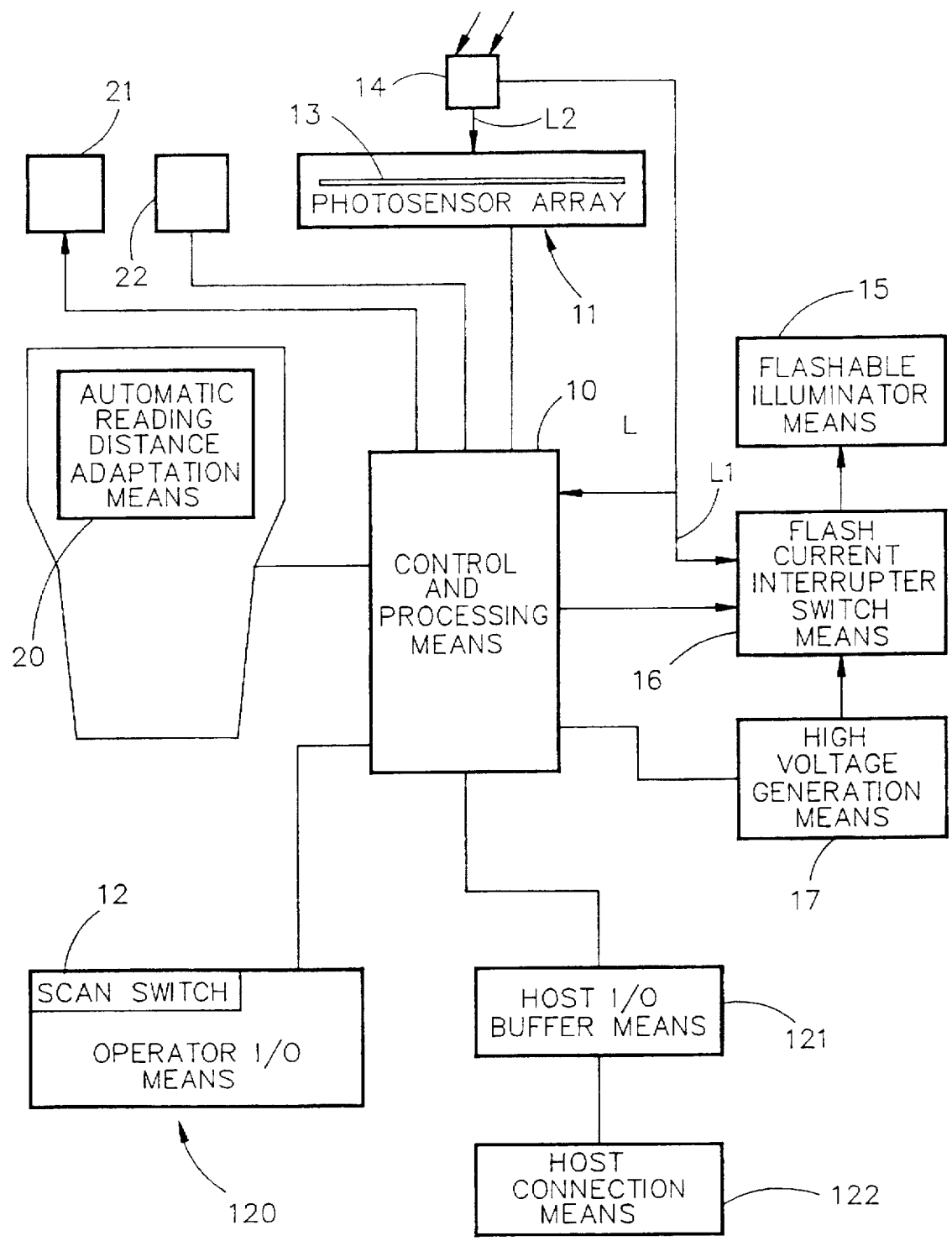
FIG. 1 is a block diagram illustrating a preferred embodiment of the present invention.

FIG. 1 illustrates a preferred instant bar code reader system for extending the versatility of a commercial bar code reader such as shown in U.S. Pat. No. 4,570,057. Component 10, FIG. 1, may represent a control and processing means for the system and may include a central processing unit, memory units and analog to digital conversion channels.

The central processing unit and associated memory form the main control portion of the system. The other functional blocks of FIG. 1 maybe inputs or outputs with respect to the central processing unit. The central processing unit may be a microprocessor that executes the program to control the operation of the reader. The microprocessor acts as a microcontroller with the capability of sensing and controlling the functional elements of the bar code reader, and decoding the bar code as supplied from a bar code image sensor means 11. Where the reader is coupled on line with a host computer system, (for example by a host connection means in the form of a flexible cable), the decoded bar signal is transmitted to the host under the control of the central processing unit. The microprocessor is capable of static operation with shut-down for power conservation. Wake-up of the processor will occur when an operator actuates a scan switch 12.

An electrically erasable read only memory of component 10 may be utilized to store parameters and special modifiable decoding sequences for the bar code reader operation. Examples of these parameters would be label code, and input/output speed and control format. Component 10 may also include a random access memory for data collection, decoding work space and buffer storage of the decoded label data for transmission to a host computer, for example. The random access memory can be internal to the microprocessor chip or reside on a data bus. The analog/digital channels are for receiving the bar code signals generated by the bar code image sensor means 11 and for other purposes as will be hereafter explained.

The image sensor means may, for example, include a photosensor array indicated diagrammatically at 13 having a one dimensional linear array of photodiodes for detecting the bar code reflection image. To read labels with bar code lengths of greater than seven inches with high resolution requires that the array have relatively high resolution. By way of example, the array 13 may comprise five thousand photodiode circuits (5,000 pixels) and provide approximately three photodiode circuits (3 pixels) for each five mils (0.005 inch) of a bar code length. (Each pixel of array 13 may have a length of about seven microns.) A charge coupled device (CCD) shift register may be arranged to receive bar code signal elements from the respective photodiode circuits after a suitable integration interval. Once the bar code signal elements have been transferred to the shift register, the signal elements are retained independently of further exposure of the photodiodes to reflected light from the bar code.

In the embodiment of FIG. 1, an intensity sensor 14 is provided and may comprise a photodiode that will determine the relative amount of light exposure of the photosensor array 13. if component 10 operates at sufficiently high speed, the signal from the intensity sensor 14 may be supplied exclusively to component 10 via an analog/ digital channel so that the control and processing means can determine the optimum point for transfer of the bar code image signals to the shift register. Likewise, many CCD's now have an electronic shutter. In the foregoing example the sensor 14 could drive a circuit to condition the input and drive the CCD shutter pin (simple non-processor controlled exposure control). The shutter control line stops the photo-discharge of the internal CCD capacitors. This may be achieved electronically. Further exposure during the cycel results in no further charge reductions (see, for example, FIG. 56).

In a presently preferred implementation, however, the intensity sensor mean 14 is directly coupled with the hardware control circuits of the flashable illuminator means and of the bar code image sensor means, and this is indicated by dash lines L1 and L2 in FIG. 1; in this case, line L is used only so that the processor component 10 is advised that a flash has actually occurred. In a preferred embodiment wherein a flashable illuminator 15 is driven by capacitor discharge current, a component 16 may effect interruption of the flow of current from the capacitor based directly on the signal supplied via L1 from intensity sensor 14. In this way, energy is conserved, and recharging of the capacitor speeded up. Component 16 may comprise a flash current interrupter switch means, e.g., a solid state switch which is controlled to interrupt discharge of the capacitor of high voltage generation unit 17, and thus, to terminate the flash of light from the flashable illuminator 15 when intensity sensor 14 indicates that adequate reflected light has been received from a bar code.

Figure 2:
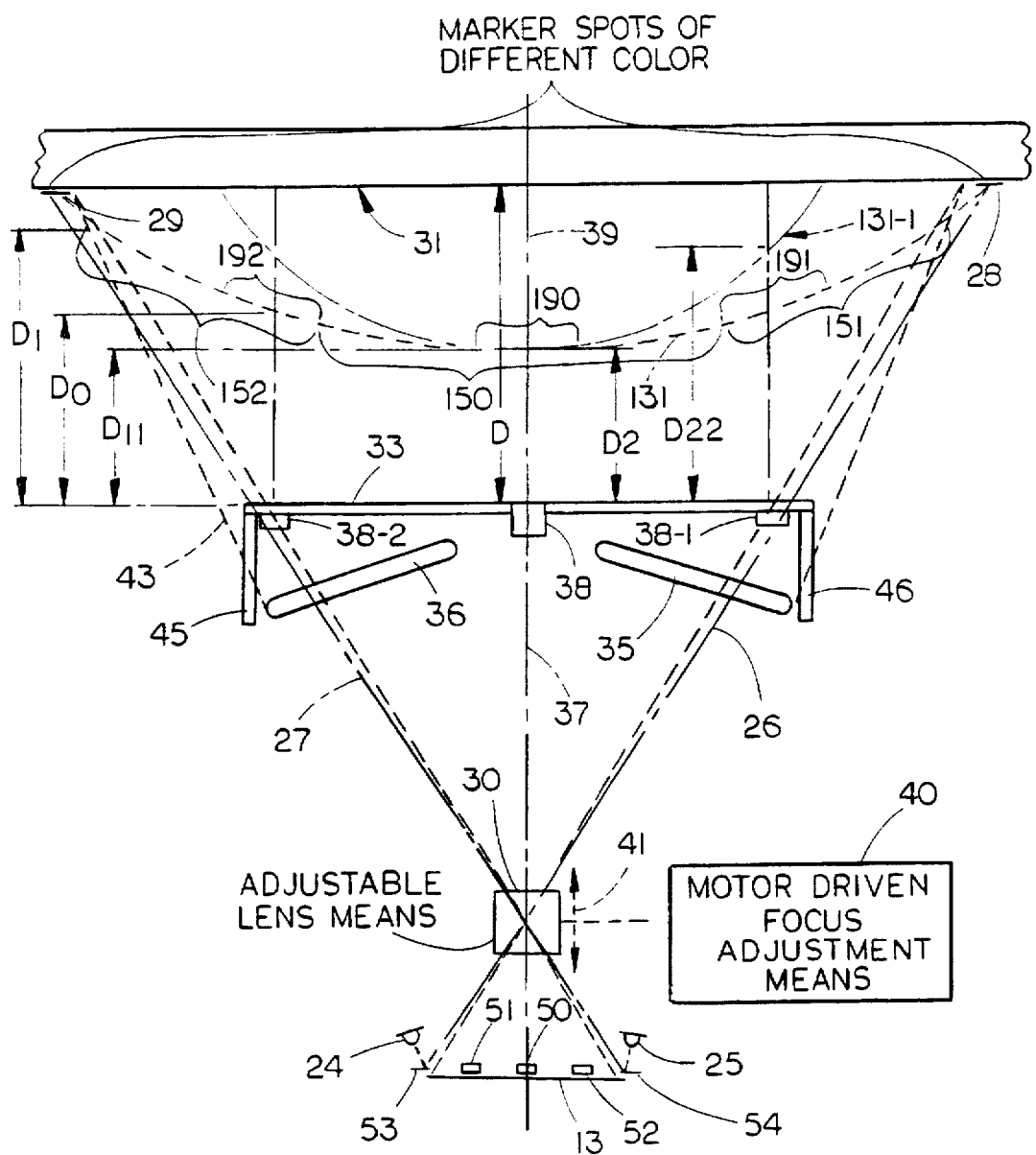
FIG. 2 is a diagrammatic view useful for explaining certain features of a specific exemplary embodiment of the invention.

The system of FIG. 1 is also indicated as including a reading distance adaptation means 20, label guide indicator means 21 and reading distance sensor means 22. These components are best understood by reference to a specific example as shown in FIG. 2. FIG. 2 illustrates an exemplary configuration wherein the label guide indicator means 21 (FIG. 1) is provided by a pair of marker light emitting diodes 24 and 25 which produce light beams 26 and 27 extending from opposite ends of the photosensor array 13 through the lens system indicated at 30 so as to delineate by means of marker light spots at 28 and 29 on the label the field of view of the reader. FIG. 2 illustrates a situation where label 31 has a bar code with a length greater than seven inches and is located at a distance D from a frontal window part 33 of the reader of greater than two inches, for example, three inches. By way of example in FIG. 2, flashable illuminator 15 of FIG. 1 is illustrated as being implemented by two flash tubes 35 and 36 directed obliquely outwardly relative to a central axis 37 of the reader. FIG. 2 also illustrates the provision of an ultrasonic transducer 38 for implementing component 22 of FIG. 1. For example, transducer 38 may emit an ultrasonic pulse along an axis 39 aligned with the reader central plane such that the time of arrival of a reflected pulse from the bar code label 31 provides a measure of reading distance. In place of or in addition to distance sensor 38, infrared distance measurement sensors 38-1 and 38-2 are provided in FIG. 2, with axes arranged to intersect a curved label generally at a mean distance (e.g. at $D_0$ equal to one-half the sum of the maximum distance $D_1$ and the minimum distance $D_1$). By way of example, adaptation means 20 may include motor driven focus adjustment means 40 coupled with the lens system 30 for adjusting the lens system parallel to the central optical axis 37, as represented by the double-headed arrow 41. In the example of U.S. Pat. No. 4,570,057, the reader has a width dimension at its frontal wall which is greater than the extent of the exit light path at the plane of such frontal wall. However, in the specific configuration of FIG. 2, it will be observed that marginal light rays 43 and 44 from the flash tubes 35 and 36 are transmitted by transparent side walls 45 and 46 of the reader housing so that in this case the illumination field has a total extent at the plane of the reader frontal wall which is substantially greater than the width dimension of such frontal wall.

In FIG. 2, a photodiode intensity sensor 50 corresponding to component 14 of FIG. 1 is indicated as being mounted centrally as defined by a plane intersecting the optical axis 37, but offset from photosensor array 13 so as not to obstruct light incident thereon. (Optical axis 37 intersects photodiode array 13.) Intensity sensor 50 is preferably placed so as to intercept light of maximum intensity as reflected from the label 31. By way of example, intensity sensors such as 50, 51 and 52 may be located at respective different locations adjacent sensor array 13 as indicated, and successive ones of the sensors may be selected for actual control of bar code image integration time during successive bar code reading operations for a given curved bar code configuration as will be hereafter explained.

In the example of FIG. 2, mirror elements 53 and 54 are mounted at opposite ends of photosensor array 13 for reflecting light from the sources 24 and 25 along the beam paths 26 and 27. Components such as 11, 14, 15, 20, 21 and 22 of FIG. 1 may be implemented as shown in FIG. 3. FIG. 3 may be taken as supplementing FIG. 2, and corresponding reference numerals have been used in FIGS. 2 and 3 to designate similar parts.

Referring to the physical arrangement of parts as indicated in FIG. 3, the location of the intensity sensors such as 51 to one side of a central optical axis 60 is indicated. Considering the plane which intersects the photosensor array 13 and coincides with the optical axis, 60, it will be understood that mirrors such as 53 will each have a location centered on such plane. As indicated in FIG. 3, ultrasonic transducer 38 (FIG. 3) may be located just above window 33 with its axis 39 directed generally parallel to the optical axis 64 (which indicates the axis for the reflected light entering the reader).

In conformity with FIG. 2, the reader is shown as having transparent side wall portions such as 46 at the respective sides of the reader, corresponding to the transparent portions 45 and 46 in FIG. 2. Each of the flash lamp tubes 35 and 36 may be provided with a housing 75 and an interior reflector 76 with a configuration as described as U.S. Pat. No. 4,570,057. At a depth of approximately three inches in front of the window 33, the flash illumination means 35 and 36 may effectively illuminate a sensing region having an extent greater than seven inches, for example.

Reflected light from a bar code label 31 follows an optical path as indicated at 64, 80, 81 and 60 in FIG. 3 by virtue of the arrangement of mirrors 82, 83 and 84. These mirrors are fixed relative to reader housing 86, while a lens barrel 90 carrying optical lenses is axially adjustable relative to the reader housing. Also preferably forming part of the adjustable lens barrel assembly 90 are an infrared rejecting filter 97 and a rectangular aperture element analogous to that of U.S. Pat. No. 4,570,057. For the sake of diagrammatic indication, barrel assembly 90 is shown as having a series of gear teeth (rack) 101 meshing with a worm gear drive 102 which is driven from an adjustment motor 103 via a right angle drive coupling assembly 105. The barrel assembly 90 may have a range of adjustment so as to accommodate bar code labels closely adjacent to the frontal window 33 and at progressively greater distances in front of the window 33 up to reading distances of at least three inches.

In FIG. 3, a bearing for the shaft of worm gear 102 is indicated at 111. Guide means for lens barrel 90 are indicated as comprising flanges such as 112 for riding in cooperating slot-like low friction guideways such as 114. An alternative location for the light emitting diodes 24 and 25 is indicated at 24-1 in FIG. 3. An analog to digital conversion channel of component 10, FIG. 1 maybe utilized to monitor charge build-up in the high voltage generation component 17 so that a flash of the illuminator means 15 will take place only when the desired amount of flash driving current is available.

Other analog to digital conversion channels may read the light intensity values accumulated by intensity sensors 50, 51 and 52, so that such intensity values can determine respective bar code image integration times, where desired.

Component 120 in FIG. 1 represents audio and visual status indicators for facilitating operation of the reader unit. For example, a red-light-emitting diode indicator may be energized whenever a thumb actuator controlling read enable switch 12 is pressed and the reading distance sensor means determines that a bar code label is beyond the maximum reading distance of the reading distance adaptation means 20. At such a distance outside of the operative reading range, the lens adjustment motor 103, FIG. 3, follows an optical path as indicated at 64, 80, 81 and 60 in FIG. 3 by virtue of the arrangement of mirrors 82, 83 and 84. These mirrors cire fixed relative to reader housing 86, while a lens barrel 90 carrying optical lenses is axially adjustable relative to the reader housing. Also preferably forming part of the adjustable lens barrel assembly 90 are an infrared rejecting filter 97 and a rectangular aperture element analogous to that of U.S. Pat. No. 4,570,057. For the sake of diagrammatic indication, barrel assembly 90 is shown as having a series of gear teeth 101 meshing with a worm gear drive 102 which is driven from an adjustment motor 103 via a right angle drive coupling assembly 105. The barrel assembly 90 may have a range of adjustment so as to accommodate bar code labels closely adjacent to the frontal window 33 and at progressively greater distances in front of the window 33 up to reading distances of at least three inches. In FIG. 3, a bearing for the shaft of worm gear 102 is indicated at 111. Guide means for lens barrel 90 are indicated as comprising flanges such as 112 for riding in cooperating slot-like low friction guideways such as 114.

An alternative location for the light emitting diodes 24 and 25 is indicated at 24-1 in FIG. 3. An analog to digital conversion channel of component 10, FIG. 1, may be utilized to monitor charge build-up in the high voltage generation component 17 so that a flash of the illuminator means 15 will take place only when the desired amount of charge is available. Other analog to digital conversion channels may read the light intensity values accumulated by intensity sensors 50, 51 and 52, so that such intensity values can determine respective bar code image integration times, where desired.

Component 120 in FIG. 1 represents audio and visual status indicators for facilitating operation of the reader unit. For example, a red-light-emitting diode indicator may be energized whenever a thumb actuator controlling read enable switch 12 is pressed and the reading distance sensor means determines that a bar code label is beyond the maximum reading distance of the reading distance adaptation means 20. At such a distance outside of the operative reading range, the lens adjustment motor 103, FIG. 3, may be disabled, e.g., by the programming of control and processing means to conserve power. When the reader is within the operative range, if the thumb operated switch 12 is actuated, motor 103 is essentially continuously controlled according to successive distance readings. If a good bar code reading is accomplished, means 120 may produce a relatively long single beep and turn on a green light emitting indicator diode. Where a bad bar code reading situation is determined, e.g., after a selected number of reading attempts, means 120 may generate three short beeps, for example. The programming may be such that once a good reading or bad reading condition is determined, the user must release the thumb switch and depress it again to initiate another read sequence. Indicator lamps and a beeper have been shown in the seventh figure of U.S. Pat. No. 4,570,057 and are described therein at column 11, lines 37–43. The indicator lights may be physically located forwardly of the thumb switch as can be seen in the first figure of U.S. Pat. No. 4,570,057.

FIG. 1 also indicates an input/output buffer component 121 for coupling the control and processing means 10 with a host processor or the like. A connection means 122 may directly receive a host processor so that the host processor housing is physically attached with the reader housing. As another example, connection means 122 may comprise a cable containing six conductors. Preferably, such a cable would be detachable at the reader. In this second example, all needed voltages may be generated in the reader from plus five volts supplied by two of the six conductors (+5V, GND). The other four signal lines of the cable are preferably independently programmable as inputs or outputs. By way of example, the host processor may be part of a portable hand held computer such as shown in U.S. Pat. No. 4,455,523 and U.S. Pat. No. 4,553,081. The rechargeable batteries of the portable computer may supply all needed power to the reader unit of the present invention. In the second example, a host computer unit can be carried in a belt holster for example during extended use of the reader unit of the present invention.

FIG. 4 is a somewhat diagrammatic top plan view of an exemplary bar code image sensor means 11 such as indicated only schematically in FIG. 1. In FIG. 4, the sensor housing 124 is shown as having a light transparent cover window 125 overlying the photodiode array 13. Where the photodiode array comprises five thousand individual elements or pixels, each with a dimension of about seven microns, the intensity sensors 50, 51 and 52 may each have a length of about one-tenth inch or more so as to span many bars of a reflected bar code image, e.g., at least six bar code elements, and reliably sense an average intensity value which is essentially independent of any specific bar code sequence. By way of example, the intensity sensors may be cemented to the exterior surface of window 125 at successive locations along photodiode array 13 but offset from the light entrance path to the photodiode array.

Mirrors 53 and 54, FIG. 2, may be cemented in place on the glass 125 as indicated for mirrors 53' and 54' in FIG. 4. The light sources 24' and 25' in FIG. 4 may be located in wall 130, FIG. 3, at a section as indicated 24-1 in FIG. 3. The mirrors 53' and 54' are secured at angles such that the marker beams will extend parallel to the image path at 60, 81, 80 and 64 and will produce spots of visible light, e.g., of red color, corresponding to spots 28 and 29 in FIG. 2, and spot 28 as indicated in FIG. 3.

In a preferred mode of operation of the embodiments of FIGS. 1–4, manual actuation of the read enable switch 12 will initiate a flash of the illuminator means 15 provided the reader is within its operative range from a bar code label. If the reader is outside of such operative range, momentary actuation of the read enable switch 12 will activate a pair of marker beams such as 26, 27, FIG. 2 representing the lateral margins of the reader field of view. Then, if the reader is moved into operative range and the read enable switch 12 again actuated, the illuminator means 15 will be flashed regardless of the state of focus of the automatically adjustable lens means 30, FIG. 2.

If the initial reading is found to be invalid, the marker beams will automatically be turned on briefly to again delineate the reader field of view, and quickly thereafter the illuminator means will be flashed again. This sequence can be repeated automatically (if the read enable button is held depressed), until the lens means 30 has been automatically adjusted for the distance of the bar code from the reader and a valid reading is obtained.

In the reading of a highly curved bar code label, a plurality of reflected light intensity sensors such as 50, 51 and 52, FIG. 4, may be successively activated in successive flashes of the illuminator means 15, the intensity sensors automatically controlling successive integration times of the bar code image sensor 11, according to the an.erage intensity of reflected light from respective different segments of the curved bar code. Respective segments of a curved bar code label 131 have been indicated at 150, 151 and 152 in FIG. 2. In a first flash illumination of label 131, intensity sensor 51 might measure the reflected light from a bar code segment 151 on the label and cause transfer of the bar code image signals to a receiving means such as a CCD shift register after an integration time optimum for the reading of bar code segment 151. In a second flash quickly following the first, the intensity sensor might control integration time so as to be optimum for the bar code segment 152. Then in a third flash illumination of the bar code 131, the central intensity sensor 50 could control integration time. The control and processing means 10 would then assemble readings for bar code segments 151, 152 and 150 from the successive flashes of illuminator means 15 to determine if a valid total reading had been obtained. If not, a further succession of three flashes of the illuminator means could be enabled, with the indicator beams 28, 29 being turned on in the interval while proper high voltage was building up for the further series of flashes. (Three capacitors of component 17, FIG. 1, could store charge and be discharged rapidly in succession to produce three flashes in rapid sequence without any delay for capacitor recharging.)

For the case of a highly curved bar code label such as indicated at 1311 in FIG. 2, distance sensors 38-1 and 38-2 might indicate that the margins of the bar code would be out of focus. In such a case, as previously mentioned in the introduction to the specification, the processor 10 could be programmed to flash both tubes 35 and 36 with the adjustment means 40 controlled according to the distance reading D2 as sensed by the distance measurement means 38.

Thereafter, control of the adjustment means 40 would be related to a distance such as indicated at D22 in FIG. 2 so that marginal portions of the label 131-1 would then be in focus. With the new focus automatically established, tubes 35 and 36 could be again activated so as to read the marginal portions of the bar code on label 131-1, whereupon the processor component 10 could assemble the two readings pixel by pixel to establish a complete bar code.

In another example as previously mentioned, the reader could be provided with a display, and the processor component 10 could cause the display to instruct the operator that the label 131-1 was to be read in two segments, the reader first being positioned so as to be directed toward the left portion of the label 131-1, e.g., with only a tube 36 flashed, and then in a second operation, the reader being physically adjusted so as to be directed toward the right hand portion of label 131-1, and, for example, only the tube 35 flashed.

In another mode of operation as previously mentioned, the reader could be provided with a keyboard, and the operator noting the highly curved configuration of label 131-1, could advise the processor component 10 that a first reading would be taken of the left-hand portion of label 131-1, after which a separate reading would be taken from the right-hand portion of label 131-1.

Along with the multiple readings of a highly curved label such as 13 1-1, the processor 10 could also take account of distance measurements from components 38, 38-1 and 38-2, in assembling e.g., pixel by pixel, a complete bar code from the successive readings.

A. Summary of Exemplary Operation for FIGS. 1 through 4

Since operation is determined by the programming of component 10, many different modes of operation can be implemented. Generally, however, the reading distance sensor means 22 will be activated to read the distance between the front window 33 of the reader and one or more regions of a bar code label. If the distance measured, such as D, FIG. 2, is greater than an operative range of the adaptation means 20, for example, greater than three inches, the adaptation means 20 may be disabled. Thus, for the case of adjustable lens means 30, the motor driven focus adjustment means 40 would be inactive as long as the distance sensor means such as 38 determined that the distance D was outside of the operative range of the lens means 30. In this case, however, preferably the label guide indicator means 21 would be active as long as the scan switch 12 was actuated by the operator, to produce the marker spots as indicated at 28 and 29 in FIG. 2 and as indicated at 28 in FIG. 3. The marker beams 26 and 27 would remain on while switch 12 was actuated and for an interval of, for example, five seconds after release of switch 12, where the reading distance remained outside of the operative range.

Where the switch 12 is actuated and the reading distance sensor means determines that the reading distance is within the operative range, component 10 checks the high voltage generation means 17 to determine if proper voltage is present on the flash capacitor means and if so, turns off the label guide indicator means 21, FIG. 1, and effects a cleaning cycle of the bar code image sensor means 11 so as to prepare the photosensor array 13 for a reading operation. The processor component 10 then initiates a capacitor discharge to activate the flashable illumination means 15. In one embodiment, a single capacitor may be arranged to drive both of the flash tubes 35 and 36 of FIG. 2. In another embodiment, respective individual capacitors may be arranged to drive the respective tubes 35 and 36. In one mode, both capacitors may be discharged to drive both of the tubes 35 and 36 simultaneously. In this mode, an intensity sensor 50, FIGS. 2 and 4, may control the duration of the integration time interval during which the reflected bar code image signal is accumulated at the sensor means 11. At the end of the integration interval, the bar code image signals are transferred for example to a CCD shift register for readout from the sensor means 11. During the readout operation, the signals received by the shift register are not affected by further light impinging on the photodiode array 13. Furthermore, at the end of the integration interval, the flash current interrupter switch 16 may be actuated so as to interrupt discharge from the relevant capacitor or capacitors. In this way, energy is conserved, and recharging of the capacitor means is sped up.

In a second mode of operation, a capacitor associated with flash tube may be activated during a first reading interval under the control of an intensity sensor 51 for insuring an optimum reading of a bar code segment such as indicated at 151 of a label 131, for example, of marked curvature. In a second reading interval, the capacitor associated with flash tube 36 may be activated to illuminate particularly a bar code segment 152, with the integration time of the bar code image sensor means being under the control of an intensity sensor 52 arranged to receive reflected light particularly from bar code segment 152. In one example, intensity sensor 51 would be arranged to generate an average light value by averaging reflected light emanating from a portion 191 of segment 151. Similarly, intensity sensor 52 would receive light from a portion such as 192 of segment 152 where reflected light intensity would be greatest on the average. In this example, the programming of component 10 would be such as to generate the bar code from two successive flashes, one of tube 35 and the other of tube 36. Where the bar code generated based on two such reading intervals fails to provide a valid consistent reading for central segment 130, component 10 could be programmed to produce in a third reading interval, the simultaneous discharge of both capacitors to simultaneously activate both of the flash tubes 35 and 36 under the control of the central intensity sensor 50 which sensor 50 would receive light from a portion 190 of segment 150 which would be expected to provide maximum average light intensity. The component could then be programmed to assemble a complete bar code reading from the three successive reading intervals.

The third interval might be driven by means of a third capacitor connectable to both tubes 35 and 36 so that the three reading intervals could be executed in quick succession. Where a first reading operation is unsuccessful for example, because of an incorrect position of the adjustable lens means 30, component 10 may be programmed to immediately turn on the label guide indicator means 21 during the interval when the capacitor means is being automatically recharged for a succeeding second reading operation. During the recharging operation, e.g., for a time interval of about ninety milliseconds, the label guide indicator means 21 will remain on, and the reading distance sensor means 22 will repeatedly measure the distance to the bar code label with an essentially continuous corresponding control of the lens mean by the focus adjustment means 40. As soon as the component 10 determines that each of the capacitor means has attained the desired voltage for a further flash illumination, the image sensor means 11 will be again cleared and a new reading operation automatically carried out. In each reading sequence as before, one or more of the intensity sensors 50, 51 and 52 determines the time point at which the image signal of the photodiode charge cells is transferred to the CCD shift register stages. Also, after the appropriate integration interval or intervals, the current interrupter switch 16 for a respective capacitor discharge circuit is operated to terminate the capacitor discharge and extinguish the flash of a respective illuminator means. The data resulting from each integration interval is transferred out of the image sensor means 11 via the CCD shift register for processing in component 10. When a successful reading is determined by component 10, the corresponding indicator of component 12 will be activated, and for example, it will be necessary to release switch 12 before a further reading operation can be initiated. Where a given reading operation is unsuccessful, the programming of component 10 may be such that the reading operation is automatically repeated up to, for example, ten times. Should ten successive reading attempts be unsuccessful, component 10 would produce thecorresponding bad read condition indication via component 120, and again, for example, it might be necessary for the operator to release switch 12 before 15a further read sequence could be initiated. By way of example, once a valid bar code reading was obtained, the programming could be such that component 10 could establish communication with a host computer system, for example, an accompanying portable computer, or an integral host computer. Where no further actuation of the switch 12 occurs after a valid reading, the system may be programmed to automatically power down so that a battery means, for example, within reader housing 86, would be subject to the minimum drain during inactive intervals of the reader system.

The foregoing modes of operation could be selected, for example, from the keyboard of a hand-held computer carried by the operator along with the reader unit. The various optional modes of operation could be correspondingly selected with all modes preprogrammed into the component, or desired respective modes of operation could be obtained by loading the corresponding programming from the handheld computer into component, as desired. Other special modes of operation can be accommodated such as machine gun scanning (which might be used in reading lists of labels). In such an operation, switch 12 could be held depressed while the reader was moved over a series of labels, and the programming would be such as to discard identical adjacent bar code readings. Also, changes could be effected in the operation of the good and bad read indicators of component 120 and changes could be made in the allowed number of retries and the like. While the foregoing description will enable those of ordinary skill in the art to understand and practice the present invention, the following supplemental description is given particularly for demonstrating the availability of a suitable implementation utilizing low cost presently available standard commercial components.

B. Supplementary Discussion

As an example of implementation of the system of FIG. 1, component 10 may be implemented as a Motorola MC68HC11 microcontroller. Other processor components which are presently commercially available include a NEC uPD783 10, a National HPC 1 6140, an Intel CMOS MCS8097, and a Hitachi HD64180. Some such components would need more external devices than others, e.g., such as analog to digital conversion channels, ROM, RAM, EEPROM (or equivalent non-volatile RAM), etc. Generally, as higher speed processors become available, and processors with more internal memory and conversion facilities, the utilization of such processors will be advantageous. FIGS. 5, 10, 11 and 12 herein are shown as using signals from the Motorola MC68HC1 1. All other inputs and outputs are general processor pins, so that a drawing showing the processor of component 10 is not necessary.

Figure 5:
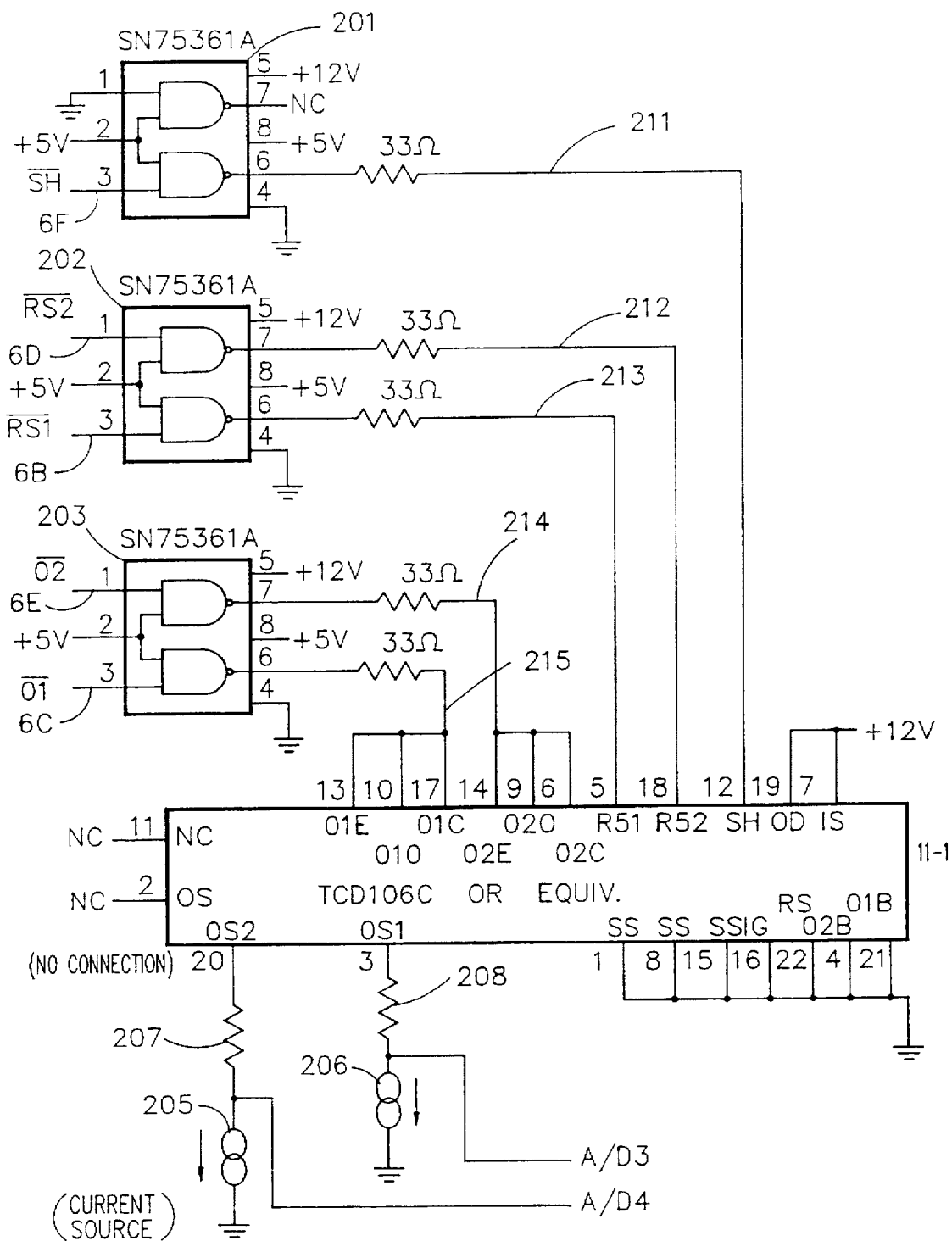
FIGS. 5, 6 and 7 are electric circuit diagrams for illustrating an exemplary implementation of component 11 of FIG. 1.

In FIG. 5, reference numeral 11-1 indicates a specific component for use in the bar code image sensor means 11 of FIG. 1. By way of specific example, component 11-1 may comprise a solid state integrated circuit chip such as type TCD106C image sensor or the equivalent. Component 11-1 includes a charge coupled device (CCD) shift register driven for example utilizing two megahertz clock signals from driver components 201, 202 and 203. Where components 201–203 are implemented as type 75361 drivers. These components serve to convert the five volt input logic signals to the twelve volt level needed to drive component 11-1. Current sources 205 and 206 in conjunction with resistors 207 and 208 provide a DC offset to bring the video output levels from the shift registers into an acceptable input range for the analog to digital converter channels A/D3 and A/D4 of component 10.

Figure 6:
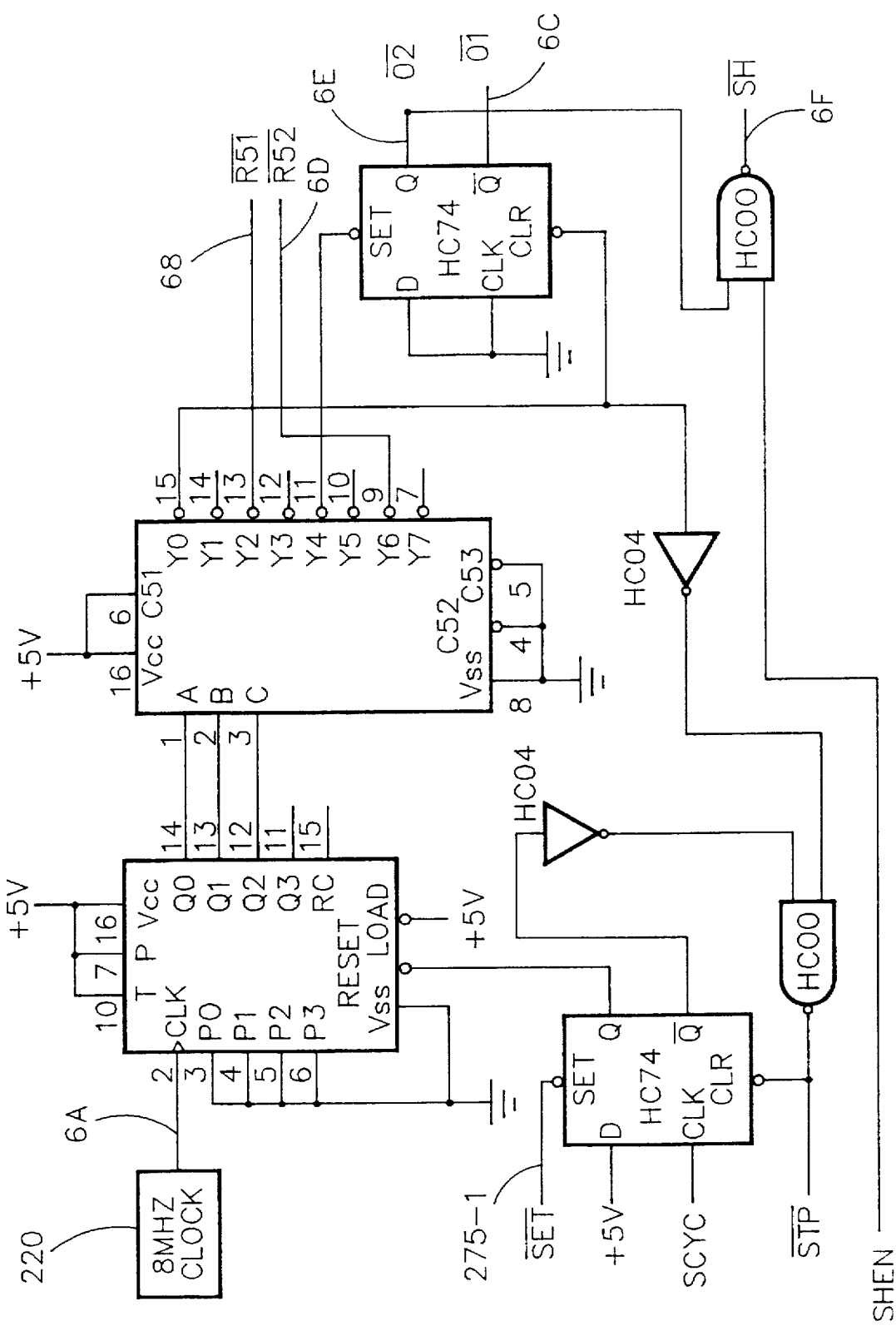

The microcontroller of component 10 could drive each signal line directly, but the bit manipulation capabilities of most presently available processors would provide a very slow preparation and reading cycle time forthe case of a bar code image sensor size of 5000 pixels. The circuit shown in FIG. 5 uses an eight megahertz clock 220, FIG. 6, to produce a controlling sequence which can clock out two pixels every microsecond from component. The circuit of FIG. 6 allows continuous operation such as is needed to quickly prepare the component 11-1 for a reading operation and also allows single-stepping operation to give the analog to digital converter channels sufficient time to input each pixel. The circuit of FIG. 6 allows each shift pulse to be synchronized with the clock rate at line 215, FIG. 5, (the 0110 clock line) for proper operation. it is desirable to operate at the highest frequency possible without unduly complicating or increasing the size of the driver circuitry. Thus, an image sensor with a higher maximum clocking rate could be selected. In FIG. 6, reference characters 6A through 6F have been applied to various lines and the corresponding related waveforms have been indicated in FIGS. 6A through 6F, respectively, by way of explanation of the operation of FIG. 6. The outputs of FIG. 6 form respective inputs to drivers 201, 203 of FIG. 5 as indicated by the respective designations of the corresponding lines in these figures. In FIG. 6A, reference numeral 231 indicates the first positive transition of the clock waveform after the signal (supplied by the aforementioned MC68HC1 1 microcontroller) goes low, or the signal line SCYC goes high. In FIG. 6F, the signal SH follows the dash line 232 if the signal SHEN is true. As indicated at 241–244 by dash lines, the cycling continues if the signal IVT remains low.

Figure 7:
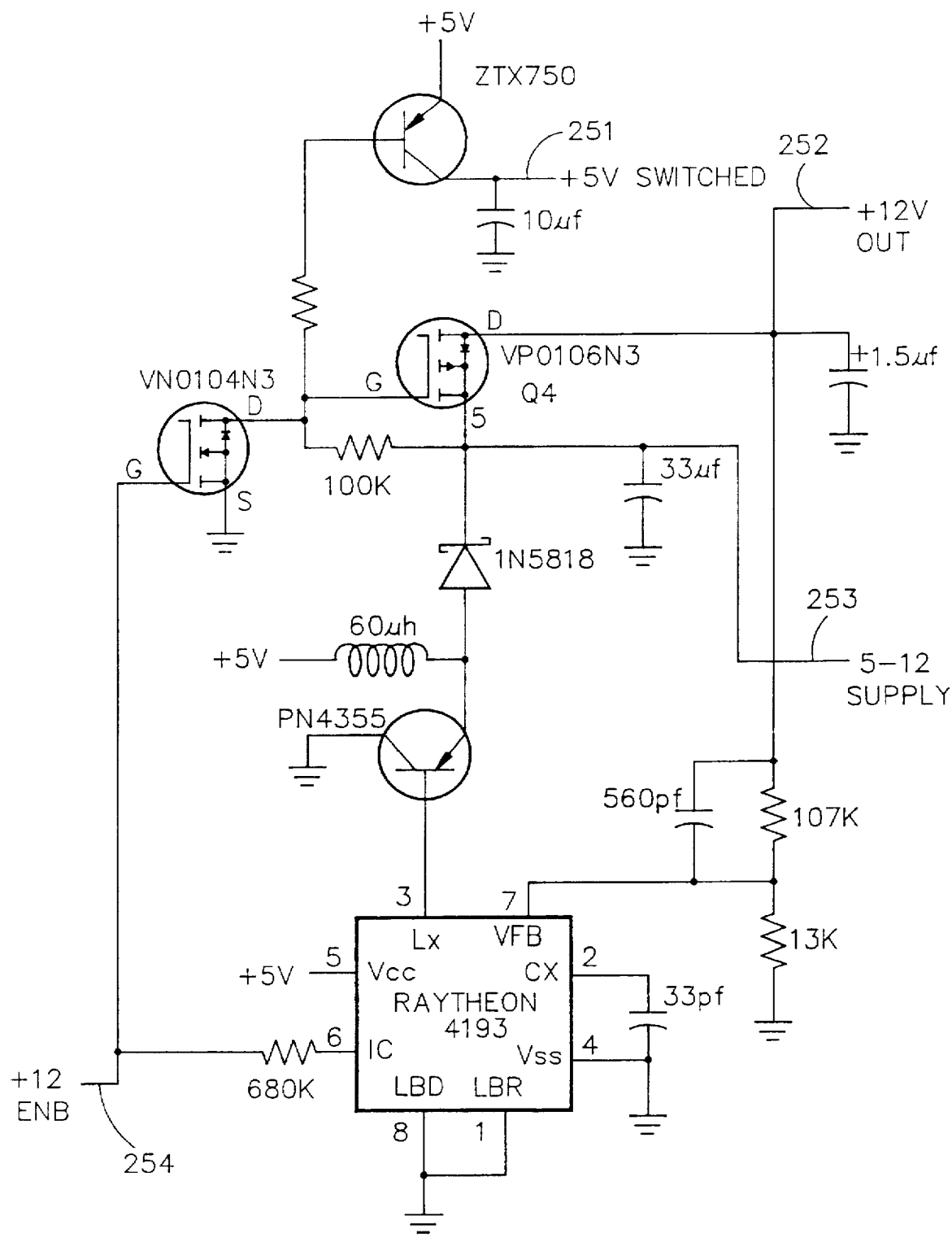

Component 11-1 requires twelve volts for proper operation and a circuit for providing this voltage from the five volt supply available is indicated in FIG. 7. This circuit should be able to be powered down when not in use in order to conserve power. A drawback of the circuit of FIG. 7 is that when it is turned off, the inductor L1 provides plus five volts to the plus twelve volt circuits unless a transistor Q4 is added to block the five volts.

Line 251 in FIG. 7 receives a switched plus five volts for supply to the drivers 201–203 of FIG. 5. Line 251 may also supply five volts to any other circuit which is not needed when the twelve volts is off. The five volts at line 251 is switched off with the plus twelve volts at line 252 to completely power down the image sensor component 11-1 of FIG. 5 and drivers 201–203. An output line 253 in FIG. 7 provides five volts when the twelve volts are shut off and provides twelve volts when the line 254 (+(+12 ENB)) is enabled.

Figure 8:
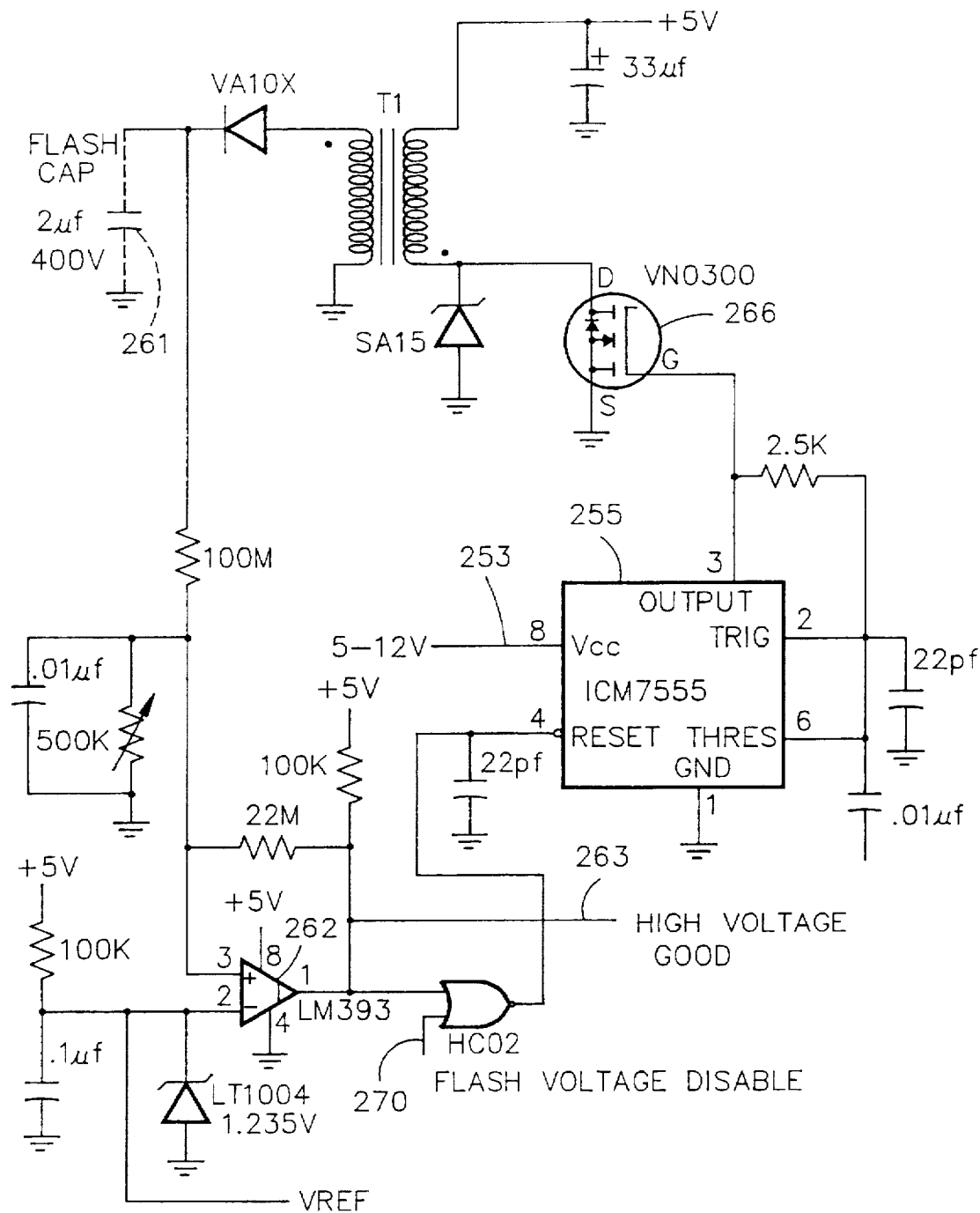
FIGS. 8 and 9 show an exemplary implementation of components 15, 16 and 17 of FIG. 1.

The voltage at line 253 is used to drive an oscillator 255 of FIG. 8 which is utilized in the present commercial instant bar code reader. Circuits suitable for implementing FIG. 7 desirably exhibit low cost, high efficiency and least number of parts.

Figure 9:
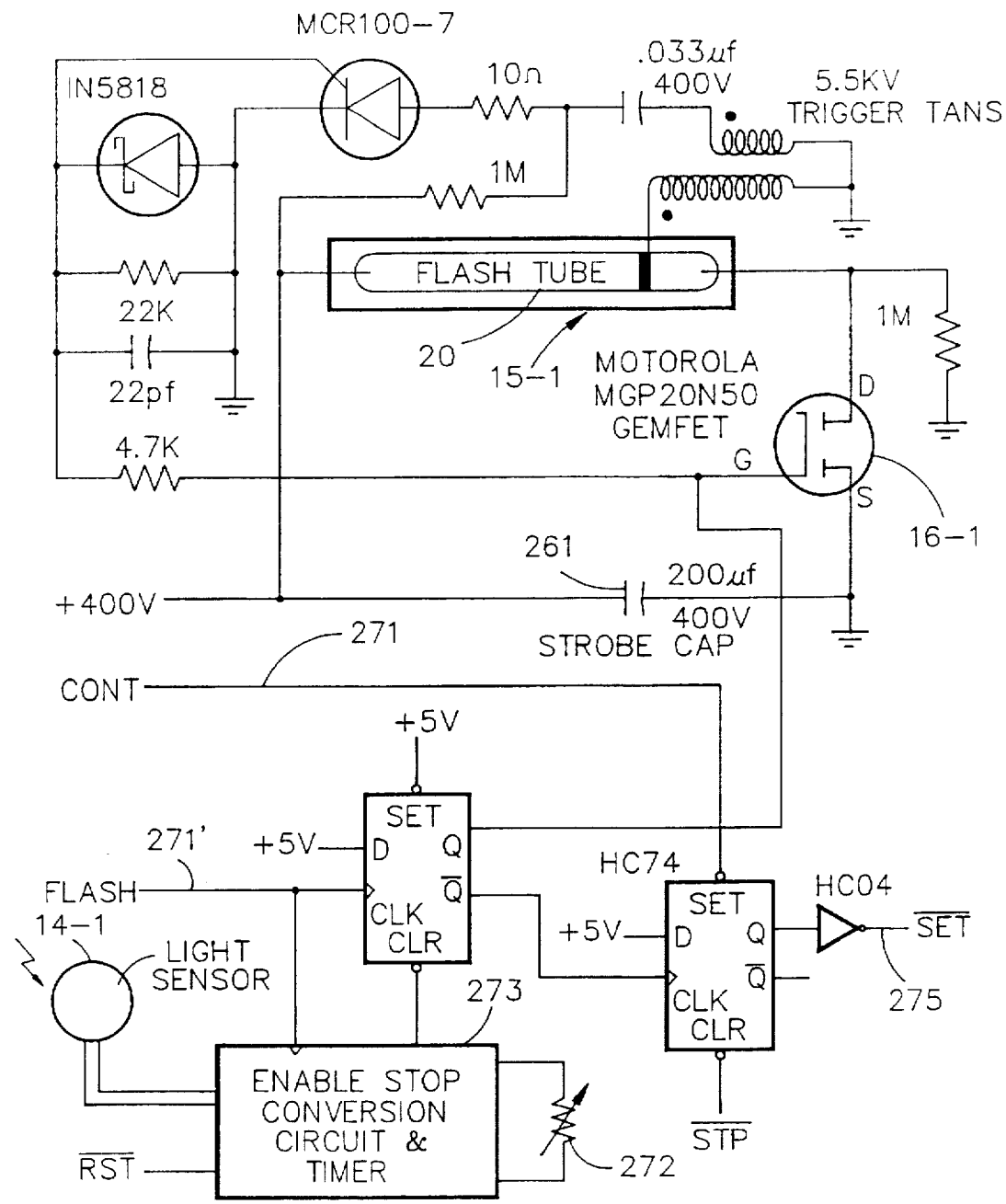

FIG. 8 illustrates a suitable high voltage generator circuit for generating approximately 300 volts for the xenon flash tube 260 illustrated in FIG. 9. The circuit shown in FIG. 8 is similar to that of the present commercial instant bar code reader. The transformer T1 of FIG. 8 uses a gapped core and is actually a transforming inductor. Magnetic energy is stored in the core on respective first half cycles, and on opposite half cycles the field collapses and generates very high secondary voltages which are used to charge the flash capacitor 261. By way of example, transformer T1 may be a Ferroxcube 1408 PA 250-3B7 with a turns ratio of forty-three to one. Transformer T1 exhibits a 100 microhenry inductance at its primary side and 185 millihenries on the secondary side. This type of circuit will continue to charge the capacitor 261 beyond its rating, if not stopped, so a comparator 262 is used to control the oscillator 255. The output of comparator 262 at 263 is a logic signal that indicates to component 10 that proper flash voltage is available. The five-twelve volt supply line 253 is used to energize oscillator 255 in the circuit of the present commercial instant bar code reader since the oscillator component 255 drives transistor 266 more efficiently when running from twelve volts. However, the flash capacitor charging circuit must also run from plus five volts. The circuit of the present commercial instant bar code reader provides a relatively high initial input current of up to two amperes during charging of capacitor 261. This only lasts a few milliseconds, but it requires the host providing power to the reader to be able to handle the high current surge. A more uniform charging current over the duration of the allowed charge time, say a relatively constant charging current of four tenths ampere over a time interval of about one hundred and fifty milliseconds would be more desirable. If it is permissible to recharge the flash capacitor only four times per second, for example, rather than ten times per second, component 10 may be programmed to control the charge rate to allow the lowest current level, for example, a charge rate of 250 milliamperes over a charging interval of 250 milliseconds could be switched on by the programming where a flash rate of four times per second would be acceptable.

Much of the flash tube illumination circuit shown in FIG. 9 is used in the present commercial version of instant bar code reader. The addition of component 16-1 corresponding to flash current interrupter switch 16, FIG. 1, is advantageous to interrupt the flash when sufficient light has been detected by the intensity sensor means 14. Without a means for interrupting the flash, the flash capacitor such as 266-1, FIG. 8, will be drained, producing additional unneeded light. Furthermore, the capacitor will have to be recharged from zero requiring that much more current and elapsed time. Thus, the use of intensity sensor means 14 and switch means 16 not only reduces the power requirement so as to increase the operational time of the system in portable applications using batteries, but also enhances the performance of the unit by enabling more rapid flashes of the illuminator means. Input 270 (FLASH VOLTAGE DISABLE) FIG. 8, and input 271 CONT and input 271' (FLASH), FIG. 9, can be controlled from component 10. Because the output of the xenon flash tube 260 is of such short duration (about twenty microseconds), processor intervention to control integration time is not practical with presently available processors.

Accordingly, FIG. 9 illustrates a light sensor means 14-1 corresponding to intensity sensor means 14, FIG. 1, as being coupled with the switch 16-1 and the illuminator means indicated generally at 15-1 by means of a hardware circuit which can be trimmed for example, as indicated by variable resistance means 272 associated with conversion circuit and timer component 273. The circuit of FIG. 9 not only causes a "set" output pulse at 275, FIG. 9, to initiate the shift sequence in the CCD component 11-1, FIG. 5, via input 275-1, FIG. 6, but also stops the flash tube by interrupting the flash tube current utilizing component 16-1, which may, for example, be a Motorola Gemfet, type MGP2ON50. Component 16-1 needs to be able to handle the forty amperes peak during discharge of capacitor 261.

Figure 10:
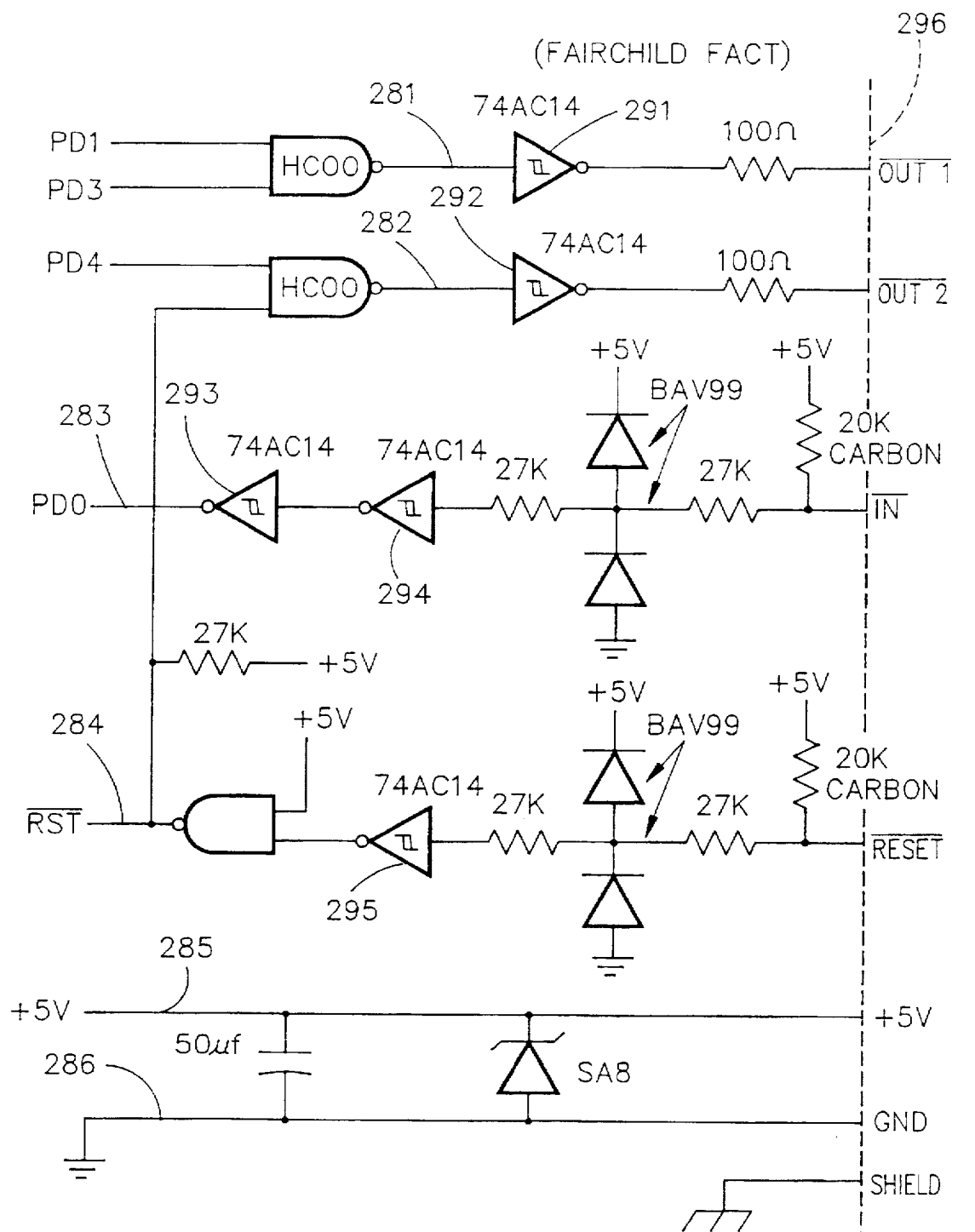
FIG. 10 is an electric circuit diagram for illustrating an exemplary implementation for component 121 in FIG. 1.

The microcontroller of component 10, FIG. 1, may be connected to host computer with a six conductor shielded, coiled cable such as indicated at 122, FIG. 1, by means of circuitry, such as shown in FIG. 10. The shield should be a braid or spiral wrapped type, but not a foil with a drain wire. Each wire should have a number of twists per inch to give it maximum flexibility. There are two lines 281 and 282 driven by the reader that can be programmed as ASYNC or SYNC data out, and two lines into the reader, a line 283 serving as a programmable serial data in line, and a line 284 dedicated as an activelow reset line. The other two lines 285 and 286 are power (plus 5 V) and signal ground.

Figure 11:
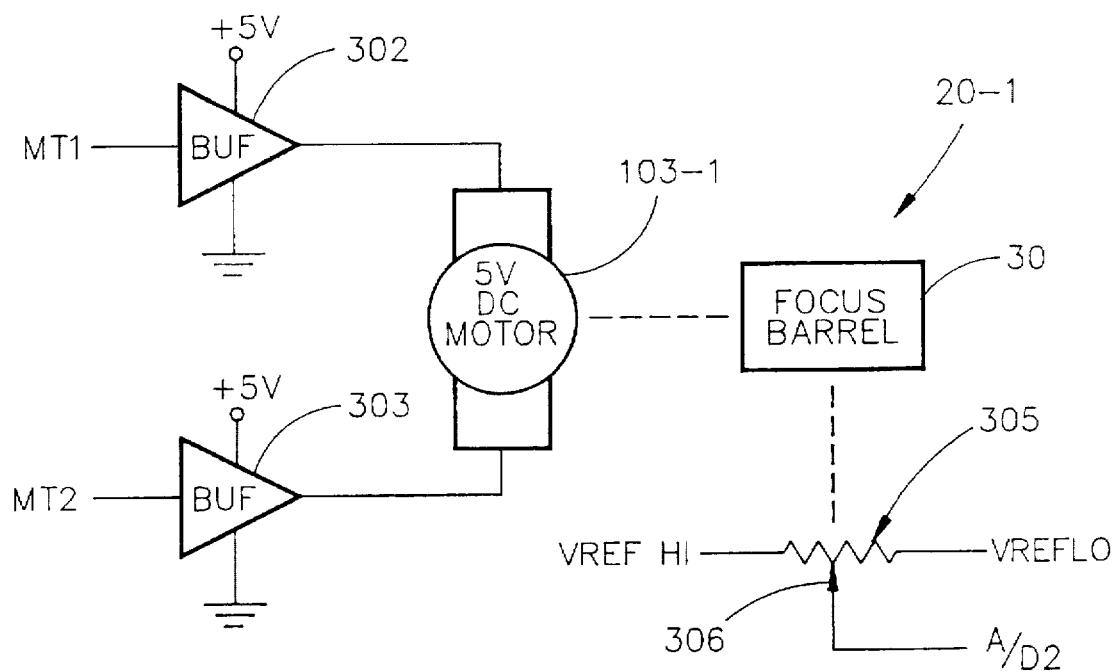
FIGS. 11 and 12 are diagrammatic illustrations for indicating an exemplary implementation of component 20 in FIG. 1.
Figure 12:
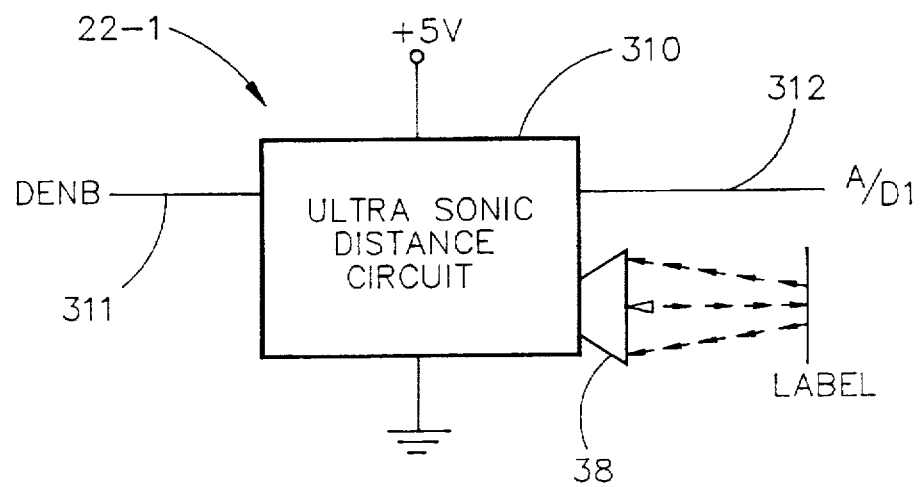

FIG. 10 shows Fairchild type 74AC14 devices as being utilized for buffer and receiver components 291-295. This component was used because of its built-in hysteresis and balanced high output drive (24 mA) capability. The various resistors and diodes are used for ESD (electrostatic discharge) protection up to 25,000 volts. A six-pin connector may be used at 296 of a style similar to that used on industrial camera cables. FIG. 11 shows an implementation 20-1 of the automatic reading distance adaptation means of FIG. 1. In FIG. 1, a DC motor 103-1 is controlled from the microcontroller of component 10 via power drivers 302 and 303. The drivers 302 and 303 are selectively energized so as to drive the motor 301 in the correct direction for improving focus. A feedback transducer 305 is shown as having a movable tap 306 mechanically coupled with the focus barrel 30 and thus being driven jointly therewith by motor 103-1 so that analog to digital converter channel A/D 2 receives a resistance value in accordance with the actual adjusted position of the optics 30. FIG. 12 shows an implementation 22-1 of reading distance sensor means 22 including an ultrasonic distance measurement circuit 310 associated with ultrasonic transducer 38. A disable line 311 (DENB) for the circuit 310 may be controlled by the microprocessor component 10 of FIG. 1, and the analog distance measurement value may be supplied via output line 312 to an analog to digital converter channel A/D 1. All parameter and calibration/conversion tables for the ultrasonic distance measurement can reside in the memory of component 10.

The audio indicator of component 120 can be driven from a frequency created by the processor of component 10, if desired. All light emitting diode indicators are controlled by the processor as indicated in FIG. 1. The switch 12 connects to a processor input pin but should be able to interrupt and wakeup the processor if the reader is in a standby/sleep mode. Label guide indicator means 21 preferably provides two indicator beams as previously described, it being conceivable to produce the two beams from a single light emitting diode which is directed initially to a partially reflecting mirror which is also partially transmissive along the length of the photosensor array 13 to a completely reflective mirror at the opposite end of the array. The marker light emitting diode or diodes are turned off during the clearing of the image sensor and the energization of the flashable illuminator means to prevent their saturating the image sensor with light and thus interfering with an accurate bar code reading.

It is desirable to maintain the largest depth of field possible (for each fixed position of lens arrangement 30) to not only allow easier and faster focusing, but also to allow focusing on uneven surfaces such as the curved bar code configuration presented by label 131 indicated in FIG. 2.

For the purpose of enlarging the depth of focus, and increasing the speed of adaptation of the reader to a given bar code configuration, the reader housing 10 may accommodate a plurality of adjustable lens means with respective overlapping depths of field so that for fixed positions of the lens means, the depth of field is greatly enlarged. Such multiple lens barrels could be adjusted simultaneously so that the lens systems in each position thereof have the total depth of field greatly enlarged. As an example, mirror 82, FIG. 3, could have an upper segment bent oppositely to the segment receiving an image at axis 64, so that a second bundle of reflected light would be directed upwardly as viewed in FIG. 3 toward a second mirror similar to a mirror 83 but with an opposite inclination so that the second image is directed rearwardly in housing 86 parallel to path 81 but above mirror 82, the second image passing through a second lens barrel similar to barrel 90 but located, for example, rearwardly of barrel 90 so as to focus on bar code images closer to the window 33, for example, than the barrel 90.

Figure 13:
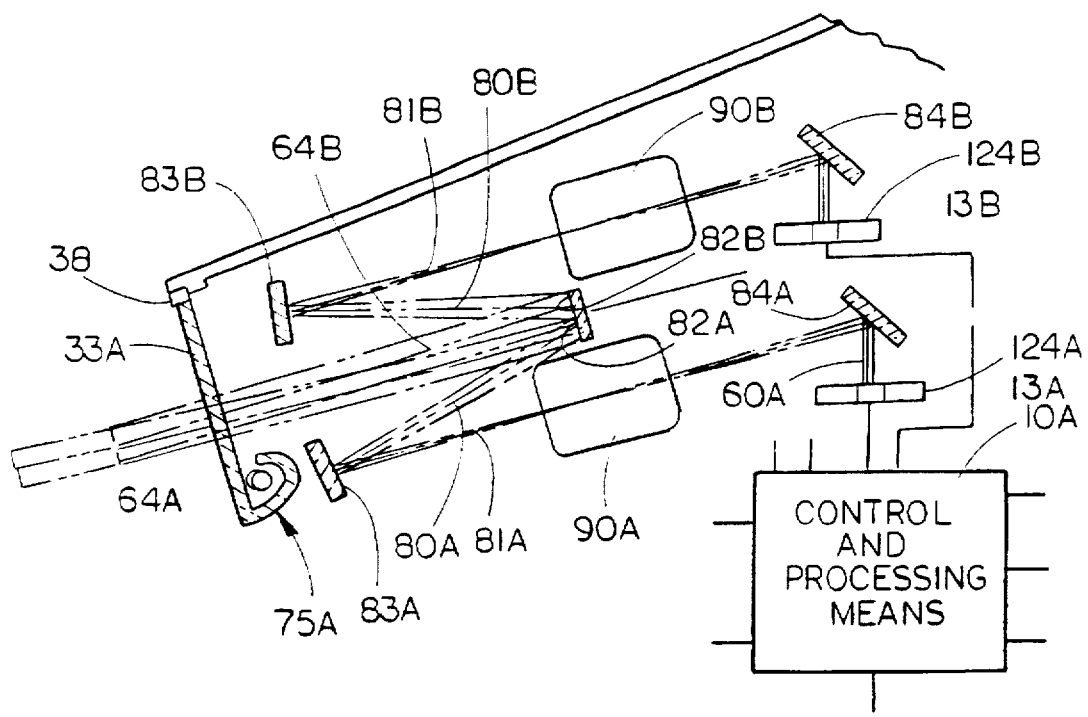
FIGS. 13 and 14 illustrate examples of alternative arrangements in accordance with the invention.

FIG. 13 diagrammatically illustrates the optical components of such an arrangement, which includes a window 33A, a flash tube housing 75A, a mirror segment 82A, a mirror 83A, a mirror 84A, a lens barrel 90A, and a sensor housing 124A, respectively, corresponding to components 33, 75, 82, 83, 84, 90, and 124 of the arrangement of FIG. 3, and providing optical axes 60A and 64A and paths 80A and 81A, respectively, corresponding to paths 60 and 64 and paths 80 and 81 of FIG. 3. The arrangement also includes an upper mirror segment 82B bent oppositely to the segment 82A and receiving an image at an axis 64B to direct light upwardly to a mirror 83B having an inclination opposite to that of the mirror 83A. A second image is directed rearwardly along an axis 81B parallel to axis 81A to pass through a second lens barrel 90B located rearwardly with respect to barrel 90A so as to focus on bar code images closer to the window 33A. One dimensional photosensor arrays 13A and 13B within sensor housing 124A and 124B are connected to control and processing means 10A.

Distance measurement means 38 may be coupled with control and processor means 10A in order to provide range information to processor 10A such that the proper focal path A or B may be selected. This may be accomplished by simply allowing the processor 10A to operatively select a particular one-dimensional array (124A, 124B).

Figure 14:
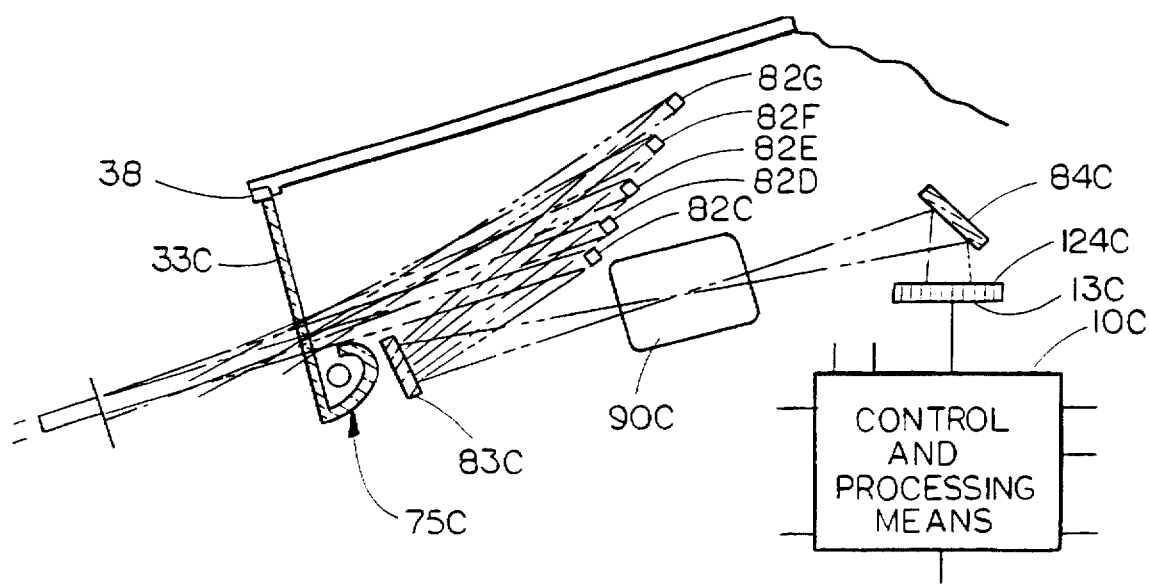

In another example, a plurality of mirrors analogous to mirror 82 could be arranged at respective different distances from the window 33, such that all of the image paths would traverse the same lens barrel 90 but then would be focused onto respective different image sensors, for example, by means of multiple mirrors analogous to mirror 84 but located at respective different distances from the center of lens barrel 90. Such a multiple image path lens system would, for example, provide paths within the reader of length greater than the length of the image path at 64, 80, 81, 60 of FIG. 3, and also optical image paths in the housing 86 of length shorter than the length of the path 64, 80, 81, 60. The various image paths together could provide the result that the depth of field for each respective image path would overlap with the depth of field of other of the image paths, so that the single lens barrel such as 90 would cover images anywhere within a range in front of a window 33 corresponding to a multiple of the depth of field provided by the image path 64, 80, 81, 60 by itself. Thus, through proper multiple mirror placement and folding of the optical image paths, a common lens barrel assembly could focus on multiple depths in front of the reader, the processor component 10 selecting the respective image sensor or image sensors from which to assemble the pixels of a complete bar code reading. FIG. 14 diagrammatically illustrates the optical components of such a multiple image path single lens system, which includes a window 33C, flash tube housing 75C, mirror 83C, mirror 84C, lens barrel 90C and sensor housing 124C, corresponding to components 33, 75, 83, 84, 90 and 124 of FIG. 3, and components 33A, 75A, 83A, 84A, 90A and 124A of FIG. 13. The system of FIG. 14 further includes a plurality of mirrors 82C, 82D, 82E, 82F and 82G at respective different distances from the window 33C, such that all image paths traverse the same lens barrel 90C, to be focused on different image sensors of an array 13C which are within a housing 124C and which are connected to control and processing means 10C operative to select the respective image sensor or image sensors from which to select the pixels of a complete bar code reading. With such a multiple image path single lens system arrangement, the lens system arrangement could remain stationary, avoiding the requirement for a motor and movable parts, and also providing for instantaneous reading of a label whose various segments came within the depth of field of one or more of the respective image paths and associated image sensors. Further, distance measurement means 38 may be coupled with control and processor means 10C in order to provide range information to processor 10C such that the proper focal path C, D, E, F, or G may be selected. This may be accomplished by simply allowing the processor 10C to operatively select a particular line 13C of the two-dimensional array 124C.

II. Description of FIGS. 15 through 44

Figure 15:
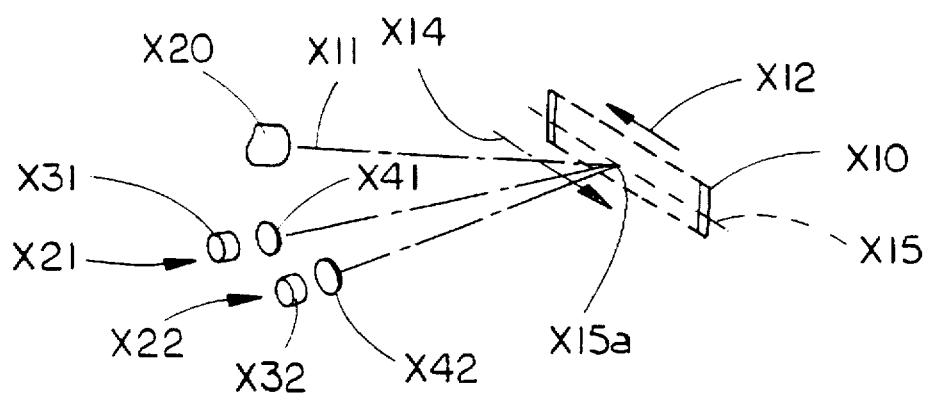
FIG. 15 is a diagrammatic illustration of a laser bar code reader system in accordance with the present invention.

FIG. 15 is intended as a generic illustration wherein scanning of a bar code label X10 takes place by relative movement between a laser beam indicated at X11 and the bar code label X10. For example, the label may be moved in a longitudinal direction as indicated by arrow X12, or the laser beam may be moved in a scanning direction such as indicated at X14 for impingement on successive points along a scanning path such as indicated at X15.

By way of example, a laser light source is indicated at X20 and respective light detectors X21 and X22 are shown for receiving reflected light produced by the beam X11 at each successive point along the scanning path X15. By way of example, detectors X21 and X22 may be fixedly secured in a housing with the laser source X20 so as to be focused at a common point such as indicated at X15a at a suitable distance from an end face of the housing. In one type of embodiment with common point focus, the label X10 may be moved longitudinally as indicated at X12 so as to effect sequential scanning of the complete bar code. In another example, the housing itself may be moved in the direction of arrow X14 so that the complete bar code is sequentially scanned. In a further example, laser light source X20 and detectors X21 and X22 may be pivotally mounted within the housing so as to jointly sweep along the scanning path X15 so as to scan a complete bar code. In another type of a scanner, the laser light source X20 is equipped with scanning means for causing the beam X11 to scan along a scanning path such as indicated at X15 at a selected distance from the housing, while detectors X21 and X22 are arranged to collect reflected light form each successive point along the scanning path X15. Alternatively, the laser light source X20 may be simultaneously illuminate the entire region X15 and the detector means X21 and X22 may be pivotally mounted to sequentially scan successive points along the region X15.

In a specific example in accordance with the present invention, detectors X21 and X22 comprise respective light sensors X31 and X32 which may be identical, and respective filters X41 and X42 which provide generally comparable response to sunlight but provide substantially different responses to the limited spectral band transmitted by the light source X20, such that an enhanced sensitivity is provided by a differential between the outputs from sensors X31 and X32.

Figure 16:
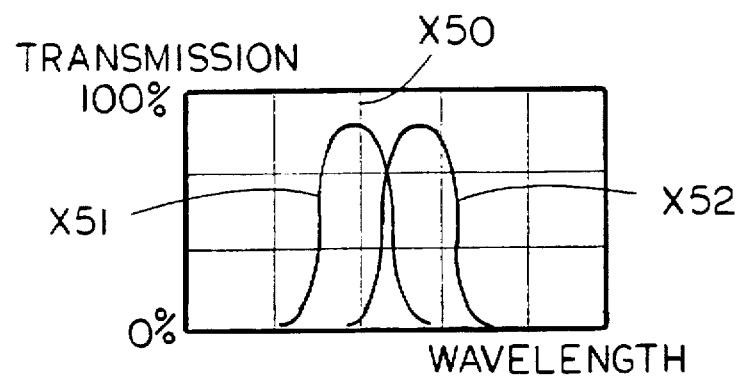
FIG. 16 is a graphical illustration for explaining one embodiment of filter means for use in FIG. 15.

In the embodiment of FIG. 16, laser light source X20 supplies a wavelength of light as indicated at X50 and the filters X41 and X42 have bandpass spectral properties as indicated at X51 and X52.

Figure 17:
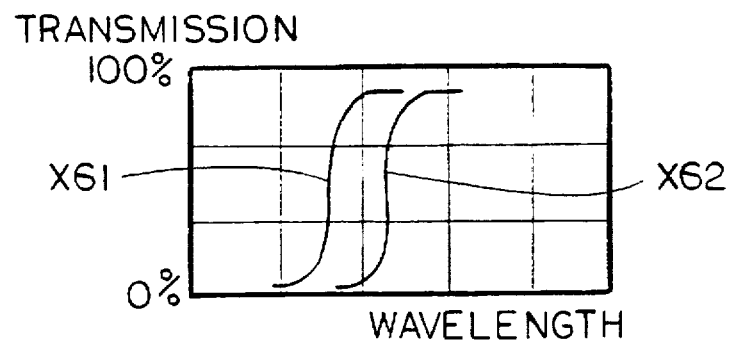
FIG. 17 illustrates another embodiment of filter means for use in FIG. 15.

In the embodiment of FIG. 17, the wavelength of the laser light source X20 is indicated at X60 and the broadband spectral transmission properties of the respective filters X41 and X42 are indicated at X61 and X62.

In each of the embodiments of FIGS. 16 and 17, the ordinate axis may represent transmission between zero percent and one hundred percent. In each case, the outputs from detectors X21 and X22 are preferably substantially balanced, that is of equal amplitude in the presence of sunlight alone, the differential in a transmission at the wavelength X50 or X60, being at least fifty percent in the examples of FIGS. 16 and 17.

Figure 18:
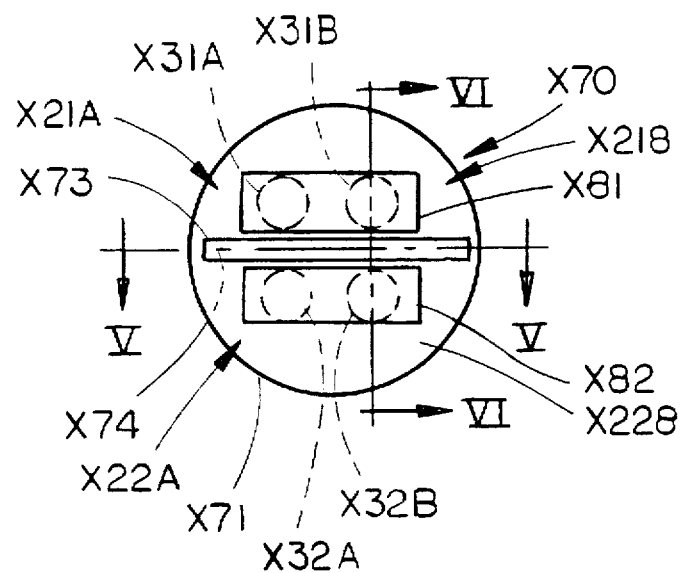
FIG. 18 is a diagrammatic end elevational view of a laser bar code scanner unit wherein the laser beam is to be swept over an extended scanning path to read a relatively wide bar code label.

In FIG. 18, there is indicated a scanner unit X70 including a housing with an end face of X71 which is arranged to confront a bar code label such as indicated at X10 in FIG. 15 at a selected distance such as three or more inches. In the indicated example of FIG. 18, the laser beam may be scanned along the length of an elongated window indicated at X73 and may effect scanning in a plane such as indicated at X74 which would include the scanning path such as indicated at X15 in FIG. 15.

In the exemplary embodiment of FIG. 18, an array of first and second light detectors is provided with the first detectors such as X21A and X21B and the second detectors such as X22A and X22B, being arranged in respective pairs such as X21A, X22A along the locus of reflected light produced by the scanning of the laser beam. For the example of two pairs as shown in FIG. 18, and for scanning of the laser beam from left to right as viewed in FIG. 18, during scanning of a left segment of the label, reflected light would predominately reach the detectors X21A and X22A. In a mid region of the label, reflected light would reach both pairs of detectors with comparable magnitude, and for a right-hand segment of the bar code label, the reflected light would predominately reach the right-hand pair of detectors X21B, X22B. For each point along the scanning path the reflected light reaching a first detector such as X21A of a pair would be of substantially equal magnitude with the reflected light reaching the second detector such as X22A of such pair.

In the specific example of FIG. 18, a common filter element X81 having spectral characteristics as indicated at X51 or X61 may cover all of the first light sensors such as X31A and X31B of the array, while a common filter element X82 having the spectral transmission properties X52 or X62 may be associated with the second light sensors of the array such as indicated at X32A and X32B. By way of example, window X73 and filter elements X81 and X82 may form part of the end face X71 of the housing of the laser bar code reader unit of FIG. 18, other portions of the end face X71 being opaque, so that light maX onlX enter or exit the housing through window X73 and filter elements X81 and X82.

Figure 19:
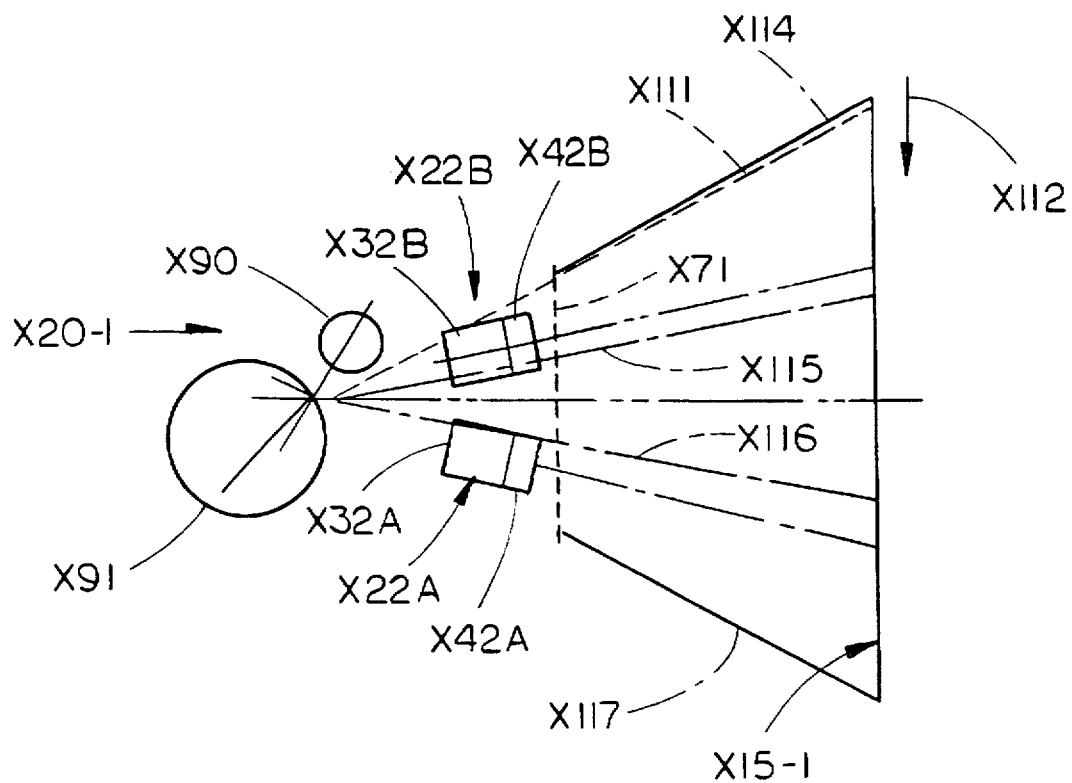
FIG. 19 is a somewhat diagrammatic view taken generally along the line V—V of FIG. 18.

In FIG. 19, laser light source means X20-1 is indicated as comprising a laser source X90 and a suitable scanner sXstem X91 which maX cause a laser beam X111 of a wavelength such as indicated at X50 or X60 to be focused at a point along the scanning path X15-1 and to scan along the path as indicated by arrow X112. For beam positions between those indicated at X114 and X115, reflected light is predominately received by the pair X21B, X22B. For beam positions between X115 and X116, comparable amplitudes of reflected light may reach both pairs X21B, X22B and X21A, X22A, while for beam positions between X116 and X117, reflected light may be predominated at the pair of detectors X21A, X22A.

In the example of FIG. 19, each detector may have an individual filter element such a filter elements X42A and X42B associated with respective second light sensors X32A and X32B. In FIG. 19, end face X71 may provide a common optical window for transmitting the laser beam X111 at a region such as X73. FIG. 18, and for admitting reflected light at regions such as indicted at X81 and X82 in FIG. 18.

As may be seen each pair of light detectors of the array, such as first and second detectors X21B and X22B are symmetrically arranged with respect to the plane X74 of the scanning laser beam so that the paths for reflected light from each point such as indicated at X121 along the scanning path X15-1 to detectors X21B and X22B are equal. As in FIG. 19, each detector is shown as comprising a sensor such as X31 B, X32B, and a filter element such as X41B, X42B with respective spectral transmission properties as indicated in FIG. 15 or FIG. 17.

Figure 20:
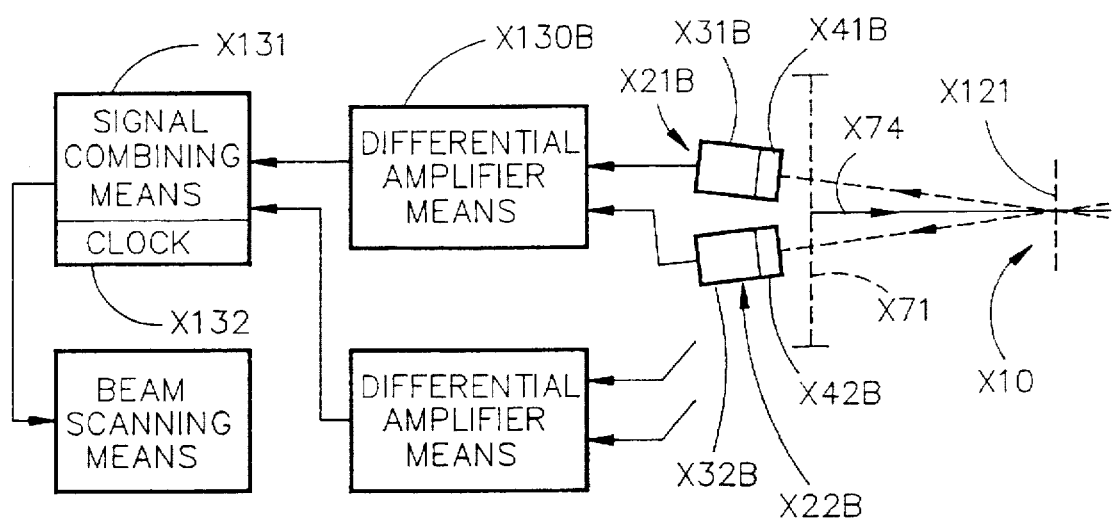
FIG. 20 is a diagrammatic view taken generally along the line VI—VI in FIG. 18 and indicating exemplary electronic circuitry for association with the swept laser beam scanner embodiment of FIGS. 18, 19 and 20.

In each of the embodiments, as indicated in FIG. 20, the output of the detector or each detector pair such as X21B, X22B may be supplied to a differential amplifier means such as indicated at X130A, X130B. The outputs of the detector pair X21A, X22A may be supplied to the differential amplifier means X130A and X130B may be suitably combined either on an analog basis or on a digital basis to provide a resultant bar code signal to be decoded. By way of example, a clock X132 may be connected with component X131, and with a beam scanner control means X133 may be constructed and operated so that component X131 can determine the position of the beam X111 with reference to the zones X114–115, X115–116, and X116–117, respectively. For example component X131 may supply pulses derived from clock pulses to component X133 to drive the scanning operation. Alternatively, beam driving pulses may be generated at component X133 and supplied also to component X131.

It is contemplated that the present embodiments will provide a more reliable bar code reading with a given laser source and under natural and supplementary lighting conditions, and further may allow the use of a lower power laser light source, with many attendant benefits such as greater safety, better adaptability to portable (battery powered) and hand-held use, less heat to dissipate, and therefore expected longer life. A differential between the outputs of detectors such as indicated at X21 and X22 will provide superior noise rejection properties in comparison to a detector such as X31 by itself. If necessary, a neutral density filter could be combined with one or the other of the filters such a X41 and X42 to balance the detector outputs under broadband illumination (e.g. sunlight).

Figure 21:
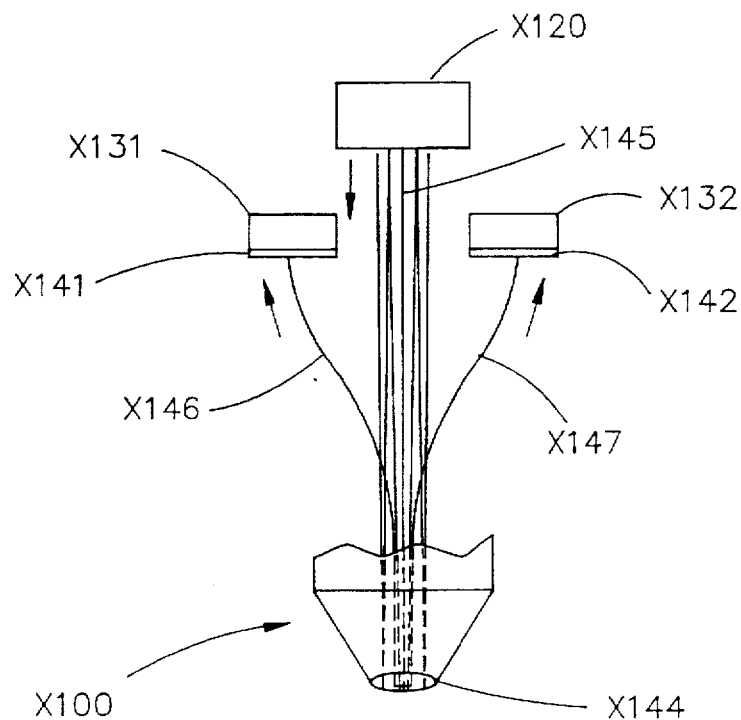
FIG. 21 illustrates a wand type optically readable information set scanner in accordance with the present invention.

FIG. 21 shows a hand-held wand type scanner X100 according to FIG. 15 or FIG. 17 wherein a light emitting diode or other narrow band light source X120 produces a band of light for example in the infrared region. In this case, wavelength X50 or X60 may be of the order of X910 manometers, and light sensors X131 and X132 may be particularly sensitive at this wavelength. According to the example of FIG. 15, filters X141 and X142 have passbands as indicated at X51 and X52 respectively, while according to the example of FIG. 17, the filters X141 and X142 have overlapping wideband characteristics as indicated at X61 and X62. In each case, the outputs of the light sensors X131 and X132 may be supplied to differential amplifier means such as X130B, FIG. 16, so as to provide a resultant output especially sensitive to a bar code scanned thereby even in the presence of ambient daylight illumination.

In one embodiment according to FIG. 21, light is transmitted from light source X120 to a light port X144 via optical fibers X145, and reflected light is transmitted via respective optical fibers such as indicated at X146 and X147 which terminate at a small-area central region of light port X144. By way of example, the reflected light transmitting fibers such as X146 and X147 may be essentially uniformly distributed at the port X144 over a central circular area which is small in comparison to the size of a minimum width bar of a bar code to be scanned, so that ambient light has less effect on resolution than where the size of the incident light spot is relied upon to define scanning resolution.

Where lenses are utilized, the reflected light is preferably collected by symmetrically arranged lenses focused at a common reflected light pickup region at the bar code for high resolution scanning of the bar code. (The pickup region may have a small diameter in comparison to a minimum bar dimension). Preferably in this case also equal amounts of reflected light are transmitted to respective photodetectors such a X131, X141 and X132, X142. Again it is preferred that the reflected light optics provide the required resolution independently of the size of the incident light spot from the light source such as X120 so that resolution is less affected by the presence of intense ambient light.

Preferably in each case the response characteristics of the detectors with respect to reflected light are so matched that the first and second light sensors such as X131 and X132 provide essentially equal signals when the light source X120 is not energized and the light port X144 is held against the bar code, for each incremental position of port X144 along the length of the bar code, even in the presence of sunlight.

Light source X120 may be a conventional light source for a wand type scanner such as a light emitting diode, or may be a laser light source.

It will be apparent that many modifications and variations may be effected without departing form the scope of the novel concepts and teachings of the present invention.
A. Description of FIG. 27

Figure 27:
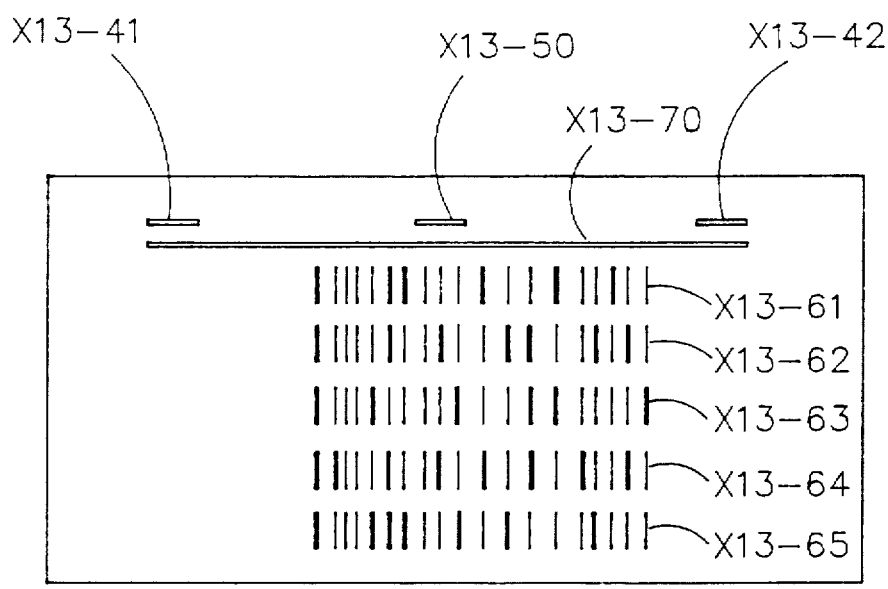
FIG. 27 is a diagrammatic illustration of a stacked bar code which may be read by the illustrated embodiments.

FIG. 27 is a diagrammatic view showing a target region for an instant bar code scanner such as a moving beam laser scanner, wherein a visible laser diode of the scanner is pulsed in synchronism with beam deflection to generate one or more visible markers in a marker beam mode.

A laser bar code scanner as shown in FIGS. 15–21 may generate marker spots such as shown at X13-41, X13-42. Laser beam scanners conventionally generate a start of scan rectangular waveform as a function of scan motor operation. The start of scan waveform corresponding to X-axis deflection can be used to momentarily turn on a visible laser diode source at the beginning and end of each high rate (X-axis) scan to product marker spots X13-41 and X13-42.

In marker beam mode it is preferred that the electronics associated with the photodetector, e.g., as indicated in FIG. 20 be deenergized, e.g., to conserve battery power where the scanner is battery powered. A momentary push button switch (such as indicated at 68 in U.S. Pat. No. 4,251,798) or the conventional trigger of pistol shaped visible laser diode scanners may produce a logical signal (e.g. zero volts or ground potential) when actuated, which signals for marker beam mode. In an initial mode before actuation of the manually operated actuator, the scanner may be deenergized. Operation of the manual actuator may establish marker beam mode for as long as the actuator is held in operated condition. In marker beam mode, the scanner mechanism is operated at a suitable rate, e.g. 36 scans per second. For scanning at distances over two feet, the rotary drive could operate at two scans per second to give brighter marker spots. The rotational speed could be slow at the beam turn-on marker intervals, and faster between marker intervals.

Where the scanner is vehicle mounted, or mounted on a manually propelled wheeled device for example, the number of horizontal lines in the scanning raster may be increased, e.g., to 240 or more. Where a complete raster is scanned quickly, or where the scanner may be otherwise held steady during scanning, the area array matrix type photosensor of FIGS. 45 and 46 may be used with a laser beam raster scanner. The laser beam may in such case be of oblong cross section with a Y-axis dimension of, e.g., 40 mils (0.040 inch) so as to cover a given height of raster with fewer horizontal scan lines. The raster may comprise interlaced fields of horizontal scan lines with the first field beginning with a top horizontal line and the second field beginning with a lowermost horizontal scan line. The brightness of the scanning beam may be controlled during scanning so as to compensate for any lack of uniformity in the sensed intensity of the image over the photosensor area, e.g., due to elapsed time between scanning of different image regions and varying label distance (e.g. due to curvature or the like). A convenient way to modulate light intensity from the laser diode is to supply a high frequency pulse train to energize the laser diode in a frequency range far above the highest information rate, and to vary such high frequency to compensate for nonuniformities (detected, e.g. by intensity sensors such as X50, X51, X52, FIG. 16 located, e.g., to receive reflected light during a first horizontal scan line above the bar code information where the sensors are activated at the marker beam intervals, and then outputs stored digitally and compared).

Figure 33:
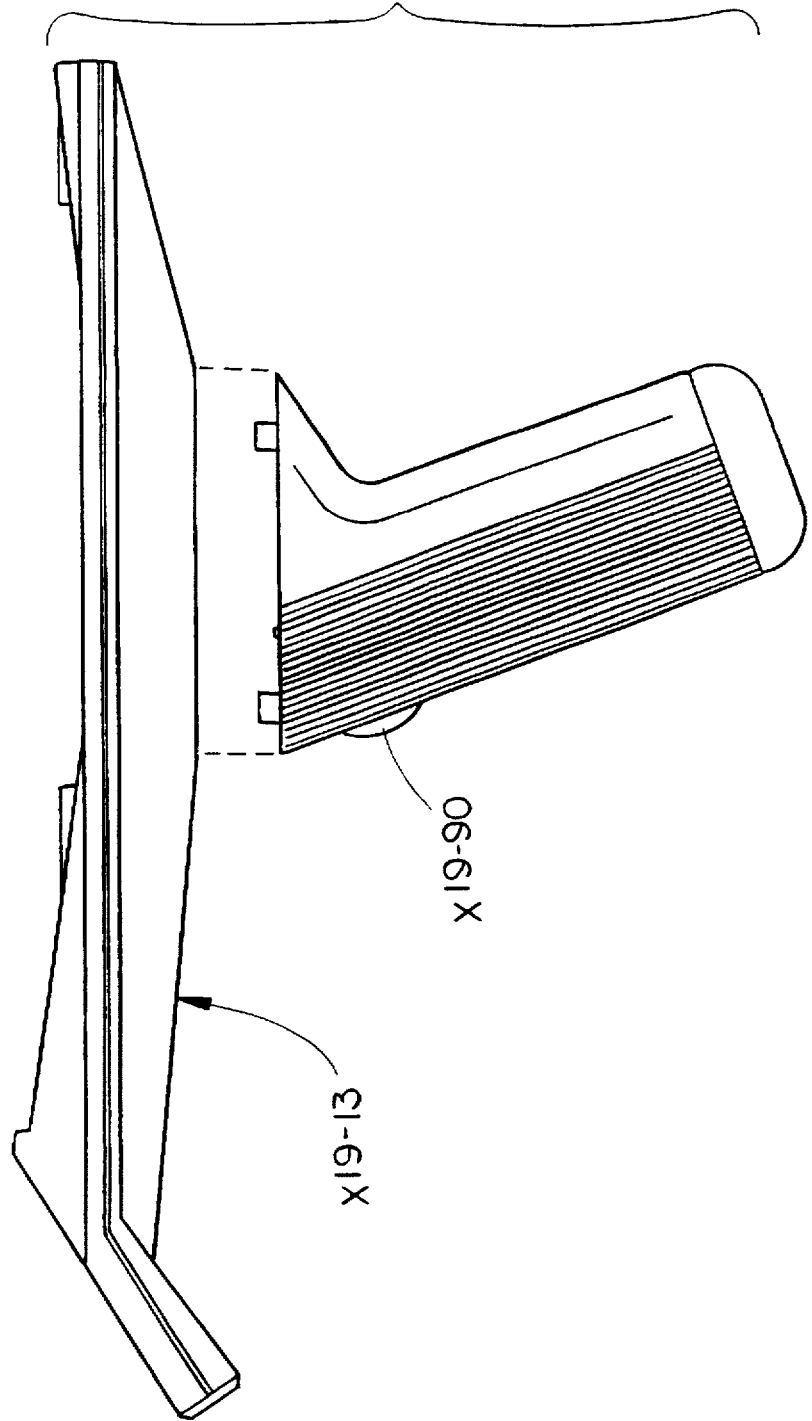
FIGS. 33 and 34 correspond with the fourteenth and fifteen figures of the PCT international application published as WO 90/16033 on Dec. 27, 1990 and which has been incorporated herein by reference.
Figure 34:
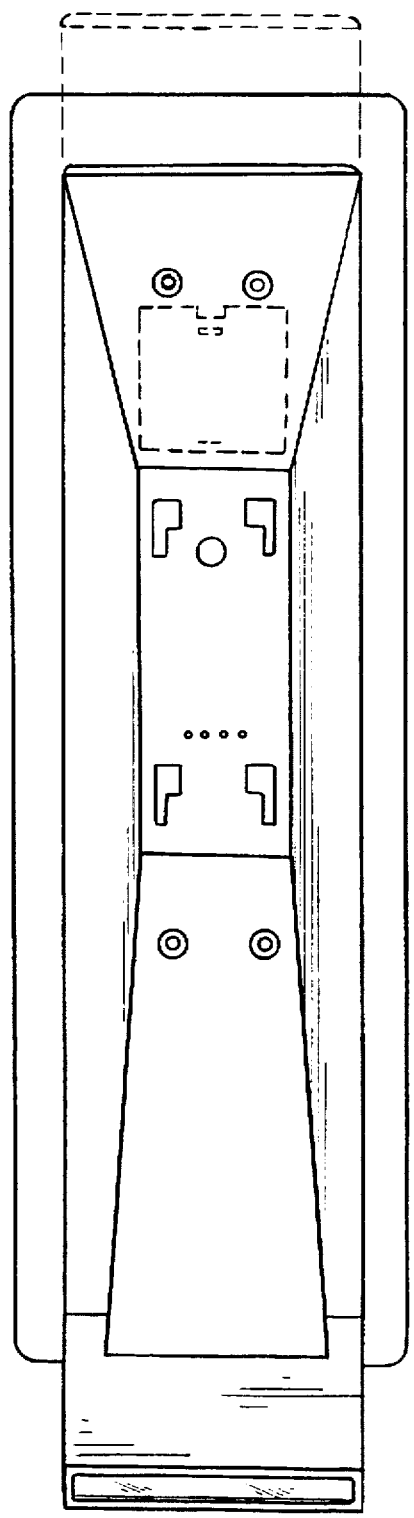
Figure 35:
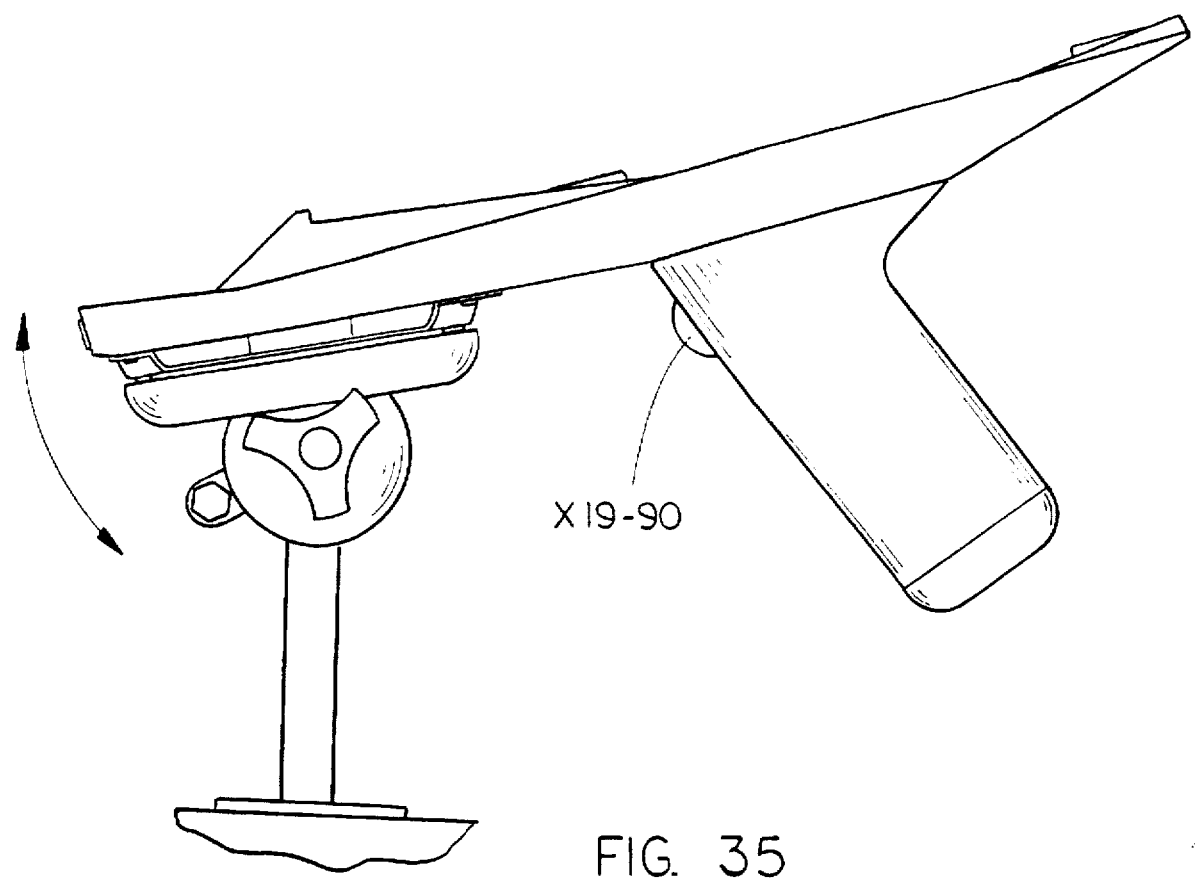
FIG. 35 shows a scanner of the type shown in FIGS. 32 and 33 mounted on a vehicle by means of a universal mount of the type shown in the eighteenth figure of the incorporated application U.S. Ser. No. 07/347,602, (such universal mount being per se covered by U.S. Pat. No. 2,898,068)

A scanner such as shown in U.S. Pat. No. 4,251,798 may have a matrix type photosensor and optical system located generally in the filter and photodetector region (58,60, FIG. 2 of U.S. Pat. No. 4,251,798). By using a laser diode source, the housing may be more compact, so as to have the configuration, e.g., of the housing of FIGS. 29 and 30. A handle may be detachably secured with the laser bar code scanner (e.g. as shown in FIG. 33), and/or the laser bar code scanner may be vehicle mounted by means of a universal mount such as shown in FIG. 35. The universal mount may be clamped to the forward part of the scanner (near reference numeral X19-13 in FIG. 29 where the handle with push button actuator (X19-90, FIG. 35) is also present. The universal mount may be of sliding friction type so as to sustain any orientation to which it is moved (e.g. by manipulation of the handle while aiming, e.g., through a view port in marker beam mode).

Where the scanner is to operate according to FIGS. 15–21, for example, the intensity of the marker spots such as X13-41 to X13-42 may be adjusted in marker beam mode by actuating one of a series of intensity selection keys located on a keyboard (such as 24, sixth figure, U.S. Pat. No. 4,251,798 or at X11A, X11B, FIGS. 36–37). The intensity selection keys may progressively increase the energizing frequency for the visible laser diode (such as X20, FIG. 15 hereof, or X90, FIG. 19 hereof).

When the actuator is released to shift from marker beam mode to symbol reading mode, the same energizing frequency may be used for the visible laser diode as was selected in marker beam mode. Thus, the laser beam will be relatively more intense in symbol reading mode where the distance to the bar code is relatively great and/or where the ambient illumination is relatively intense.

In a preferred symbol reading mode, the scanner does not revert to initial mode automatically when a single bar code line has been successfully read. In one example with a single line bar code scanner, the scanner may be manually displaced to read a stacked bar code. In this example, a beeper or other indicator will indicated a successful reading of a first line of the stacked bar code whereupon the scanner remains in symbol reading mode and the operator may manually tilt the scanner to read further lines of the stacked bar code. If desired upon each successful read, the marker spots, e.g., X13-41 and X13-42 for a single line scanner may be flashed after each reading of the same bar code line (e.g. with the photodetector electronics deenergized during such flashing) so as to indicated to the operator that the scanner is reading the same line and ignoring (not storing) the result of such reading. For example, if the scanner mirror has ten facets and is rotated at ten revolutions per second, and if after a successful read of a line the scanner performs nine scans with no new bar code number being read, on the tenth scan the photodetector electronics would be automatically deenergized and the marker spots X13-41 and X13-42 flashed. The system would then execute nine further scans with the photodetector system activated. If the further scans revealed a non-bar-code-reading condition consistent with scans occurring between bar code lines, the tenth and further scans could all be with the photodetector active. After, for example, ten consecutive non-bar-code scans, the scanner might accept a bar code reading of the same value as the last reading accepted, (the operator being informed to avoid returning to a previous read label unless such label was to be read and entered a second time).

Where the bar code scanner is progressively tilted to read a series of bar code lines, a beep or other indication will occur each time a new bar code value is registered. After a suitable number of such beeps, e.g. five, the system may be returned to initial condition, e.g. by a rapid manual operation and release of the manual actuator, or the actuator may be operated, e.g. to disable the photodetector electronics and return to marker beam mode to assist in aiming at a new symbol to be read, while conserving in power supplied to the visible laser diode and avoiding unnecessary power consumption by the photodetector electronics.

Where, for example, the scanner is supported by a sliding friction type universal mount while being manually aimed, a key may be actuated to produce only a single, e.g. central marker spot such as X13-50, FIG. 27. (This is somewhat analogous to the static PSC mode, col. 12 of U.S. Pat. No. 4,251,798, except that preferably in the present embodiment the scanner motor is operating at a desired speed, and the visible laser diode is flashed for, e.g., ten percent of each scan interval at the mid region of each start of scan half cycle). While the central marker spot X13-50 is on the background color of the bar code, e.g. just above the bar code, the marker spot may be adjusted to a suitable intensity by manual selection from a group of marker beam intensity selection keys, or the photodetector may be momentarily switched on by a separate control key to automatically adjust the energizing frequency of the visible laser diode for proper reading operation. For example, a microprocessor used for decoding may have a program for automatically effecting energizing frequency adjustment to provide a suitable photodetector output when the control key is momentarily operated to cause the marker beam to generate a central marker beam spot. The procedure could be carried further by having left and right marker beam spots as well as a central one, the control program determining proper minimum laser diode energizing frequency suitable to the three marker spot locations, or if desired determining a suitable variation of laser diode energizing frequency as a function of beam displacement to maintain essentially uniform illumination of the bar code during a subsequent symbol reading operation. As an alternative, when the actuator is released from marker beam activating position, it may be assumed that the marker spots are aimed at background, and in a first cycle with the visible laser diode energized for a complete scan (or momentarily held in three marker spot mode) the photodetector is turned on and the control program progressively adjusts laser diode energizing frequency until a suitable frequency level or frequency variation pattern is set, whereupon the decoding program is enabled, and the user may progressively scan a series of bar codes with similar background and distance from the scanner.

After completion of scanning of such a group of bar codes and return to initial mode, the adjustment procedure may be automatically repeated each time the actuator is operated to marker beam mode, and then released to symbol decode mode. At each turn off of the scanner, e.g., by quick-actuation-and-release of the actuator, the scanner may be restored to an initial condition such that any new operation of the actuator will result in a selected average energizing frequency for the laser diode energization being reestablished.

B. Summary Description of One Exemplary Embodiment According to FIG. 27

Because of the relatively low power consumed in marker beam mode, it is contemplated that a battery powered scanner may be detachably coupled to a belt-carried sliding friction type universal support, with operation essentially corresponding to that with the universal support mounted on a vehicle, e.g. a forklift truck. In each case a pistol-shaped scanner, e.g., of the single line scanning type can be aimed by manipulation of the scanner handle while observing the corresponding movement of the marker spots. With the marker spots such as X13-41, and X13-42 on the symbol background above the symbol, the manual actuator may be released to initiate an automatic adjustment of visible laser diode energizing frequency, the decode microprocessor and photodetector electronics being energized at this time. Once the photodetector is receiving adequate reflected light intensity from each of the marker spots such as X13-41, and X13-42, FIG. 27, the scanner automatically switches to symbol decoding mode and the user will see a complete scan line, e.g. X13-70. Thereupon the user gradually tilts the scanner to successively scan a series of bar code lines, e.g., of a stacked bar code symbol or other two dimensional optically readable information set. As each line (or portion) is successfully decoded, the scanner may emit a single beep. When the user has heard, e.g., five beeps, the actuator may be quickly operated and released to restore the scanner to initial deenergized mode and to reset visible laser diode energizing frequency so that it will be at a desired initial marker beam value when the scanner is again actuated to scanner beam mode. By way of example the initial marker beam frequency may be intermediate the available maximum and minimum values, and may be adjusted by a series of selection keys as previously described. In this way the need for automatic adjustment of laser diode energizing frequency at the beginning of symbol scanning mode is reduced or even eliminated.

Normally in this embodiment, the number of laser diode energizing frequencies need not be large since a major purpose in not using the maximum safe frequency at all times is to conserve battery power. Another objective of adjusting the laser diode energizing frequency would be to avoid saturation effects when reading close-in bar code sXmbols. Battery power may be coupled to the scanner through the belt mount therefor where the battery pack is supported on the belt, for example. The scanner may contain its own battery pack, e.g. in the handle, where it is to be operated detached from the belt mount in a completely hand-supported mode.

As previously described, in symbol decoding mode, a single beep is sounded for each new bar code value which is read and stored. A given value is stored only once unless there is a selected number of non-bar-code scans (e.g. ten) intervening between the last close-following reading of the given value, and the new reading of such value. The same value is registered again also whenever a different value or values are registered during intervening readings. If the scanner is left in symbol reading mode, provision may be made for returning to initial mode, if a selected number of scans are non-bar-code scans (e.g. result from the scanner being pointed at the floor or some other non-reflective or uniformly reflective target area). The scanner may also return to initial mode if the actuator is not actuated e.g. for twenty seconds regardless of how recently the scanner has registered a valid bar code reading since normally only five or so readings would be made during a given symbol reading operation. Where belt-mounted, the scanner can be automatically reset to initial mode when the belt is opened to remove it from the wearer. On a vehicle, the scanner can be deenergized when the vehicle ignition switch is off. The coupling between a scanner and a universal mount may include an automatic coupling of the scanner to a set of contacts-analogous to automatic couplings as disclosed e.g. in FIG. 38, for transmitting charging current, data signals and the like.

C. Description of FIGS. 22–25

As an example, the single line laser bar code scanner of U.S. Pat. No. 4,820,911 may be operated according to FIG. 22. This patent may be modified to utilize the teaching of FIGS. 15–21 by inserting a beam splitter X801 in place of a band pass filter (59, second figure of U.S. Pat. No. 4,820,911), with filters X802 and X803 and photodetector X804. The filters X802 and X802 may be either low pass, high pass, or band pass as discussed with reference to FIGS. 15–21. In this example photodetector X804 would be matched with photodetector X8-52 for optimum cancellation of the signal component due to ambient illumination.

As another example, the mirror facets such as X8-24 could be of dual slope, the position of X8-34 being adjusted downward, e.g., by a beam diameter to maintain a horizontal output beam axis just below center axis X805. Then a collector corresponding to X8-54, X8-52 could be arranged above the horizontal exit beam path X805 and associated with filter X803 and photodetector X804, the beam splitter X801 being omitted.

D. Description of FIGS. 23, 24, and 25

Figure 23:
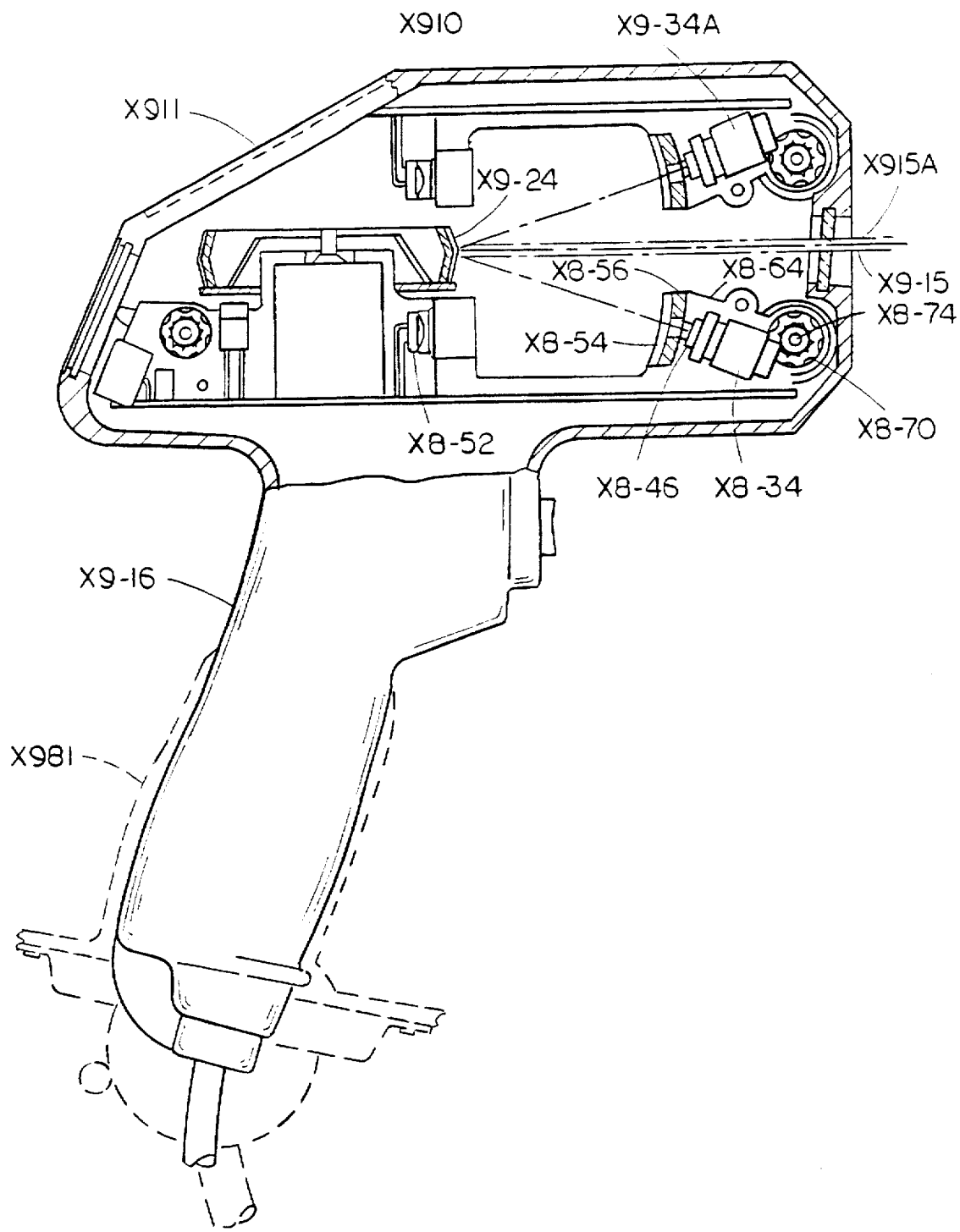
FIG. 23 is a longitudinal sectional view corresponding to FIG. 22, but indicating a duplication of parts as a mirror image with respect to a horizontal plane so that teachings according to the present invention may be applied, and for example, the beam splitter of FIG. 22 omitted.
Figure 36:
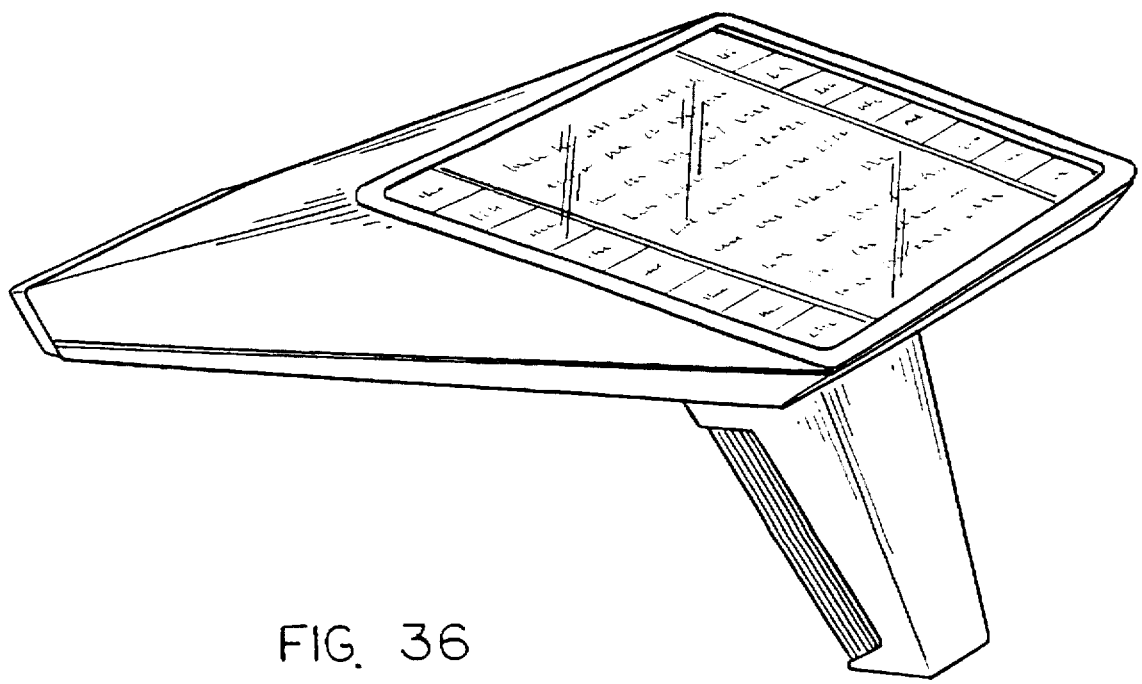
FIG. 36 is a somewhat diagrammatic perspective view of an integrated hand-held bar code processing device capable of automatic scan and data display and which may incorporate features shown in the second and third figures of incorporated application U.S. Ser. No. 07/136,097.
Figure 37:
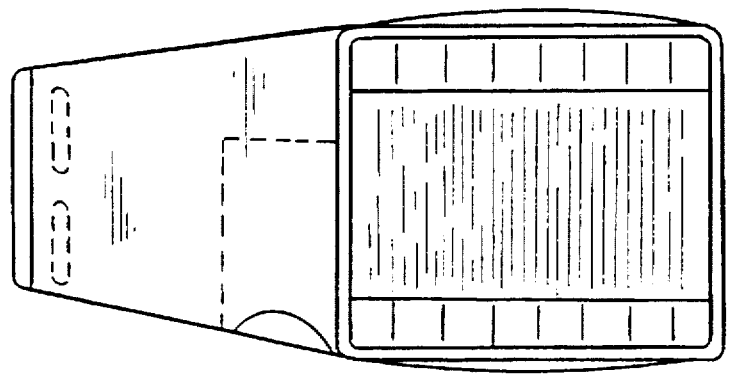
FIG. 37 is a somewhat diagrammatic top plan view of the integrated scanner and terminal device of FIG. 35.
Figure 38:
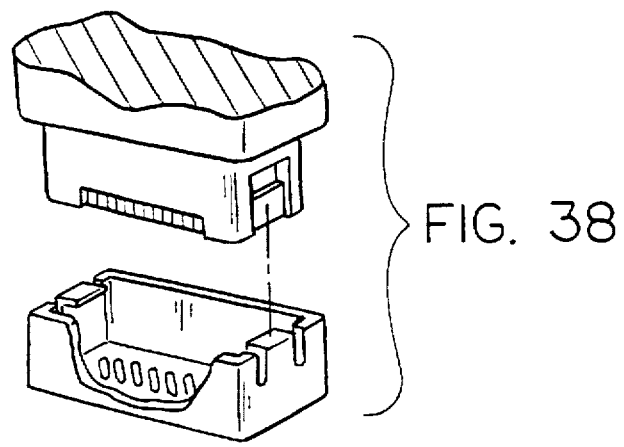
FIG. 38 illustrates a mechanical and electrical type of coupling which may be utilized for automatically coupling a scanner such as shown in FIGS. 32, 33, 34, or FIGS. 35, 36, with a universal mount such as shown in FIG. 21.
Figure 39:
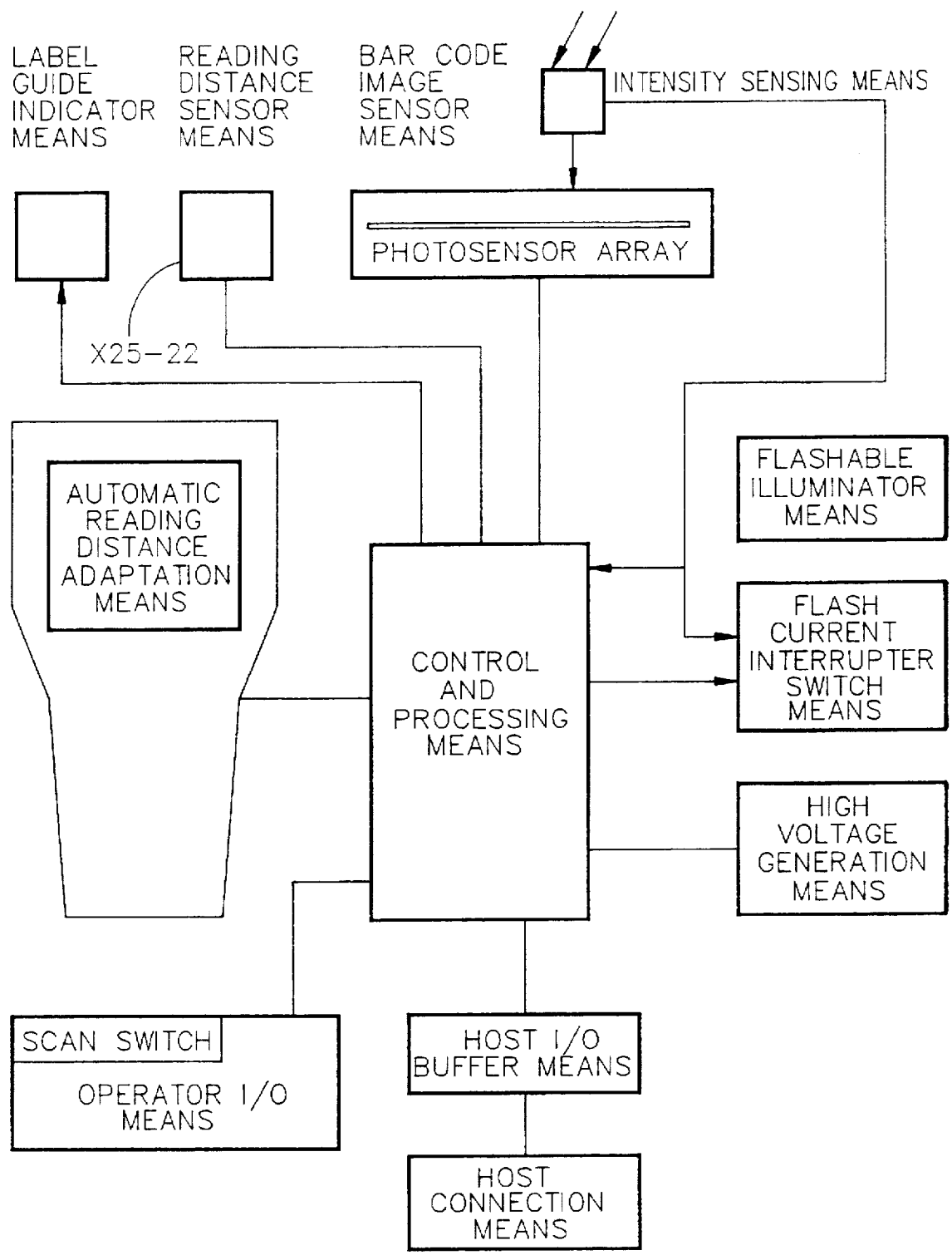
FIGS. 39 and 40 correspond with the first and twelfth figures of incorporated U.S. Pat. No. 4,877,949.
Figure 40:
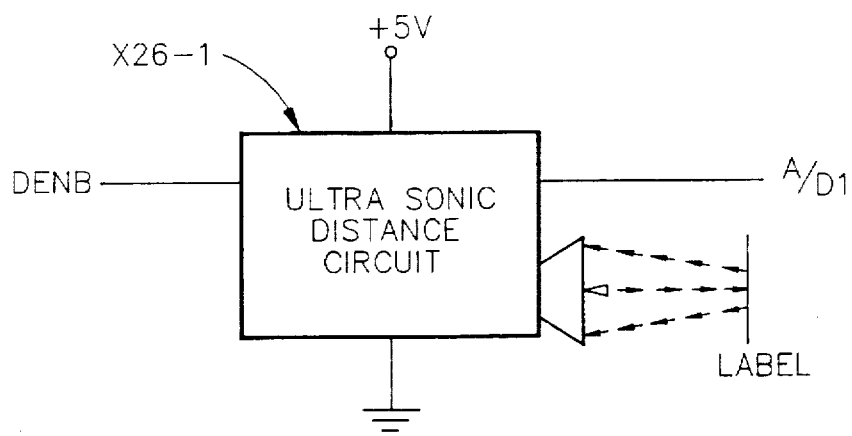

FIG. 23 shows such a mirror X9-24 with a second visible laser diode X9-34A of the same wavelength (or a different wavelength where beam splitters and two pairs of filters and photodetectors are used). The second visible laser diode is mounted in an upper section of the housing and its associated components are shown arranged as a mirror image of the lower components X8-34, X8-46, X8-54, X8-56, X8-64, X8-70, X8-74. These components could be accommodated by a housing X910 with a keyboard/display region X911 such as indicated in FIGS. 36–37.

The laser diodes X8-34 and X9-34A, FIG. 23, could be operated simultaneously in a variable frequency energizing mode, the two output beams X9-15 and X9-15A being offset, e.g., vertically to provide a double simultaneous scan line for example. The beams could have different configurations, e.g., circular and elliptical, and be activated during respective alternate scans, or the beams could be selectively activated individually, jointly, or alternately by means of manual key selection, e.g. using the scanner keyboard of FIGS. 36–37.

Where the scanner of FIG. 23 is equipped with symbol distance measurement means, e.g. actuated by a key when the marker spots from beam X9-15 and/or X9-15A are aligned with a bar code line (or using e.g. one marker beam such as X9-15 in marker mode), the distance measurement may be used to select which beam to activate, or whether to activate both beams for proximity detect mode.

FIG. 23 shows the beam pattern comprising beam spots X1015 and X015A at a reference plane indicated at X1020 for the case of two circular beams of equal diameter separated by a center to center distance approximately equal to beam diameter. With this embodiment one half-power beam could be used for close-in scanning, and an automatic distance measurement could control selection of one or two half-power beams (e.g. in a default operating status) for symbol decoding mode and/or proximity detect mode. The distance measurement could be based on time between marginal marker spots in comparison to bar code line width, or could be based on the reading distance sensor means Y25-22, FIG. 52, or X26-1, FIG. 40.

Figures 24, 25:
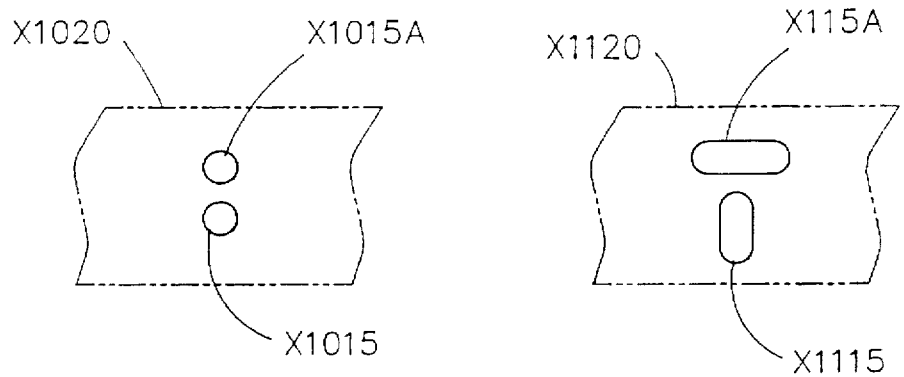
FIG. 24 shows an exemplary beam pattern at the reference plane for the embodiment of FIG. 23.
FIG. 25 shows a different exemplary beam pattern for FIG. 23.

It is also conceivable that the beams would produce respective spots X1115, X1115A as shown in FIG. 25 at a reference plane such as indicated at X1120. Here again switching between the beams could be based on a distance measurement where dense bar codes are generally in a close up range, and coarser bar codes are generally to be read at greater distances. Where half-power laser diodes are used, both the beams of FIG. 25 could be on simultaneously at relatively great throw distances at least during alternate scans or the like.

As another example, the reflector X8-54 may be mounted external to housing X8-10, for example above the housing and facing generally frontally (and without a center aperture), the parts X801–X804 and X8-52 being mounted external to the housing and forwardly of the external reflector to receive reflected light for each successive beam position along a bar code. Where reflectors such as X8-54 are positioned externally, above and below housing X8-10, elements X8-52, X802 may be forwardly of one reflector and above the housing, while components X803, X804 may be located below the housing and forwardly of a second reflector. The reflectors and associated photodetector assemblies may be mounted on an adapter which fits over the front of the housing X8-10 without obstructing window X8-48.

E. Description of FIG. 26

Figure 22:
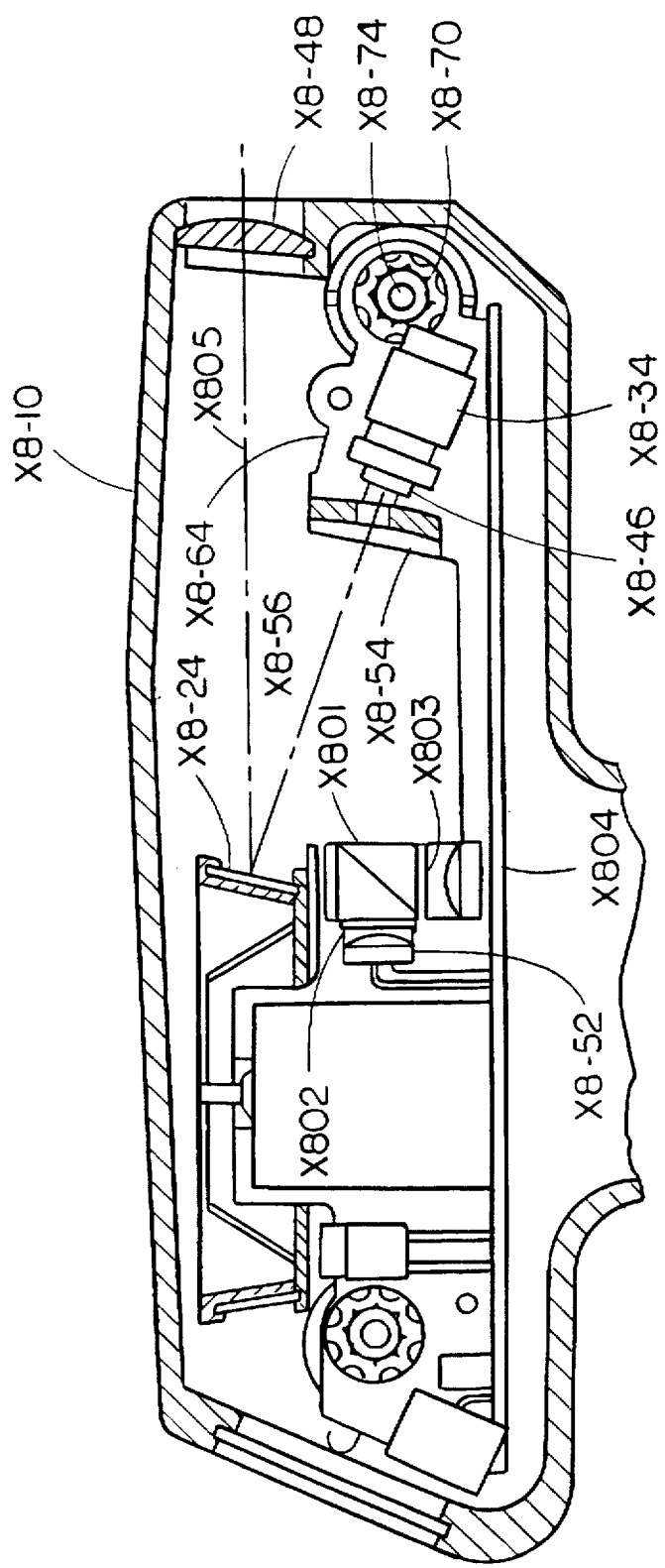
FIG. 22 is a longitudinal sectional view taken from the second figure of U.S. Pat. No. 4,820,911 issued Apr. 11, 1989, and showing a modification thereof so as to practice teachings in accordance with the present invention.
Figure 26:
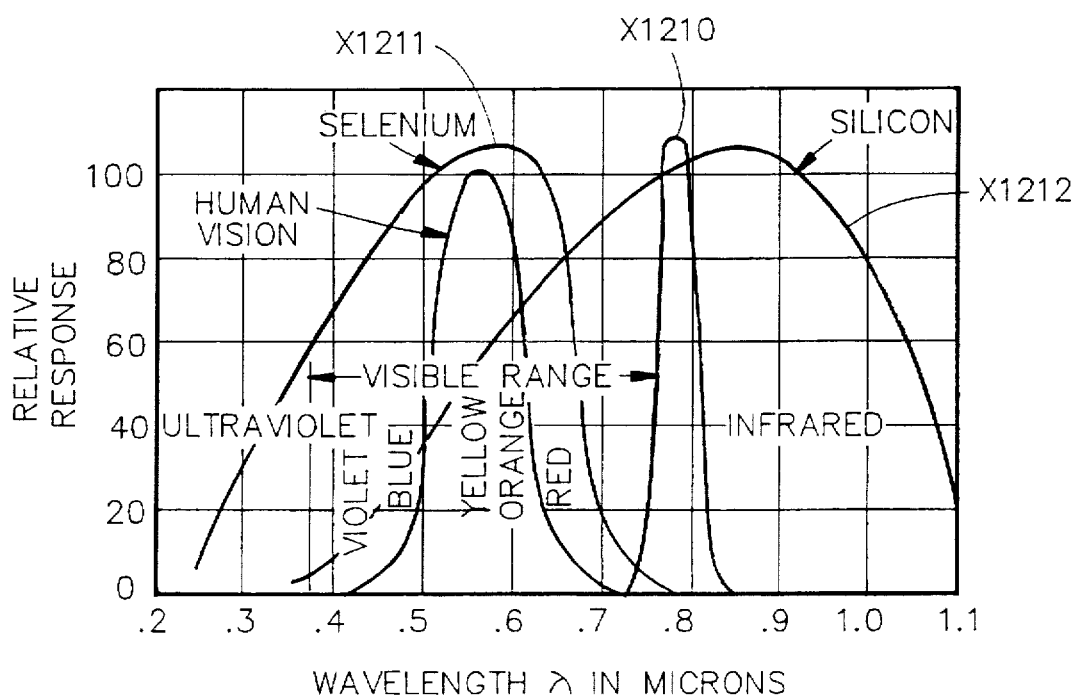
FIG. 26 shows the relative spectral response of selenium and silicon photo-voltaic materials, and inserts in the plot an exemplary light source output spectrum in the infrared region to which selenium and silicon photocells would be differentially sensitive, e.g. without the use of filters, and in addition to conventional narrow pass filters centered at the laser diode wavelength.

In FIG. 26, the output spectrum for a laser diode, e.g. in the infrared region, is indicated at X1210. Curve X1211 indicates the relative spectral response of a selenium photovoltaic material while curve X1212 is for a silicon photovoltaic material. In FIG. 22 or FIG. 23, it is possible that the filters such as X802, X803 could be omitted where the photodetectors X8-52 and X804 had respective spectral response characteristics as represented at X1211 and X1212. A similar result would be possible for a visible laser diode X8-34 operating at a wavelength of about 0.5 microns (500 nanometers).

Such an approach would also be applicable to the embodiments of FIGS. 15–20, again suggesting that filters such as X41, X42, etc. may not be essential to obtaining a substantial degree of ambient light compensation.

F. Exemplary Operation of the Embodiments of FIGS. 22–27

In a mode of operation of the embodiment of FIG. 22 or FIG. 23, alternate scans during reading operation may take place with the laser diode deenergized. The output of the photodetector system such as X8-52, X801–X804 (or 52, 59, in the second figure of U.S. Pat. No. 4,820,911) may be sampled, e.g., at a rate many times greater than the maximum information rate, and the result stored for use in modulating the intensity of the laser beam during the next scan so as to tend to compensate further vertical reticle line X14-21 which is vertical when the laser beam is scanning in a perfectly horizontal plane. It is thus apparent to the user if the beam is not scanning along a path perpendicular to the bars of the bar code. Where the scanner handle is guided by a receiving sheath such as X981 may be mechanically guided by a universal mount on a fixed support (e.g. a forklift); then it is a simple matter for the user gripping the handle X9-16 and sheath X981 to adjust the scanner so reticle X14-X21 is essentially parallel to the bars of the bar code. A center marker spot X13-50 between spots X13-41, X13-42, would facilitate visualization of the central part of the bar code through view window X14-20.

Figure 28:
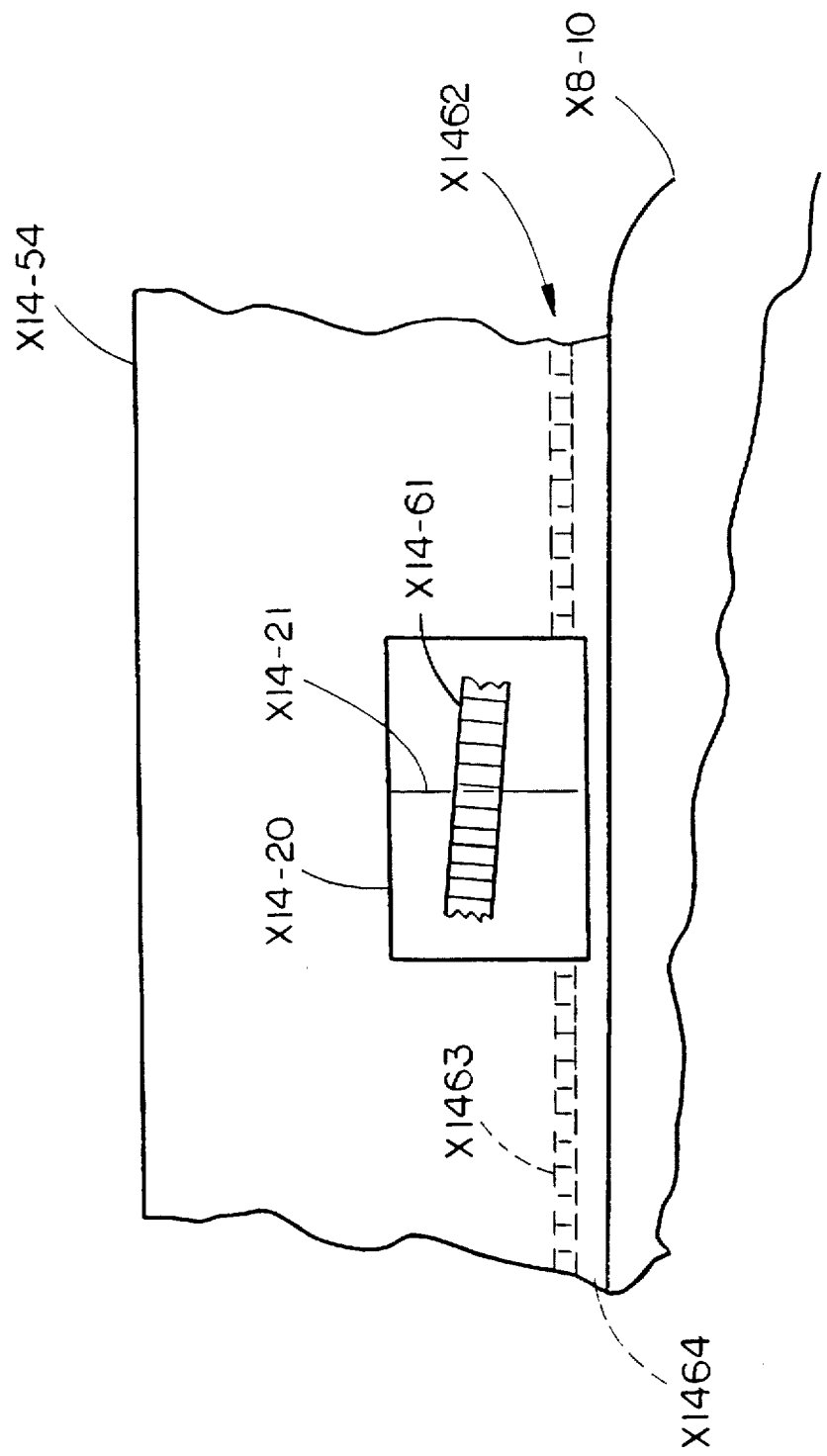
FIG. 28 is a diagrammatic partial rear elevational view showing a scanner with an external reflected light collector.

FIG. 28 indicates the use of a linear arraX X1462 of photodiode elements X1463 in front of a straight optical collector X14-54 (by way of example). A printed circuit board X1464 may carry the array or arrays and conduct the parallel outputs to suitable processing circuitry such as described with reference to FIGS. 29 and 30. For a uniformly straight reflector configuration (e.g. as represented at 76 in the third figure of incorporated U.S. Ser. No. 07/422,052, with the sensor arrays extending along the axes of elements 35, 36, the second figure), the reflector may comprise two or more straight sections (analogous to elements 35, 36 the second figure of Ser. No. 07/422,052), with cooperating straight line array sections such as 1462. Each reflector is preferably shaped for optimum efficiency at the maximum range of the scanner.

G. Description of the Embodiment of FIGS. 29 and 30

Figure 29:
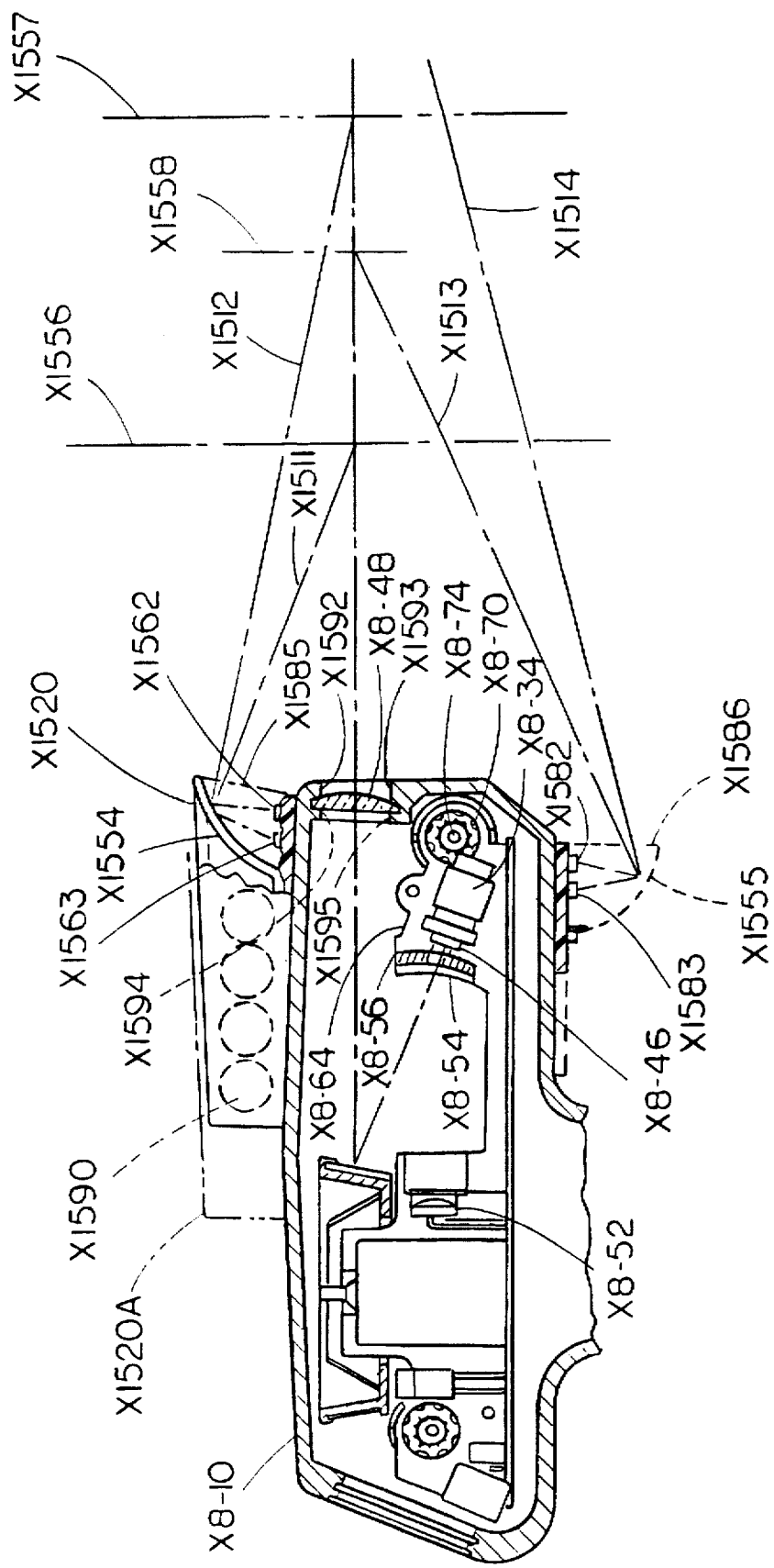
FIG. 29 is a somewhat diagrammatic partial longitudinal sectional view of the scanner of FIG. 22, with a slip-on external photodetector assembly applied to the frontal barrel portion of the scanner housing.
Figure 30:
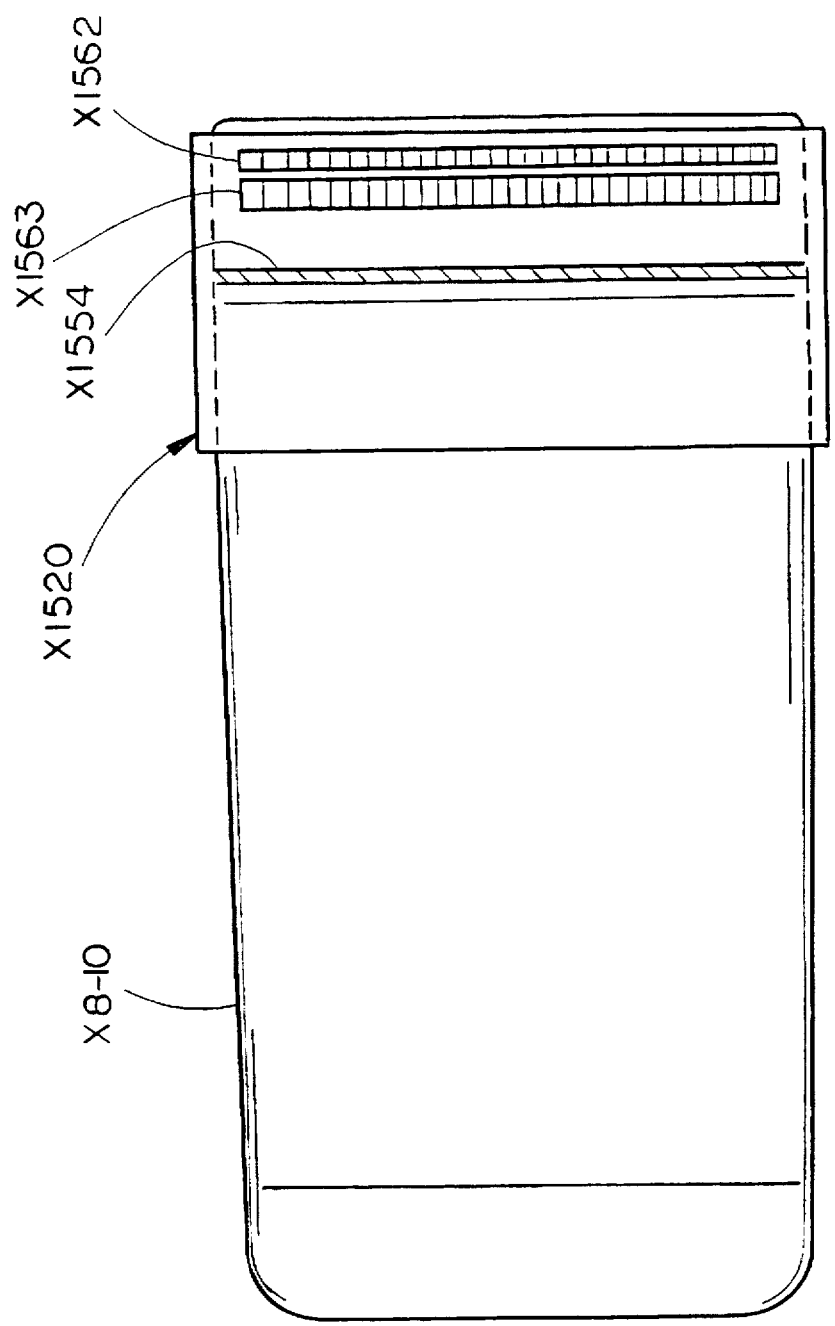
FIG. 30 is a somewhat diagrammatic horizontal sectional view of the structure of FIG. 29 for illustrating certain details of the external photodetector assembly.
Figure 31:
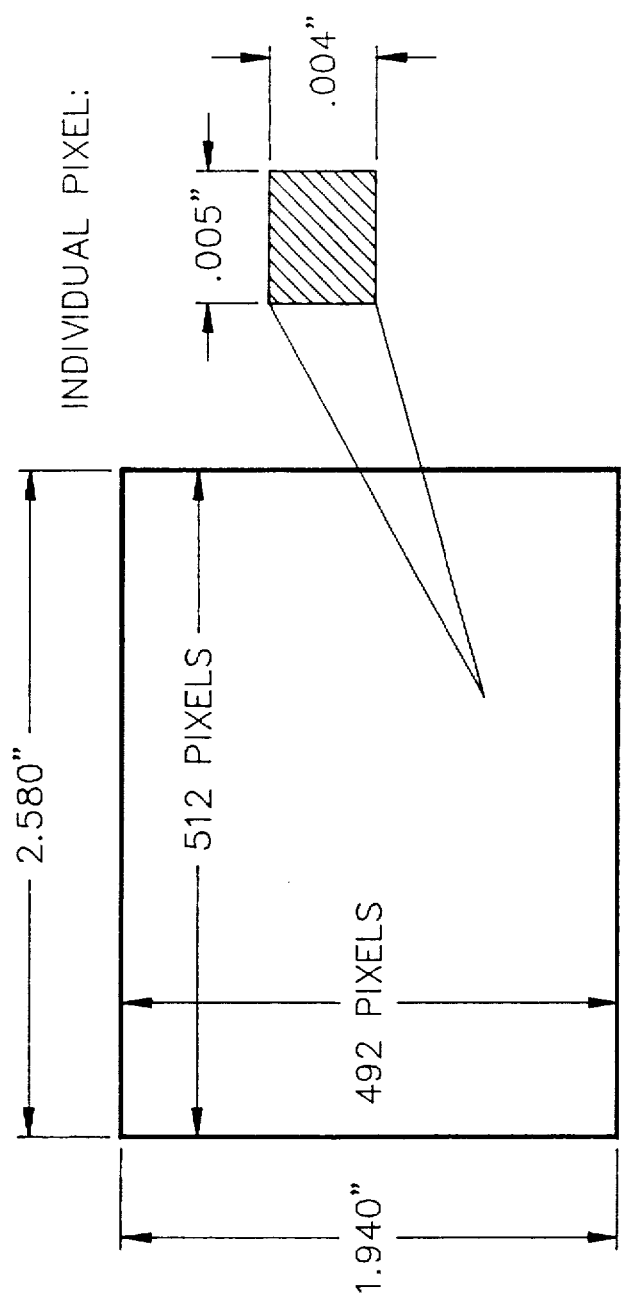
FIG. 31 is a diagram for illustrating the optical sensing area which results from the use of a typical solid state video imaging array and a lens system with a magnification ratio of ten to one, in a hand-held optical reader as disclosed in U.S. Pat. No. 5,019,699 issued May 28, 1991, and based on U.S. Ser. No. 07/238,701 which has been incorporated herein by reference.
Figure 32:
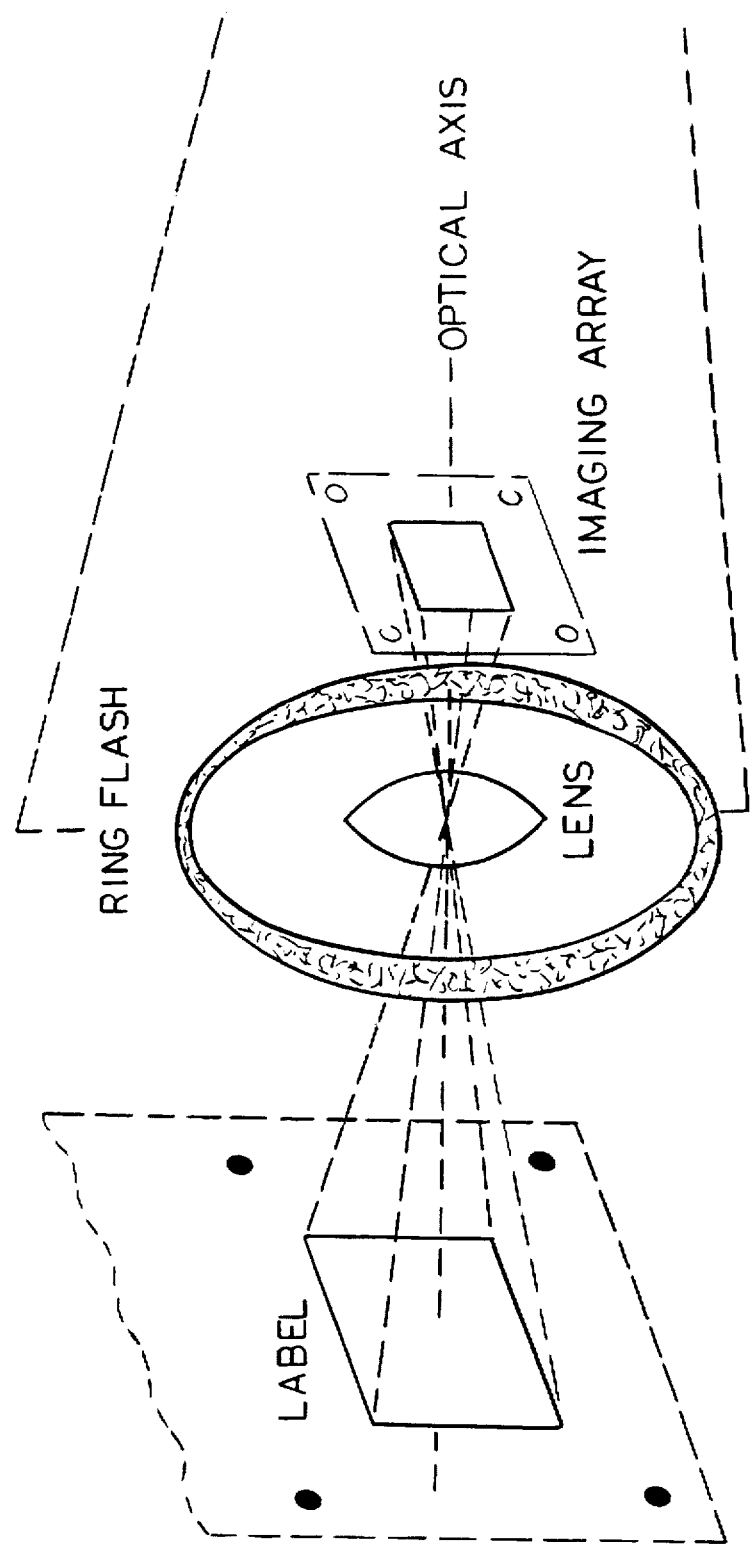
FIG. 32 is a diagrammatic illustration of a preferred form of hand-held optical reader as disclosed in the patent referenced in the preceding paragraph, and arranged so as to have its optical sensing area completely encompassing the machine-readable code (e.g. bar code) or human-readable information (e.g. line or lines of text) on a label so that a complete instantaneous optical image thereof is converted by the reader into digital image data and stored in a processor memory of the reader.

FIG. 29 is a partial longitudinal sectional view of the scanner of FIG. 22, with a slip-on external photodetector assembly X1520 applied to the frontal barrel portion of housing X8-10. FIG. 30 is somewhat diagrammatic horizontal sectional view for illustrating details of the external photodetector assembly X1520 of FIG. 29 and cooperative parts of the scanner of FIG. 22.

In FIG. 29, upper and lower straight continuous reflected light collectors X1554 and X1555 are shown, collector X1554 being designed to focus reflected light from a near reference plane X1556 at a photodiode array X1562 which may correspond identically with array X1462. Array X1562 may have a width corresponding to housing X8-10, e.g. about three inches. Reference numeral X1511 designates a ray of reflected laser light reflected from a small illuminated spot on a bar code at the near reference plane X1556.

At a further reference plane X1557, e.g. representing an optimum plane with respect to scanning of a less dense bar code a reflected light ray X1512 at the laser wavelength may impinge on a second photodetector array X1563. A reflected light ray X1513 from a bar code at an intermediate location indicated at X1558 is shown as impinging on a further photodiode array X1582, while a ray X1514 reflected from a bar code at a farther location is shown as impinging on a further photodiode array X1583.

The entrances to reflectors X1554 and X1555 may be suitably covered by material transparent to the laser wavelength as indicated at X1585, X1586.

The methods previously described may be used in addition to bandpass filters at X1585, X1586, or in places thereof. Thus the arrays X1562, X1563, and X1582, X1583 maX be covered by respective filters as represented in FIG. 16 or FIG. 17, so that the respective differential outputs from the upper and lower photodetector arrays each tends to minimize the effect of ambient light.

BatterX power X1590 can be coupled to the scanner from the subassembly X1520 via external contact bars embedded in housing X8-10 and cooperating spring fingers analogous to the fingers (632, seventeenth figure or 801, twenty-fifth figure of incorporated U.S. Ser. No. 07/347,602). In this case, photodetector output signals from detectors X1562, X1563, X1582, X1583 could also be coupled via such spring fingers and housing contracts to the interior of the scanner.

In this case, the subassembly X1520 can use its own battery power, e.g. as indicted at X1590 for supplying power to differential amplifiers and photodetectors for arrays X1562, X1563 and X1582, X1583. As another example, the difference signals can be converted to optical form e.g. at X1592, X1593 for transmission through the margins of window X8-48 to respective receives X1594, X1595.

A battery pack may be used for X1590 as described in Steven E. Koenck application for patent "Battery Including Electronic Power Saver" U.S. Ser. No. 07/433,076 filed Nov. 7, 1989, Attorney Docket No 6881.

The assembly X1520 may be longitudinally adjustable on the barrel of housing X8-10, a second position of assembly X1520 being indicated in dot dash outline at X1520A. The external contact bars embedded in housing X8-10 may be elongated to maintain engagement with the cooperating spring fingers of assembly X1520 in the various adjusted positions.

In the embodiment of FIG. 22, a single detector X8-52 may be used with a rotating filter disk serving to interpose filters such as X802 and X803 sequentially and cyclically into the reflected light path at a rate higher than the maximum information rate. The differential between respective pairs of output signals generated by the respective types of filters may be generated, e.g., by a sample-and-hold-circuit for holding a first occurring sample, so that the delayed first signal and a second occurring signal can be supplied simultaneously to a differential amplifier. The output of the differential amplifier can then be sampled during the second signal to generate a sampled bar code output signal compensated for ambient light.

H. Discussion of a Presently Preferred Scanner System with Proximity Detection

The general prior art for actuation of most CCD and laser scanners has required the use of an actuation switch or trigger to initiate operation of the scanner. This method has been used by NORAND CORPOTATION for array type readers as shown by incorporated U.S. Pat. No. 4,894,523. See also U.S. Pat. No. 4,282,425 (filed Jul. 25, 1979 and also disclosing proximity detection). Such prior art scanners depend on the operator pulling the trigger or depressing the actuation switch at the correct time, presumably when the reader is correctly positioned in front of the label. If this is the case, the reader will be activated, perform the read and automatically terminate operation quickly and efficiently and subsequently shut down to conserve power. In the case of moving beam laser scanners, it is probably more likely that the operator will press or activate the trigger to generate the reassuring "red stripe" or line and then position the reader so that the "red stripe" reading beam crosses all of the bars for a proper read. When the laser scanner is used in this way, obviously significant power is wasted operating the laser and the motor when no target is available.

It is possible to make an improvement to trigger actuated scanners by adding an electronic proximity sensor to be used either with or without a trigger switch. The idea is to use a sensor that detects the presence of something (such as a label) before the scanner is actuated. If this is used with a trigger operated scanner, the concept would be to actuate the sensor with the trigger switch, and as soon as the sensor detects the presence of a label, the scanner runs. If this is used with a scanner with no trigger, simply placing the reader in front of a label so that the sensor gets the proper indication will cause the scanner to operate. The trigger operated version would be the most power efficient and probably work best because it would include a double indication that reading should occur.

Given some combination of a trigger and a proximity sensor where the trigger causes the proximity sensor to begin operating and the successful sensing by the proximity sensor of a target label causes the scanner to operate, it may be possible to further improve the power efficiency of a scanner such s a moving beam laser type.

I. Exemplary Sensing System

Figure 41:
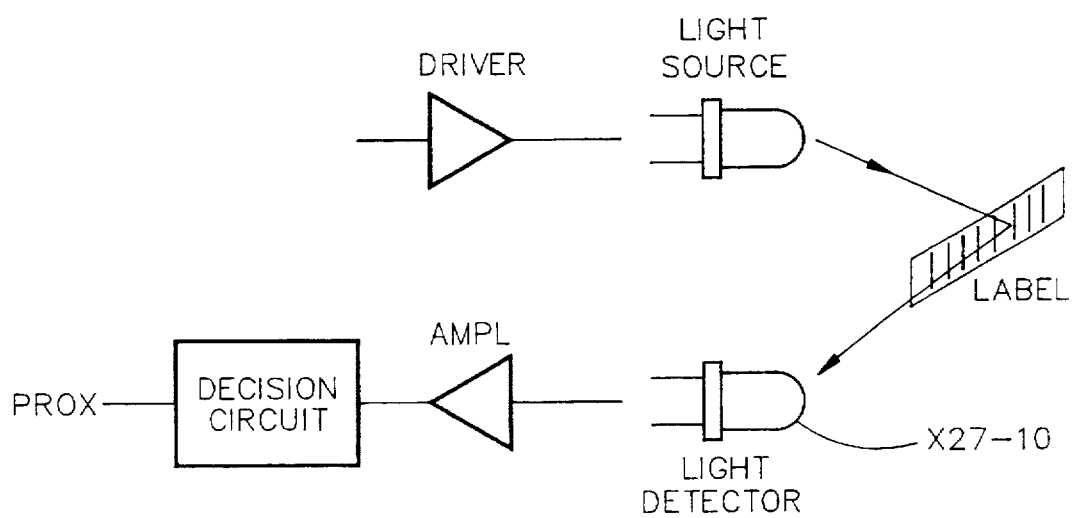
FIG. 41 is a diagrammatic illustration of a laser diode deflected beam bar code scanner such as may be employed in any of the scanner configurations disclosed herein including those of FIGS. 32–34 and 35–36.
Figure 42A:
FIGS. 42A, 42B and 42C show electrical waveforms on a common time axis for explaining an exemplary mode of operation of the laser scanner of FIG. 40.
Figure 42B:
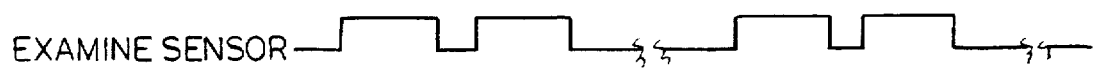
Figure 42C:
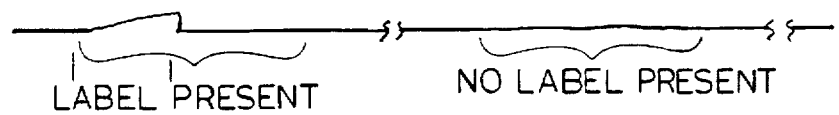
Figure 43A:
FIGS. 43A and 43B show electrical waveforms on a common time axis for illustrating operation of the laser scanner of FIG. 40 with modulated pulses of light and a tuned detector/amplifier system.
Figure 43B:

The most obvious and direct approach to sensing is to utilize the combination of a light source and light detector where a reflective label causes a signal to be received by the detector. The general arrangement is shown in FIG. 41. In the general case, proximity is determined by the level of the signal as received by the light detector X27-10. Experience has shown that this has some inherent problems such as noise, ambient light, and device offsets or errors. Several methods may be employed to improve the detection of the proximity sensed signal. One method might be to pulse the light source with a narrow, high intensity pulse and look at the detector at that time in comparison to the non-energized condition. The signal waveforms might be represented as shown in FIGS. 42A, 42B, and 42C. This method allows variation in ambient light or noise to be removed differentially as well as accounting for sensor device ad circuit variations.

Additionally, the ambient light level may be determined and optically readable information sets may be loacted by (1) taking a first reading (laser+ambient) and producing a first signal, (2) taking a second reading (ambient only) and producing a second signal, (3) producing a third signal corresponding to the value of the first signal less the second signal, and (4) comparing the fourth signal to a predetermined threshold value in order to determine whether a bar code is present and whether the scan driver should be activated.

Thus, optically readable information sets may be located and read with minimal power usage by (1) positioning the scan driver such that laser light from the laser is directed along a path generally coordinated with an aiming axis of said scanner; (2) pulsing the laser such that the laser light beam is reflected from the positioned scan driver and directed along a path generally coordinated with an aiming axis of the scanner such that the laser light beam is at least partially reflected from a potential optically readable information set; (3) reading the reflected laser light beam partially reflected from a potential optically readable information set by sensor means such that a first output signal is generated which corresponds to the first illumination level of the potential optically readable information set illuminated by both ambient light and the laser beam pulse; (4) pausing a finite period of time; (5) reading the illumination level of the potential optically readable information set a second time via the reading sensor means and generating a second output signal corresponding to the second illumination level; (6) comparing the first and second outputs such that a third output signal corresponding to the intensity of the partially reflected laser pulse is generated; and (7) activating the scan driver and the laser if the third output signal exceeds a predetermined threshold value.

In another preferred exemplary embodiment of the present invention optically readable information sets may be located and read with minimal power usage by (1) positioning the scan driver such that laser light from a laser is directed along a laser beam path generally coordinated with an aiming axis of the scanner; (2) modulating the laser light; (3) pulsing the modulated laser light such that a modulated laser light beam is reflected from the positioned scan driver and directed along a path generally coordinated with an aiming axis of the scanner such that the modulated laser light beam is at least partiallX reflected from a potential optically readable information set; (4) reading the reflected modulated laser light beam by a reading sensor and generating an output signal in response thereto; (5) filtering the output signal to remove ambient noise; and (6) activating the scan driver and the laser if the filtered signal exceeds a predetermined threshold value.

Another technique that may be used to increase the sensitivity of the emitter-detector system is to send a modulated pulse of light toward the target area and tune the detector and amplifier to that modulated signal. In essence, this is an RF-like signal processing method utilizing a narrow high gain bandpass amplifier that only responds to the known signal frequency. In this case, the filter bandpass width will determine the potential response time of the detecting mechanism. The signal waveforms might be represented as in FIGS. 43A and 43B. For purposes of implementation simplicity, the pulse modulation frequency might be 455 kHz corresponding to the low cost and widely available radio IF components such as ceramic filters and IF processing integrated circuits.

Further benefit might be realized by combining both methods including previously described pulse on/sense, pulse off/sense techniques along with the modulated pulse technique. It is possible that the combined method may be needed to provide the high sensitivity needed with relatively weak illumination.

One of the general areas of technical concern is in "timing" the sensor so it is able to discriminate between a label placed or positioned correctly for reading, and some distant or non-label object such as a distant wall or ceiling. At a minimum, the performance of a scanner product would be enhanced if reading only commenced if something that might be a label had to be detected before the high-powered reading mode was activated. In this case, the sensitivity need be such that it always reads for a label, and it might "accidentally" read for a non-label under some, but presumably not all conditions.

There is another general approach to this problem using some of the previously suggested concepts. Particularly in the case of laser scanners using VLD (visible laser diode) light sources, it is possible to pulse the VLD rapidly and detect the reflection from a target by the scanner optics. If appropriately designed control circuits are integrated into such a laser scanner, it may be possible to use the scan optics to implement the target sensing function. There would be several benefits to this approach.

1. The system would be less costly since there would not be duplication of the light source and detector components.
2. The label targeting effect would be more accurate since only a single light path would exist, rather than two or more for physically non-obstructive positioning of the additional emitting/sensing components.
3. The system would be physically smaller if no additional emitting/sensing components and signal processing circuits are needed.
4. As in the separate emitter/detector examples, this system would operate by being placed in an activated "label-seeking" mode which would cause the VLD to be activated in a low duty cycle (and hence low average current consumption) mode, and would attempt to detect a signal corresponding to the reflection from a label. Once this reflection signal is detected, the scanner would be placed in an active scanning mode similar to the typical trigger activated types.

The proximity signal processing mechanism might be either of the types described previously, or it might be processed directly through the actual scan signal processing circuits. In the "label-seeking" mode, the bandwidth of the detecting amplifier need not be nearly as high as in the active scanning mode, so bandwidth modification may be emploXed to adjust the amplifier bandwidth according to the mode in progress.

Figure 44:
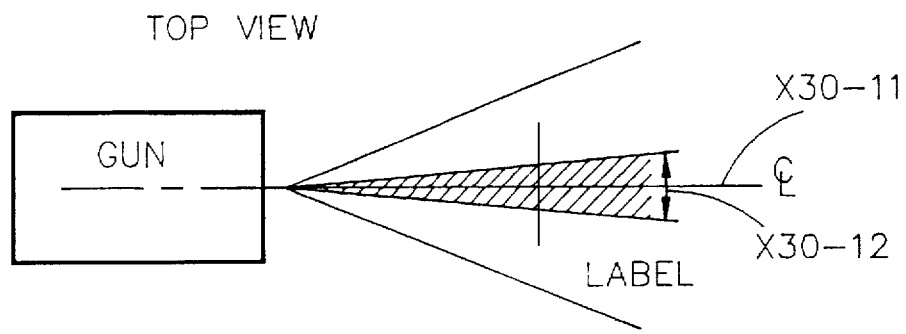
FIG. 44 is a diagrammatic plan view showing the path of deflection of the laser beam for the scanner of FIG. 40, and showing a central angular range of the laser beam path wherein the beam is to be used as a proximity sensor.

One key physical characteristic of the label sensing method is that the beam deflection system should preferably stop or rest in a position such that the emitted beam exits essentially straight forward, and not at an angle to either side as illustrated in the top view of FIG. 44. The sensor beam X30-11 may be positioned slightly off center, e.g. within the indicated crosshatched area with angular extent X30-12. If it is located far to either side, it may miss the label resulting in improper operation. Two basic beam detection methods (at least) may employ this sensing technique. The simplest method involves the vibrating mirror type with a torsion spring that hold the deflection mirror in its general centered position. Even if vibration causes the beam to move slightly, it will still generally be located with the indicated crosshatched arc.

The rotating polygon mirror deflection methods are somewhat more complex. Unless it is controlled, the motor that spins the rotating mirror will generally stop in randomly distributed locations. To cause the beam to exit straight out of the unit, some means must be provided to control the rest position of the motor. Ideally, any facet of the mirror might be used for the sensing beam, although it may be necessary to select one single facet and sequentially drive the motor in "stepper motor"-like fashion. This may be made possible by the use of a Hall-effect motor whose coils are driven in response to magnetic sensing of the rotor position. If drive circuits with sufficient intelligence are used, the motor may be sequentially driven until the exact rotational position is reached. This may require a reduced ramped-down drive speed to decelerate the rotor such that the rest position is accurately and repeatedly reached.

Other methods of stepping the rotor into a predictable position may also be employed. One might be to select an integer-related number of facets corresponding to the number of coils. By pulsing or selecting one of the drive coils, it is possible to hold the rotor in a fixed position. The magnetic poles of the motor permanent magnet may be determined by appropriately designed field/flux techniques so that its spacial position may be indicated for proper assembly in production.

J. Supplemental Discussion

Instead of using two detector-filter systems as in FIGS. 22 and 23, it is conceived that a single detector may be used if the light supplied to such single detector from the scan mirror system is alternately that represented by the respective curves X51, X52 in FIG. 16, or X61, X62, FIG. 17. Thus, with a rotary scan mirror with a plurality of facets as represented at X91, FIG. 19, or X8-24, FIG. 22, alternate faces of the scan mirror could be optically coated to reflect the respective bands such as X51, X52 or X61, X62. The electronics associated with the single detector would then digitally sample and store one scan line and differentially combine it with the corresponding successive samples of the next scan line (e.g. also converted to digital samples) to compensate for ambient light. With this arrangement in FIG. 23, single detector X8-52 could operate in this manner while beam X9-15A was off, for example, or each detector of FIG. 23, could operate individually to compensate for ambient light in its particular field of view.

Alternately, it might be possible to coat, e.g., the upper half of each mirror face X8-24, FIG. 22, and to utilize two detectors one above the other for receiving reflected light from the coated and uncoated halves of each mirror, respectively. This could also work with an oscillating mirror collecting reflected light.

It is also conceivable to use rotary facets which are transmissive as to one band of wavelengths such as X52 and reflective as to another band such as X50, with one sensor behind the active facet position, and a second sensor in front of such facet position.

III. Description of FIGS. 45–54

A. General Explanation of a Preferred Embodiment of the Invention

The biggest negatives surrounding the use of portable Optical Character Reader (OCR) systems have related to the inherent weaknesses of the available hand-held scanner technology. The purpose of the described invention is to substantially improve the performance and capabilities of hand-held OCR scanners so that this inherently convenient coding method might once again become a viable alternative for automatic identification applications.

The invention consequently seeks to eliminate the need for accurately aligning the reader with respect to the codes to be read. An OCR device in accordance with the invention would therefore desirably include a provision for instantaneously illuminating a region exterior to the reader which region contains the combination of codes or characters to be read. Thus during a single instance of illumination, the selective reflection representing relatively darker and lighter elements of the code configuration to be read may be imaged or focused with suitable optics at an interior region within the reader, the interior region being referred to also as an imaging area. An array of photosensor elements is disposed at the interior imaging area. The photosensor elements receive during that instant of illumination from any information at the exterior region a complete light image or optical image at the interior region. The instantaneous transfer of the image to the imaging area substantially eliminates risk of error due to an operator causing an inadvertent movement of the reader. A possible source of error in aiming was recognized, however. Such source of error may be minimized, if not totally eliminated, when an operator uses a marker source as provided in accordance with the invention. According to the invention it is, consequently, contemplated to identify or mark the region from which optical information would be transferred to the area array of photosensor elements or photosensor array.

As a specific example, marker beams originating from light sources at the four corners of the photosensor array may be projected via suitable optics onto a supporting surface carrying the information, such as a label, to be read. The beam of the light sources may be shaped optically, such as by non-spherical lenses associated with the light sources to linearize the mark spots impinging the surface containing the information. In the case of a marker beam of elongate, linearized cross section, the light sources need not be located at the corners of the photosensor array, though conveniently the optics for projecting and focusing the image of information onto the photosensor array may be used. The marker beams bracket the optical field of view of the photosensor array, desirably in alignment with the periphery thereof. Consequently any information, such as contained on bar code labels, within the region bounded by the marker beams is necessarily projected or focused onto the photosensor array.

Once the image is focused on the photosensor array, the output of each photosensor element may be electrically read and stored in accordance with data processing techniques. However, it needs to be pointed out that the recorded or stored image is a "raw image", as it was received during the instance of illumination. The image may contain an image of dirt spots which may have adhered to portions of a bar code, for example.

One advantage of the OCR device in accordance with the invention over traditional scanner units is that an entire area of the code has been recorded or stored. A scanner typically operates to read a line or section through a bar code, for example. A number of repeat readings may be employed to achieve an average reading. However, with a more complex unit providing for such repeated scanning operations, any movement during these repeat readings would tend to dilute the accuracy of any of the readings. Hence, in accordance with the invention, the image representing the entire information becomes fixed instantaneously with electronics of the reader. Subsequently any number of readings may be taken and verified from the fixed or stored information. Also, any data manipulation may be performed in accordance with known data processing techniques to transform the stored image to a clearly recognizable data code.

Another advantage is being realized with respect to recently developing trends in the code marking art. With increasing understanding of data processing techniques for inventory handling and merchandising operations in general, a need has emerged to pack more information into each single code combination or code cluster. Recent developments suggest replacing conventional single line bar codes with multi-line bar code patterns having a more densely packed configuration. Codes having these new configurations are generally known as "stacked bar codes." Simply stated, stacked bar codes are compressed in the direction perpendicular to the reading direction and are arranged in a multi-line stacked configuration, like a page of printed material. A number of differing standards bar codes exist, two of which are known as "Code 49" and "16K". Code 49 may consist of stacked lines or rows of code indicia two to eight rows high, while the 16K code may use stacked rows of code indicia between two and sixteen rows high.

It is understandable that with conventional code scanners, reading scanned codes at angles other than perfect alignment with the linear arrangement of the codes may present code recognition problems. Of course, if less than the entire code information is recognized, the entire code is typically indicated as not having been read, so that a re-read cycle must be initiated. Since valuable time may be lost by repeating reading operations, it is of course desirable to recognize the code. Since a code may also not have been recognized because of a lateral shift of the active area of the scanner away from the label configuration, either the angular misalignment or a lateral shift may be a cause for non-recognition of the code.

It is apparent that the current invention is particularly advantageous for reading the described "stacked bar codes" as well as other information. The referred to marker beams are able to indicate or show when the entire code pattern is within the region from which an image of the code pattern can be transferred to the photosensor array. Hence, a major source of error is eliminated. Secondly, the instantaneous focusing of the information on the photosensor array reduces the risk of error caused by inadvertent movement of the reader during a prolonged process. Thirdly, since typical data processing techniques permit the code to be aligned electronically after it has become stored in the reader, critical alignment requirements are no longer needed for information to be read from the stored code image.

Initial processing of the image is a normalization process which sometimes also may be referred to as "calibration" during which the orientation of the image may be recognized and during which blemishes, such as dirt spots, may be recognized and image electronically reoriented and blemishes neutralized in accordance with known data processing techniques. The stored image may then be read by the reader and the information may be transferred to desired electronic data banks.

Figure 45:
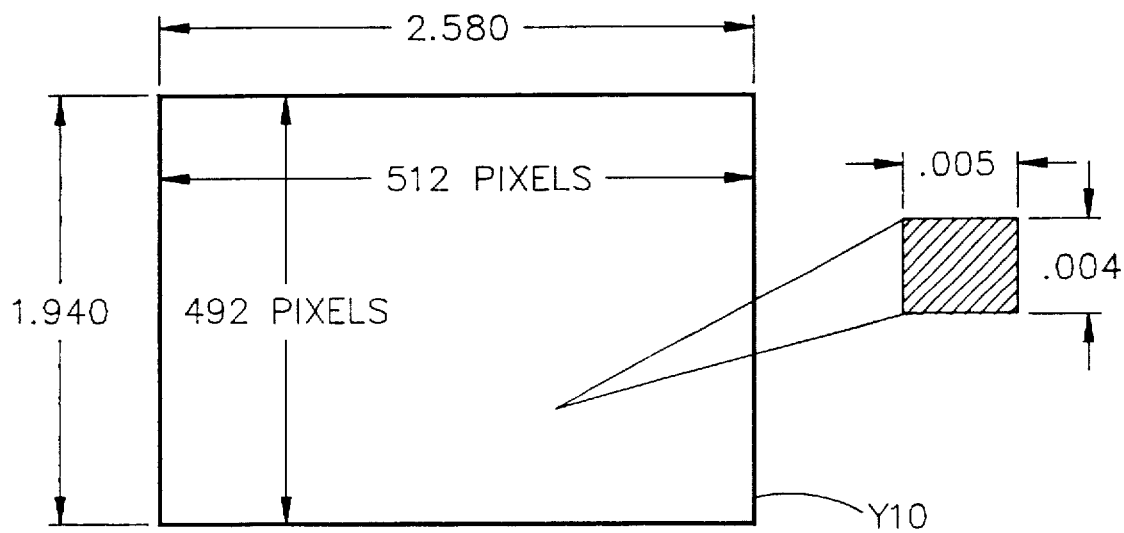
FIG. 45 is a diagram for illustrating the optical sensing area as is defined by a field of view of a lens system, such as from the use of a typical solid state video imaging array and a lens system with a magnification ratio of ten to one, in a hand-held optical reader in accordance with the present invention.

In FIG. 45, an optical sensing area is delineated which represents the result of the use of a typical solid state video imaging array with a lens system that provides a magnification ratio of ten to one. The resultant active area is 2.58 inches×1.94 inches as indicated.

Figure 46:
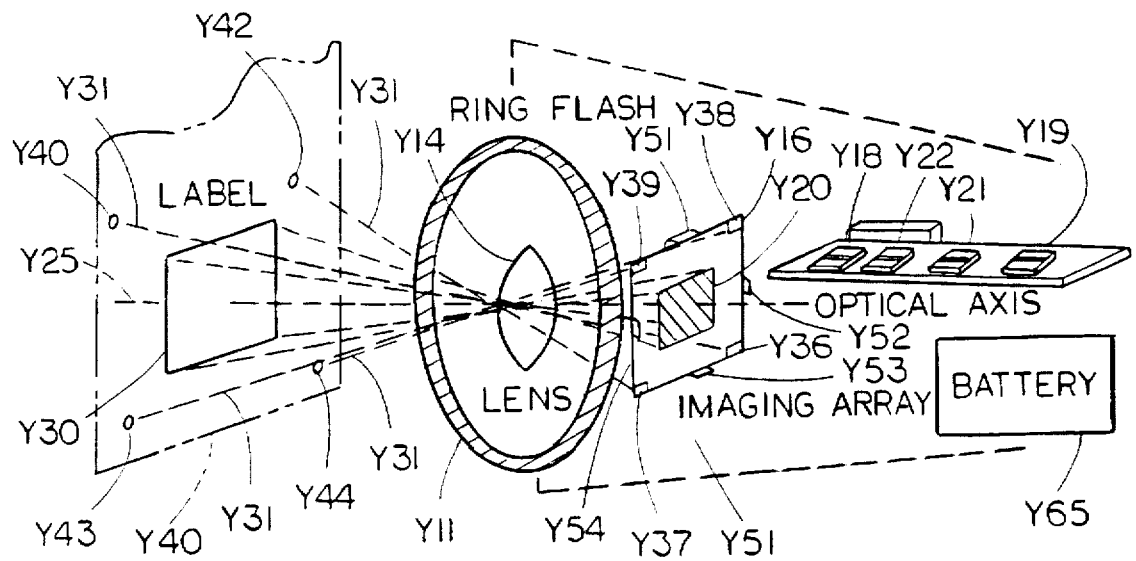
FIG. 46 is a diagrammatic illustration of a preferred form of a hand-held optical reader according to the present invention, arranged so as to have its optical sensing area or field of view completely encompassing the machine-readable code (e.g. bar code) or human-readable information (e.g. line or lines of text) on a label so that a complete instantaneous optical image thereof is projected onto an area array of photosensors within the reader and may be converted by the reader into digital image data and stored in a processor memory of the reader.

FIG. 46 shows a diagrammatic view of an optical system that incorporates the components described. The ring flash is a preferred light source for its ability to provide relatively uniform illumination with minimum backscatter into the imaging device. Also it may be "wrapped" around the lens, as shown, providing a compact, efficient package. The imaging array may be placed directly in line with the optical axis of the reader, so that the optical portion of a hand-held reader can be quite compact.

Operation of the reader consists of the user "aiming" at the target label and activating a switch to initiate the read. The flashtube is effective to provide an essentially instantaneous illumination, so movement of the hand-held reader during this time is noncritical. The digital processor immediately begins clocking the imaging array to read its contents which correspond to the intensity of the light from the active sensing area that was focused on the imaging array. The actual output of the imaging array is normally an analog signal. Since only white or dark information is needed, the conversion decision may consist of a comparator circuit with appropriately selected bandwidth and hysteresis to correspond to the characteristics of the imaging circuit output.

The digital information is assembled into sixteen bit data words corresponding to the word length of the digital processor and stored directly into the processor memory array. An entire image may consist of 492 lines of 512 samples each for a total 251,904 bits or 31,488 bytes of information, as illustrated in FIG. 45. Once the image acquisition process is complete, the digital processor may then begin operating on the image information to remove blemish and noise components, rotate the image to a normalized position, correct for optical skew due to curvature of the target label or reading from an off-axis angle, and the like, to optimize the pattern recognition process. An important feature of the described system is the ability of the digital processor to detect during such discussed normalization the locations of blemishes or flaws in the image sensing array and to store those locations in a non-volatile memory so that flawed image data may be masked or compensated to remove such errors from consideration in the recognition algorithms.

When image normalization is complete, the recognition process may then begin. The first level of recognition is to determine whether the coded information is a bar code or a line of characters, for example. If a bar code is recognized, standard bar code decode algorithms may be employed. If a character format is recognized, then a character recognition algorithm is invoked.

The digital processor employed for the image normalization, processing and recognition functions must be extremely fast and efficient for acceptable user satisfaction. A processor such as the Texas Instruments TMS320C25 type which is designed for digital signal processing applications has the ability to address external program and data memory, perform bit and word manipulations and has extremely fast execution speeds while operating with acceptable power consumption levels for a portable hand-held unit.

B. Specific Explanation of a Preferred Embodiment (Referring by Reference Numerals to the Diagrammatic Illustrations of the Drawings).

Referring first generally to FIG. 46, there is illustrated somewhat schematically a hand-held area type optical reader. The reader, which may also be referred to as an improved Optical Character Reader ("OCR") device, represents an embodiment according to the present invention. The reader, as will be explained is capable of reading all the characters, bar codes or other information at an optical sensing area such as indicated at Y10 in FIG. 45, essentially instantaneously. The area Y10 to be read may be illuminated by light from a ring-type illuminator Y11, preferably a xenon flash tube. The reader shown schematically as a hand-held scanner unit Y12, indicated by dash lines, may house the light source Y11 and suitable optics, such as a lens Y14. The optics Y14 include a focal plane at an interior region Y15 of the scanner unit or reader Y12. A solid state area type photosensor array such as indicated at Y16 is disposed in the focal plane defined by the interior region Y15. The photosensor array Y16 is comprised of a plurality of photosensor elements arranged in an area corresponding in the sensing area 10 externally of the reader Y12 to respective pixels, such as at Y17, FIG. 45. The individual photosensor elements or pixels in the area array of photosensor elements or photosensor array 16 may have a density, such as in typical video cameras. Thus, the sensing area 10, as an external projection of the photosensor array Y16, is enlarged with respect to the photosensor array Y16 in accordance with a magnification ratio, such as ten to one, of optics of such video cameras. However, even with such enlargement of the sensing area Y10, the number of pixels Y17 illustrated in FIG. 45 provide a resolution of individual pixel of 0.004 inch by 0.005 inch (four mils high by five mils wide).

Figure 49:
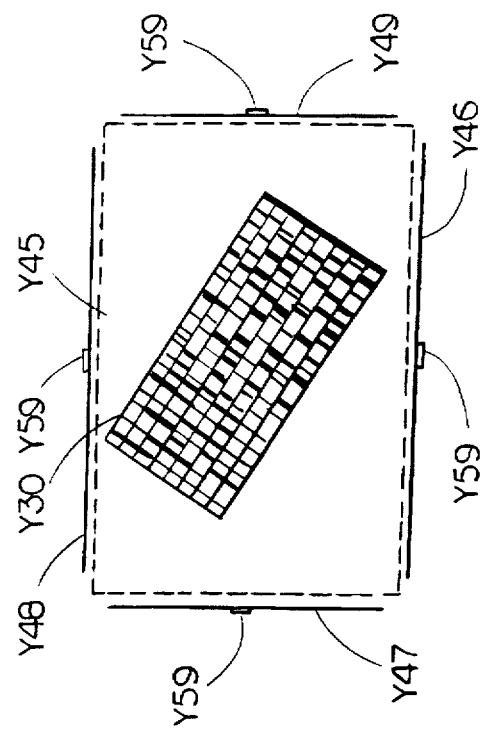
FIG. 49 is an illustration of an alternate manner for indicating to a user of the optical reader the field of view of the information gathering elements in accordance with the invention.
Figure 48:
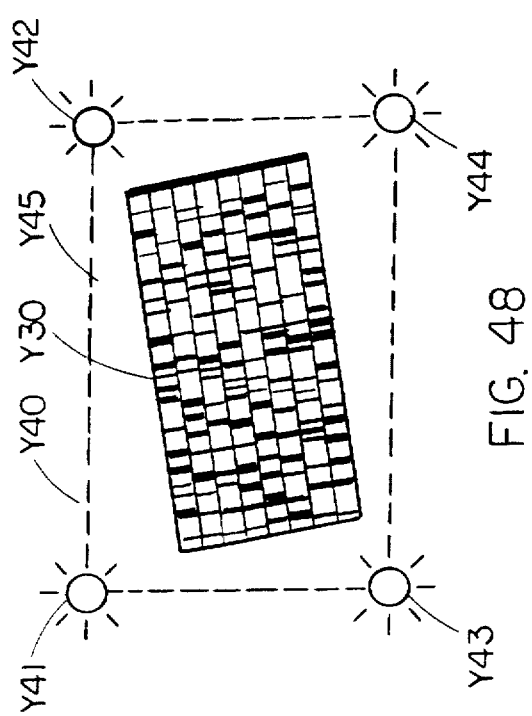
FIG. 48 is an illustration of a stacked bar code and of one of the manners in which a field of view of the optical reader is indicated to a user to facilitate alignment of the field of view with a label bearing indicia such as the stacked bar code.
Figure 50:
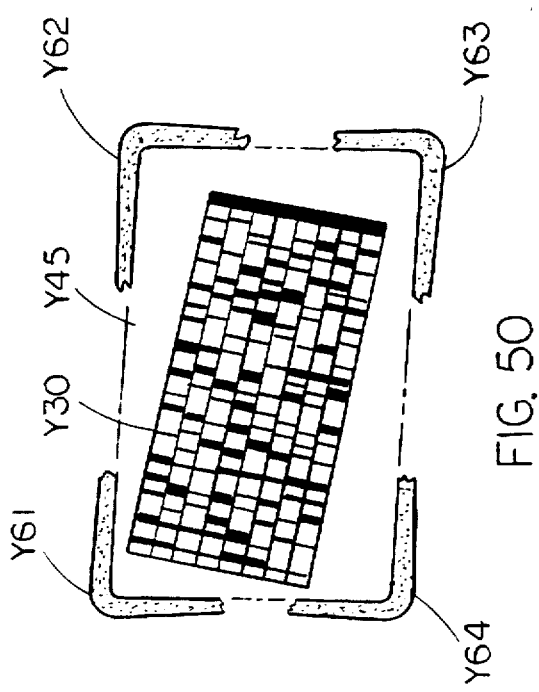
FIG. 50 is an illustration of yet another manner for indicating the field of view of the optical reader.

Once the flash energization of the light source Y11 is complete, the photosensor array Y16 may be read out, each line of photosensor elements of the array being shifted out serially for example, and the respective lines of photosensor elements being read out in parallel for example to an analog/logic interface component Y18 within the hand-held scanner unit Y12. A signal processor Y19, such as the referred to Texas Instruments TMS320C25 signal processor type, disposed in the scanner unit Y12 and connected with the analog/logic interface component Y18 may receive from the focussed information image e.g. at Y20; FIG. 46, the area image data and supply the raw area image data to an associated memory Y21 in the hand-held scanner unit Y12 for subsequent processing in the hand-held unit. As an alternative, the raw area image data (e.g. in digital form) may be coupled via an RF or optical link Y22 to a host processor (not indicated) for storage and processing. Such a separate host processor may also be portable and carried by the user. Where the focussed information image Y20, such as that of a bar code or stacked bar code as shown in FIGS. 48 through 50, on the photosensor array 16 is tilted relative to the longitudinal (widthwise) axis of the array Y16, the raw image data as stored in digital form may be subsequently processed so as to be rotated into a normal horizontal disposition prior to decoding thereof by well known algorithms. In reference to FIG. 46, the flash tube Y11 and the lens Y14 may have circular symmetry relative to their common longitudinal axis Y25 which is consequently also the optical axis of the reader Y12. Hence the illuminator or flash tube Y11 is disposed annularly about the optics represented by the lens Y14, so that any angle of tilt of label Y30 about axis Y25 is not detrimental to uniform optical imaging of the entire information field of the label Y30.

Marker beams Y31 originating from light sources Y36, Y37, Y38 and Y39 at the four corners of area photosensor array Y16 may be projected onto a supporting surface Y40 carrying label Y30, via optics Y14, to produce visually discernible indicia, such as marker spots Y41, Y42, Y43 and Y44, respectively, so that array 16 may be readily aligned relative to area information e.g. on label Y30, as the hand-held unit Y12 is being moved into proximity thereto. By way of example, the light sources Y36–Y39 may be light emitting diodes at the four corners of the photosensor array Y16, which light emitting diodes may be sequentially pulsed so that the marker spots Y41–Y44 are each produced at a repetition rate of sixty per second when the hand-held scanner unit is placed in a target seeking mode. Once the four marker spots "bracket" the information to be read, as in FIGS. 46 and 49 through 51, regardless of tilt, or regardless of whether the information extends horizontally or vertically, the light source Y11 may be triggered, marker spots Y41–Y44 being extinguished by this time, or the wavelength thereof being prevented from affecting the photosensor array by filtering, for example.

As long as the marker spots Y41 through Y44 bracket the information to be read, e.g., information on the label Y30, the image Y20 of the entire information field is necessarily focussed on the active or photosensitive area of the photosensor array 16. It should be understood that only the information and not the entire label 30 needs to become located within an area Y45 of the supporting surface Y40 bounded by the marker spots Y41 through Y44. FIG. 48 shows a stacked bar code label Y30 disposed within the area Y45 bracketed by the marker spots Y41 through Y44. Hence the image of the information represented by the stacked bars of the label Y30 is projected onto and becomes focussed on the active area of the photosensor array Y16. Though the information is captured within the area Y45 at an angle, the image Y20 will still be focussed on the photosensor array Y16. Hence the entire image Y20 with all information bearing dark and light configuration combinations of the code can be read into memory locations of the memory Y21.

A first embodiment of manner in which the marker spots Y41 through Y44 define the area Y45, such as described with respect to FIG. 46, is also illustrated in FIG. 48. The area Y45 as indicated by dashed lines is bracketed at its corners by the marker spots Y41 through Y44. Thus, to line up indicia to be read, such as the stacked bar code label Y30, an operator would aim the marker spots Y41 through Y44 so that information on the label does not extend to or beyond a straight line between two adjacent ones of the marker spots. FIG. 49 illustrates an alternate embodiment of delineating the area Y45. In lieu of the marker spots Y41 through Y44, FIG. 49 shows linear illumination bars Y46, Y47, Y48 and Y49 which closely bound the area Y45, again as depicted again by the dashed lines. It may be preferred to mark the area Y45 by a linear illumination outline comprised of the illumination bars Y46 through Y49 in that the photosensor array may be allowed to contain an uninterrupted matrix without the need to preserve corner locations thereof for the light emitting diode as described with respect to FIG. 48. Briefly referring back to FIG. 46, the illumination spots or bars Y46 through Y49 may be produced by light sources, such as light emitting diodes or laser diodes in combination with linear lenses, which may be disposed in the focal plane Y15 at midpoints of each of the edges of and directly adjacent the photosensor array Y16, as indicated by the numerals Y51, Y52, Y53 and Y54 respectively. Thus, as with respect to the earlier described example, the optics Y14 may be used to direct light beams resulting in the marker bars Y46 through Y49 through the optics Y14 against the surface Y40.

FIG. 49 shows the label Y30 disposed at an increased angle with respect to the major outline of the area Y45 and of a smaller size. Again, the criterion for focussing information on the active area of the photosensor array Y16 is to aim the field of view of the reader Y12 as identified to the user by the marker indicia such as the described spots or bars so as to place the information to be read entirely within the area Y45. If the angular alignment of the label Y30 is less than that illustrated in FIG. 48, and is disposed at an angle with respect to the illustrated rectangular shape of the active field of view in FIG. 49, the user may simply back off the reader Y12 away from the surface Y40 until the entire information area of the label Y30 is contained within the area Y45. An increased distance between the label Y30 and the reader Y12 results in a smaller image of information being focussed on the photosensor array Y16. However, as the label Y30 shown in FIG. 48, the entire label Y30 in FIG. 49 will become focused on the photosensor array Y16. The flash illumination by the referred to xenon flash tube Y11 may be chosen to allow the "f-stop" of the optics Y14 to be stepped down such that the depth of field of the reader is increased to allow the image Y20 to become focused on the photosensor array Y16 even though the distance between the reader Y12 and the supporting surface Y40 may vary for example, between two inches to well in excess of one foot. It may further be found convenient to use currently known and available automatic focusing techniques to further increase the ability of the reader to focus the image Y20 over a yet further increased range of distances of several feet between the indicia to be read and the reader Y12. Such increase in versatility of the reader Y12 would result, of course, in a corresponding increase in the cost of the reader.

Figure 51:
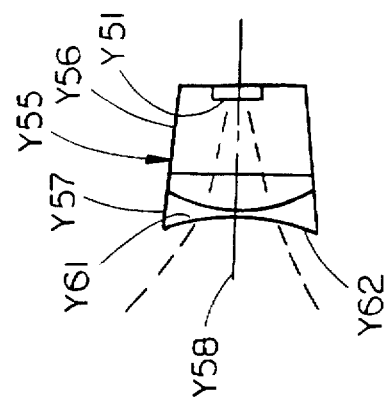
FIG. 51 shows a schematically simplified view of a light source and related linear optics for delineating the field of view of the optical reader as further described herein.

FIG. 51 illustrates a light source (such as shown at Y51 through Y54 in FIG. 46), say source Y51, more generally identified as light source assembly Y55, in combination with a typical molded casing Y56 including a lens Y57 for linearly expanding the light emitted from the source Y51 in one or more directions away from its optical axis Y58. Thus, as illustrated in FIG. 49, the light emitted from the sources Y51 through Y54 is expanded linearly from center points shown at Y59 into two directions disposed at a 180 degree angle. It may also be possible to change the angle between the two legs Y61 and Y62 (FIG. 51) from 180 degrees to for example a right angle between the two directions of expansion of the emitted light. With such modification, the expansion direction Y62 would be directed into the plane or out of the plane of the drawing of FIG. 51. The configuration of marker spots Y61, Y62, Y63 and Y64 in FIG. 50 illustrate a right angle expansion of the light emitted through correspondingly configured lenses Y57. In the configuration of the marker spots Y61 through Y64 the corresponding light sources would be located again at the corners of the photosensor array Y16, as shown with respect to the light sources Y36 through Y39, for example. It would be expected that the intensity of the linearly deflected or expanded light decreases with the distance from the optical center of the non-deflected light beam. Thus, as shown in FIG. 49, the corners of the area delineated by the marker bars Y46 through Y49 may not be illuminated by the marker bars, while the centers of the sides of the area Y45 shown in FIG. 50 may not be illuminated or only slightly illuminated relatively to more brightly illuminated corners by the respective marker spots Y61 through Y64. FIG. 50 also shows the label 30 disposed entirely within the area Y45 delineated by the marker spots Y61 through Y64. While FIGS. 48 through 50 show a somewhat rectangular configuration of the marker spots or bars, a square configuration with a correspondingly square configuration of the photosensor array 16 may be preferred. However, the particular shape of the photosensor array Y16 and the marked or delineated area Y45 are not critical, as long as the area 45 delineated by the marker spots defines the active area Y20 disposed in the interior of the reader Y12.

In each of the different embodiments, a complete label, e.g. five inches high by five inches wide, having a complete bar code, or row or rows of characters thereon, can be focussed onto the operative area of a complete image photosensor array, such as Y16, in response to a single essentially instantaneous flash of a light source, such as Y11. As becomes apparent, a relatively larger sized label Y30 would simply require an operator of the reader to increase the distance between the label to be read and the reader Y12. In an advantageous embodiment, the height dimension of the complete image area array Y16 may be such that a complete area information image including the entire area information width, e.g. of an eighty column line of characters, can be read whether the width of the information image is disposed widthwise or heightwise or diagonally on the photosensor array Y16. In general, such area information is focusable on the photosensor array Y16 in any angular orientation about the optical axis Y25. By way of example, a label Y30 containing all its information in an area of square configuration 1.3 inches on a side could be disposed so that its width extended horizontally or vertically or at an acute angle on the photosensor array Y16 and in each case the entire contents of the label could be read with a single flash of light source Y11.

Preferably the hand-held unit Y12 contains batteries "BATTERY" (schematically indicated in FIG. 46 at Y65) with sufficient energy so as to supply the flashable light source means Y11 and the other components of the hand-held unit, so that the unit is essentially self-contained and free of any connecting cable or the like.

The system of FIG. 46 may be provided with an autofocus ranging system, as already referred to above, so that the reader Y12 may have the ability to read at extended distances, e.g., up to forty-eight inches and possibly even greater distances, and may also be capable of reading a wider range of target areas. Autofocus systems are common in 35 mm cameras.

The hand-held scanner unit Y12 of FIG. 46 may contain the programming to recognize several types of optically discernible indicia of information, such as bar codes as well as conventional character fonts, and to automatically select the appropriate decoding algorithm from those available in its on-board stored program. Furthermore, the hand-held unit Y12 may contain an area array photosensor Y16 of size and resolution so as to register the above-mentioned multiple lines of characters. e.g., eight lines of eighty characters each at one time. Preferably, the entire information field to be scanned, or instantaneously to be recorded or read, such as represented by label Y30 in FIG. 46 is illuminated simultaneously by a brief flash of highly intense light source such as the xenon tube Y11.

The reading of bar codes with a complete area photosensor array such as Y16, enables the digital data representing a bar code, for example, to be rotated and otherwise normalized as a complete entity prior to decoding, such that the normalized data may correspond to that obtained by sequentially scanning along a bar code parallel to the longitudinal bar code axis at a multiplicity of levels separated center to center e.g. by four mils. By combining the corresponding data points at different levels, e.g., on an averaging basis, defects in the bar code image can be reliably overcome such as defects due to foreign matter, spurious marking and the like. Again, the bar code can be disposed at any random angle relative to the reader during the reading operation, speeding the reading of the labels, reducing operator fatigue and increasing the number of labels which can be read during a working day.

Figure 47:
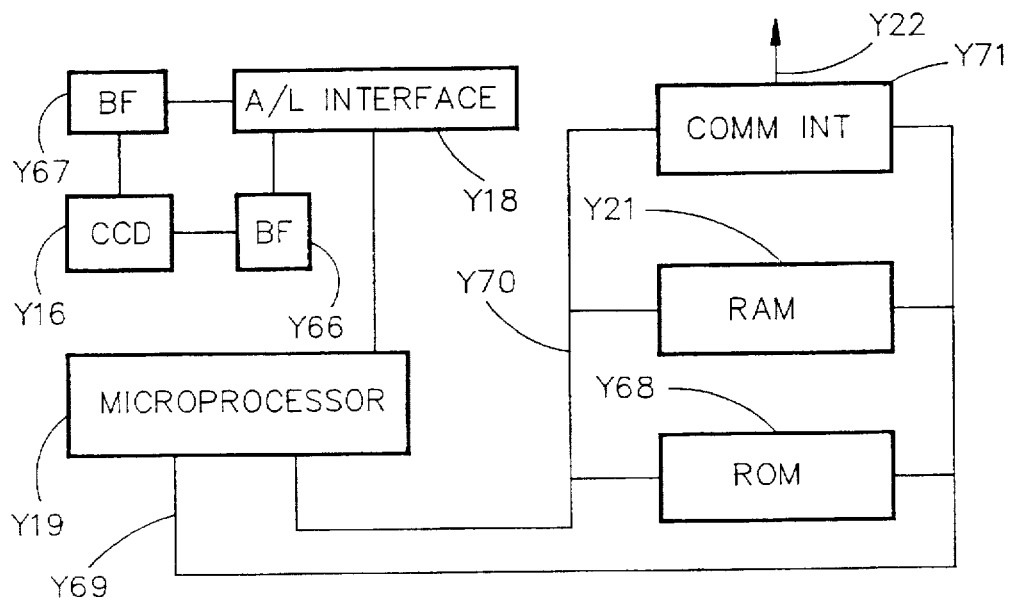
FIG. 47 is a block diagram illustrating a typical logic arrangement of a microprocessor circuit and major functional components as are typically associated with such a circuit, and further illustrating a preferred interface between the array of photosensors of the reader as referred to in FIG. 45 and the microprocessor.

FIG. 47 is a simplified functional block diagram showing the photosensor array ("CCD") Y16 coupled through typical driver circuits ("BF") Y66 and Y67 to the analog/logic interface ("A/L INTERFACE") Y18. The data signal output from such typical interface circuit Y18 would be coupled directly to the above referred-to microprocessor circuit ("MICROPROCESSOR") Y19, such as the preferred Texas Instrument processor TMS320C25 type. A state of the art signal processing circuit at the time of the prior application hereof, the circuit is still a preferred device, though other devices may be available and may be substituted therefor. The specifications of the device Y19 provide for 4K words of On-Chip Program ROM and 544 Words of programmable On-Chip RAM. Typically such minimum ROM (Read Only Memory) and RAM (Random Access Memory) may be supplemented with further programmable memory, such as the memory ("RAM") Y21, and with additional read only memory ("ROM") Y68. The processor circuit Y19 may address and transfer such additional memory by typical address and data buses Y69 and Y70, respectively. Data may also be transferred to a suitable communication interface ("COMM.INT.") Y71, which in turn is coupled to the above referred-to communication link Y22, which may be an RF or an optical link. It should be understood that the specifically described elements and their functions are merely for explanatory purposes and various changes may be possible within the scope hereof.

Figure 52:
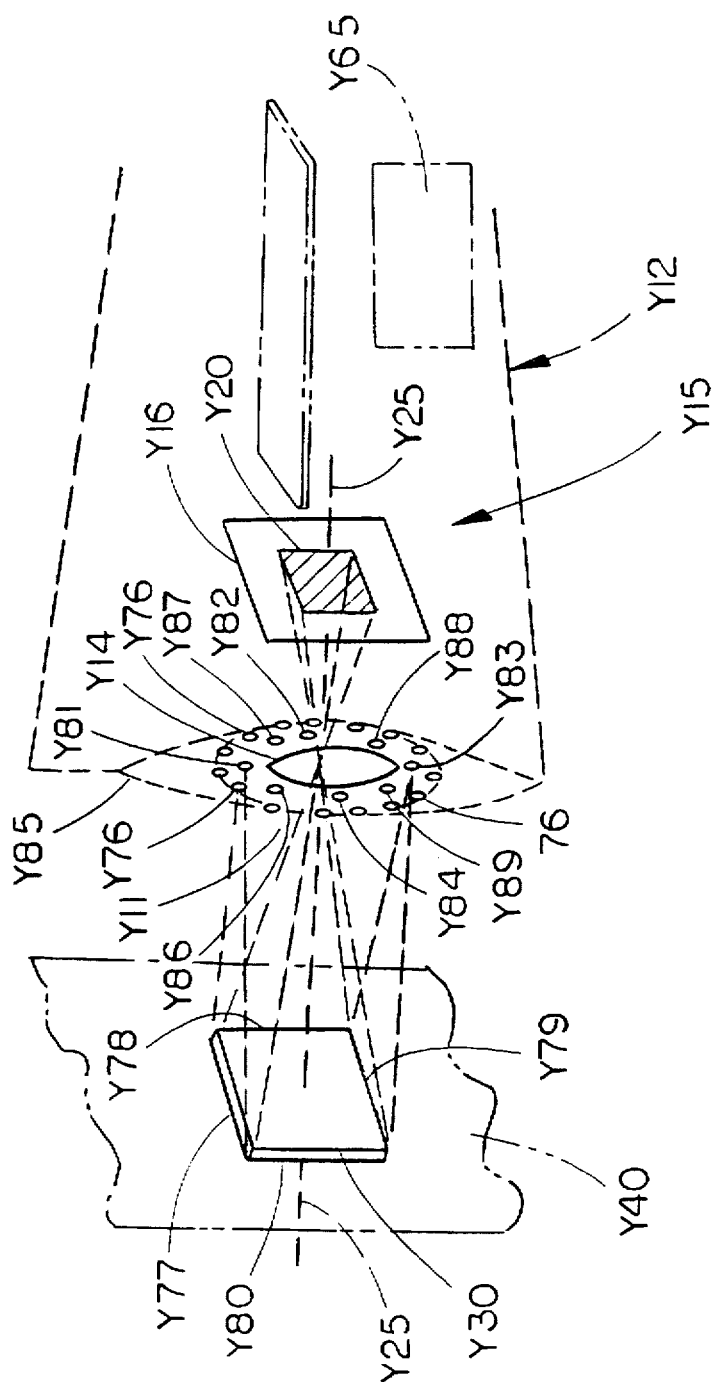
FIG. 52 is a diagrammatic illustration showing the reader of FIG. 45 and illustrating alternative embodiments relating to flashable light sources and aiming aids such as marker sources.

FIG. 52 illustrates alternate embodiments of the present invention indicative of changes within the broad scope of the invention. FIG. 52 shows as FIG. 46 the supporting surface Y40 with the label Y30, such as a stacked bar code, for example, in relationship to the hand-held optical reader unit Y12. The reader unit Y12 also includes preferably typical optics Y14 and a photosensor array Y16 disposed in a focal plane at an interior plane or region Y15 behind the optics Y14. An image Y20 of information representative of the information on the label Y30 may be formed on the photosensor array Y16 when the reader Y12 is activated by instantaneously illuminating an area ahead of the reader Y12 and hence the supporting surface Y40 in the region of the label Y30 when the reader optical axis Y25 is aimed toward the label. The illuminator Y11 which in the preferred embodiment is a flashable xenon tube, may of course generally be of any of a number of flash type illuminators Y11. FIG. 52 therefore illustrates an annular illuminator Y11 which is comprised of a number of discrete pulseable light emitting diodes Y76. The light emitting diodes are preferably disposed adjacent the exterior portion of the optics Y14 of the reader Y12 in a plane perpendicular to the optical axis 25, substantially similar to the arrangement of the xenon flash tube shown in FIG. 46. The number of discrete light emitting elements Y76 may be chosen to correspond to a total light intensity needed to illuminate the exterior region of the label Y30. Depending on the desired range over which the reader Y12 is to function, the number of discrete devices may be increased by closer spaces between adjacent ones of the light emitting diodes Y76.

FIG. 52 illustrates another change in the described embodiment with respect to the previously described marker sources, such as the light emitting diodes Y36 through Y39 or the light sources Y55 including lenses Y57. Even though it is presently considered advantageous to project beams from the marker sources through the optics Y14, within reason it is possible to also project marker spots or bars, such as bars Y77, Y78, Y79 or Y80 against the surface Y40 from respective marker light sources Y81, Y82, Y83 and Y84 without having the projected beams be directed through the optics Y14 of the reader Y12. Thus, the marker light sources Y81 through Y84 may be disposed externally of the optics Y14 and on a frontal portion Y85 of the reader Y12. The lenses Y57 of the light sources Y81 through Y84 may be disposed to direct the respective marker beams of the light sources substantially along the periphery of the field of view of the optics 14 of the reader Y12. As described with respect to FIG. 51, the lenses Y57 may be shaped to linearly shape the emitted light of the marker sources in two mutually opposite directions or at an angle other than 180 degrees, depending on the location of the light sources. A disadvantage may possibly be noticed in that the marker sources are not in total alignment with the periphery of the field of view of the optics Y14. Consequently, at extremes of an operating range of the reader Y12, resulting marker bars or spots, such as the marker bars 77 through 80 shown in FIG. 52 do not delineate precisely the area 45 which corresponds precisely to the active photosensor array Y16 projected against the surface Y40 through the optics Y14. However, only at close range, the marker spots or bars Y77 through Y80 may form on the surface Y40 somewhat externally of the actual area Y45, hence indicating an area larger than one that may be read by the reader Y12. When the sources are properly placed such deviation may be confined to a range at which normally no readings are taken. At a medium range, the marker bars may be disposed to clearly delineate the area Y45. And an area smaller than the actual area Y45 may be indicated at an extended distance for reading the label 30. Thus, for practical purposes the marker sources may be oriented that for substantially all readings the predetermined area Y45 is bracketed. It should be understood that not only light sources for generating the bars Y77 through Y80 may be disposed externally of the optics Y14, but light sources disposed to project marker beams generally to corners of the rectangular area Y45 may be disposed externally of the optics Y14. Such alternate light sources Y86, Y87, Y88 and Y89 may similarly be disposed as closely as feasible adjacent the optics, and actually may be disposed within the annular configuration of flashable illuminator source elements Y76 as shown in FIG. 52. With respect to the latter sources, lenses Y57 may be disposed to linearly expand the respective marker beams at right angles so as to bracket the area Y45 as indicated in FIG. 50, for example. It should be understood that various other changes suggest themselves from the preferred embodiments as disclosed herein.

Figure 53:
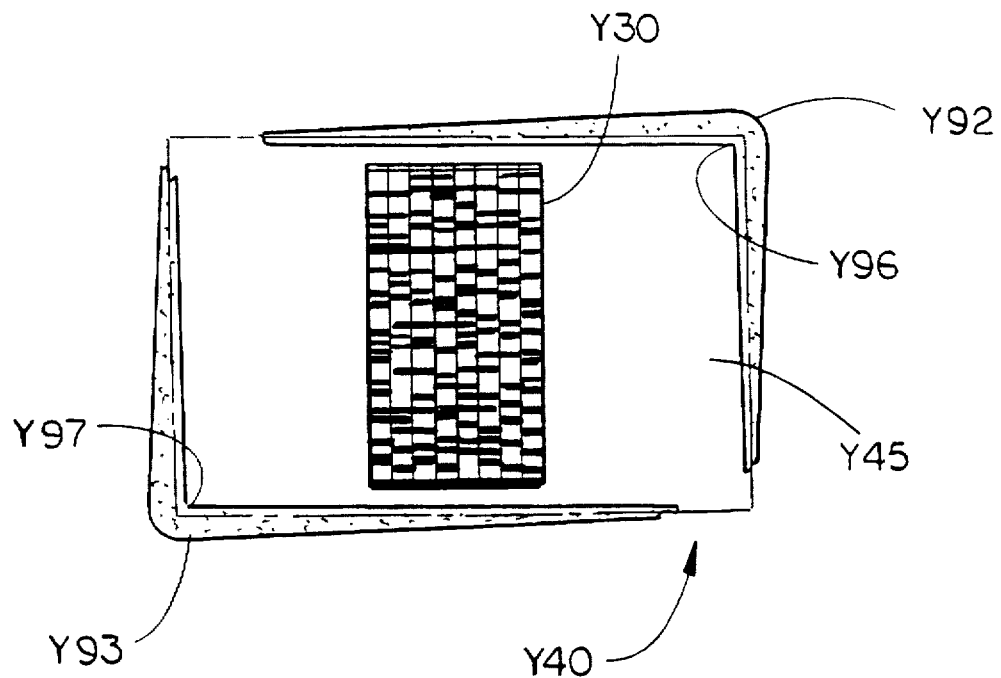
FIG. 53 shows another embodiment for delineating to a user of the reader its field of view, also showing a stacked bar code label encompassed in a vertical orientation within the delineated field of view.
Figure 54:
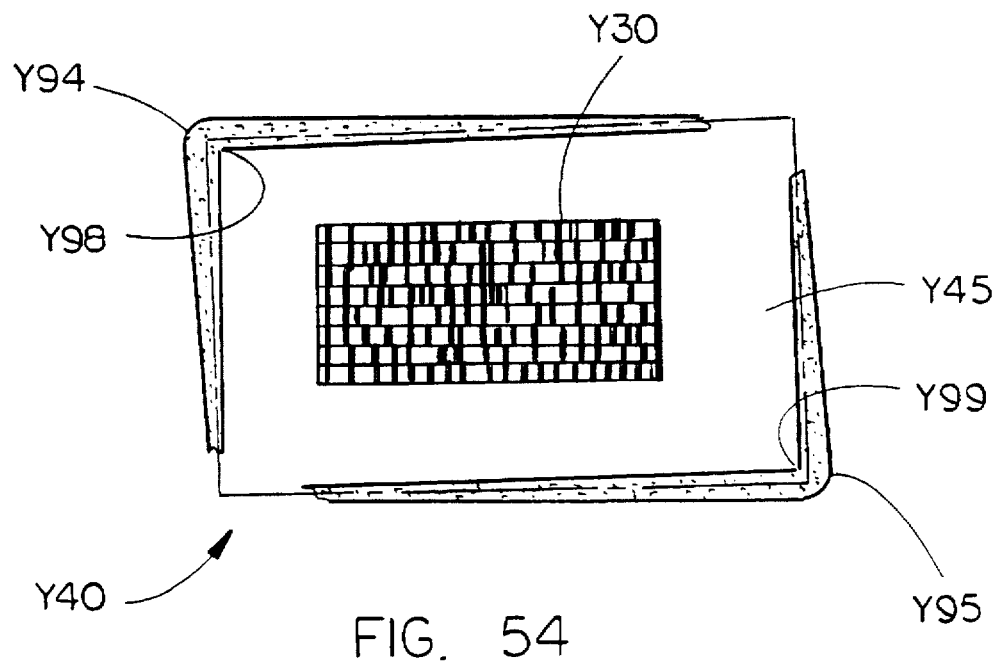
FIG. 54 shows a variation of the embodiment of FIG. 52 for delineating the field of view of the reader, also showing a stacked bar code label encompassed in a horizontal orientation within the delineated field of view.

As an example of changes or variations in delineating the area Y45 within the field of view of the reader Y12 the marker sources may be advantageously limited in numbers. FIGS. 53 and 54 depict an example of an alternate arrangement of marker sources, the respective impinging marker spots being identified by numerals Y92 and Y93 in FIG. 53 and by numerals Y94 and Y95 in FIG. 54. In each of the further described embodiments, marker sources are disposed to generate marker beams impinging on the surface 40 as the respective marker spots Y92, Y93, Y94 and Y95 with the earlier described right angle expansion from diagonally opposite corners Y96 and Y97 of the delineated area Y45 in FIG. 53, and from corners Y98 and Y99 of such area Y45 as shown in FIG. 54. Also, the orientation of the labels Y30 depict a substantially vertical or heightwise arrangement with respect to the area Y45 in FIG. 53, and a substantially horizontal or widthwise arrangement of the label Y30 with respect to the area Y45 in FIG. 54. The different orientations of the respective labels Y30 in each instance further illustrate the above described advantage of the reader in providing for the capture of an area of information on the photosensor array independent of the orientation of such information about the optical axis of the reader.

With respect to the shape of the photosensor array Y16, photosensor arrays of the current state of the art are generally of rectangular shape or at least the active areas are of rectangular shape. While the preferred embodiment discloses a generally circular lens or optics Y14, the shape thereof is preferred because of the generally rectangular shapes of so-called targets or photosensor arrays 16 of video cameras. It should be understood that the invention in its broad scope may not depend on a sensing area of any particular shape.

The ability to capture and manipulate an entire image with a portable unit has important benefits for optical character reading also. In such instances a reading area of elongate rectangular shape may be preferred. For example, the described embodiments allow the use of image enhancement algorithms, e.g., of the type developed for enhancement of deep space probe images, as well as image normalization, e.g., such as image rotation and scaling. Non-linear scaling for improving recognition efficiency with respect to irregular surfaces such as curved surfaces, and with respect to off-axis viewing angles, is also feasible.

Figure 55:
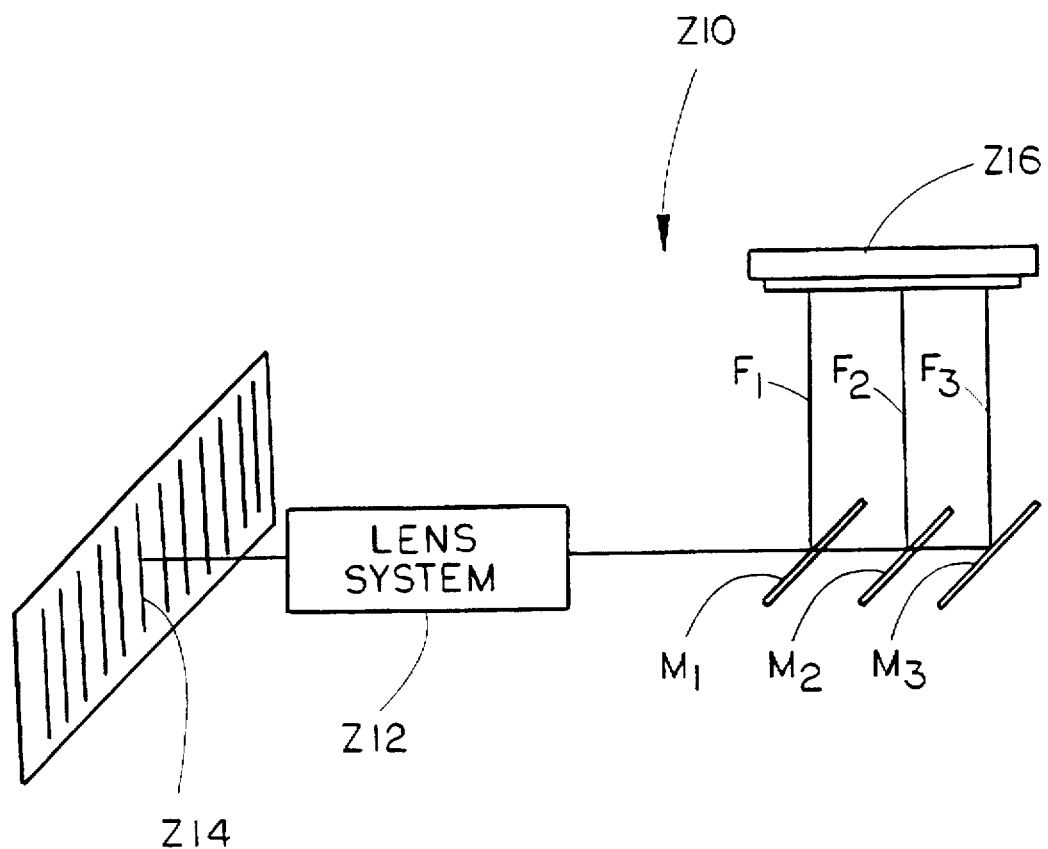
FIG. 55 shows yet another variation of the embodiment of FIG. 52 (much like FIG. 53) for delineating the field of view of the reader.

IV. Description of FIG. 55

Optically readable information set reader Z10 may be constructed such that images of information sets Z14 may be focused onto an array Z16 via an optical system Z12 and a plurality of mirrors $M_1$, $M_2$, and $M_3$. Each mirror may reflect light of a different wavelength such that an information set is sequentially illuminated by light of varying wavelengths. Since each illumination step will produce an image the reader Z10 may determine the readability of each image; reading only that image with the best focus and then notifying the operator. In this way optically readable information sets Z14 may be read over a substantial range of distance with a fixed optical string. It should be apparent that a single mirror may also be utilized such that by rotating the mirror so as to project images at various segments of the array Z16.

In an exemplary embodiment a chromatic lens system of the type described in U.S. Ser. No. 07/945,174 filed Sep. 14, 1992 (issue fee paid) may be utilized as the lens system Z12. In this fashion an optically readable information set reader may be constructed to read information sets over a substantial range of distances.

Additionally, filters may be inserted into the optical string such that the different focal lengths of $f_1$, $f_2$, and $f_3$ may be efficiently utilized for reading information sets over a substantial range of distance.

V. Description of FIG. 56

Figure 56:
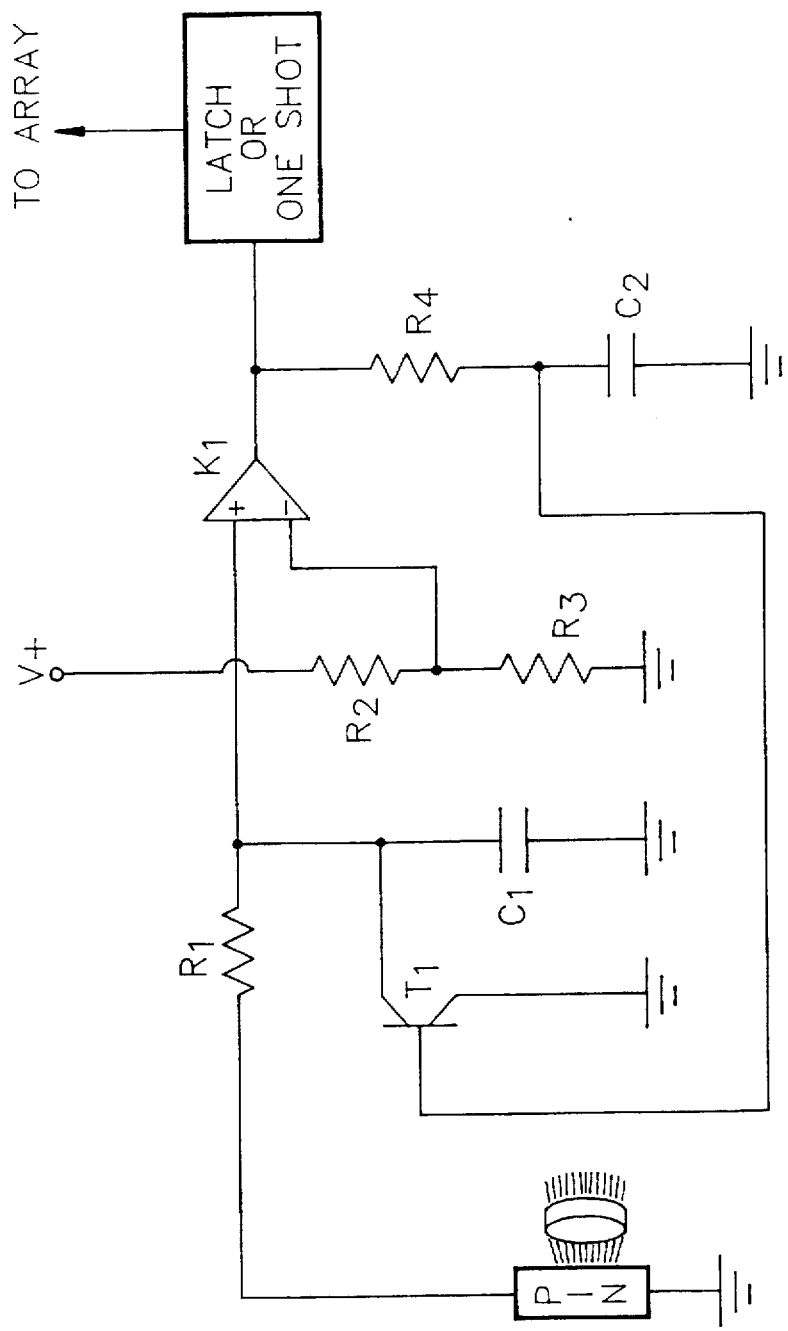

Enhanced exposure control may be achieved by averaging the reflected light from an optical information set during a reading operation and then terminating integration of the reflected light from an optical information set after an optimum measurement sample of the reflected light image has been received. For example, this may be achieved by utilizing a charge coupled device (CCD) or the like with an electronic shutter with a PIN photodiode. A voltage is output when the decive is exposed to light. The PIN photodiode charges capacitor $C_1$ through $R_1$. Resistors $R_2$ and $R_3$ set a threshold value for the comparator $K_1$. Once the charge on C1 exceeds the threshold, the comparator changes states. The $R_4$, $C_2$ pair controls timing of the base drive to the transistor $T_1$. The latch and/or one shot (monstable multivibrator) condition the output of the circuit and adjust signal compatibility to the CCD. The output signal terminates further exposure during integration time (FIG. 56).

The transistor $T_1$ flushes accumulated charge on $C_1$. Since the comparator changes states when this happens, the resistor/capacitor pair ($R_4$, $C_2$) maintain enough base drive to fully flush the capacitor. The latch or one shot circuit makes the output signal durable enough to be in synchronization with the CCD exposure cycle.

More than one PIN photodiode may be used to increase the output voltage. Since the capacitor voltage at the end of the discharge phase will approximate $V_{ce}$ for the transistor, the reference voltage may be considered to retain this value. A high resistance "bleed resistor" may also be utilized with the transistor so as to force the capacitor initial voltage to be very nearly ground.

It will be apparent that many modifications and variations may be effected without departing from the teachings and concepts of the present disclosure.

We claim:

1. An optical indicia reader for reading information encoded in optical indicia, said optical indicia reader comprising:

(a) a light source positioned within the indicia reader to illuminate an imaging area located externally of the reader;

(b) an oscillatory system positioned to scan a light beam generated by said light source over optical indicia to be read; and (c) a controller capable of controlling said oscillatory system;

wherein said controller is capable of directing said oscillatory system to become fixed in position so that the light beam is in a substantially fixed relationship to an aiming axis of the optical indicia reader.

2. An optical indicia reader for reading information encoded in optical indicia, said optical indicia reader comprising:

(a) a light source positioned within the indicia reader to illuminate an imaging area located externally of the reader with a light beam;

(b) an oscillatory system positioned to scan the light beam generated by said light source over optical indica to be read; and (c) a controller capable of controlling said oscillatory system;

wherein said controller is capable of directing said oscillatory system to become fixed in a position that will direct light beam to an area in the neighborhood of an aiming axis of the optical indicia reader throughout a reading range of the optical indicia reader.

3. The optical indicia reader according to claim 2 wherein the controller directs said oscillatory system to become fixed in position when the optical indicia reader is in a proximity sensing mode.

* * * * *